United States Patent
McFarland et al.

(10) Patent No.: US 11,814,285 B2
(45) Date of Patent: Nov. 14, 2023

(54) SIMULTANEOUS REACTION AND SEPARATION OF CHEMICALS

(71) Applicant: The Regents of the University of California, Oakland, CA (US)

(72) Inventors: Eric W. McFarland, Santa Barbara, CA (US); Ches Upham, Menlo Park, CA (US); Jiren Zeng, Goleta, CA (US); Clarke Palmer, Goleta, CA (US); Shizhao Su, Santa Barbara, CA (US); Davide Mannini, Santa Barbara, CA (US); Dohyung Kang, Goleta, CA (US); Nazanin Rahimi, Goleta, CA (US); Horia Metiu, Santa Barbara, CA (US); Michael Gordon, Goleta, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 100 days.

(21) Appl. No.: 16/764,226

(22) PCT Filed: Nov. 16, 2018

(86) PCT No.: PCT/US2018/061474
§ 371 (c)(1),
(2) Date: May 14, 2020

(87) PCT Pub. No.: WO2019/099795
PCT Pub. Date: May 23, 2019

(65) Prior Publication Data
US 2020/0283293 A1    Sep. 10, 2020

Related U.S. Application Data
(60) Provisional application No. 62/586,943, filed on Nov. 16, 2017.

(51) Int. Cl.
*C01B 3/26* (2006.01)
*B01J 8/02* (2006.01)
(Continued)

(52) U.S. Cl.
CPC ............... *C01B 3/26* (2013.01); *B01J 8/0278* (2013.01); *B01J 23/825* (2013.01);
(Continued)

(58) Field of Classification Search
None
See application file for complete search history.

(56) References Cited

U.S. PATENT DOCUMENTS

| | | |
|---|---|---|
| 2,449,359 A | 9/1948 | Abrams et al. |
| 2,760,847 A | 8/1956 | Oblad et al. |

(Continued)

FOREIGN PATENT DOCUMENTS

| | | |
|---|---|---|
| AU | 2009270801 | 1/2010 |
| CN | 1043290 | 6/1990 |

(Continued)

OTHER PUBLICATIONS

Chinese First Office Action (with English translation) dated Nov. 23, 2021 for Chinese Patent Application No. 201880084615.3.
(Continued)

*Primary Examiner* — Coris Fung
*Assistant Examiner* — Keling Zhang
(74) *Attorney, Agent, or Firm* — Gates & Cooper LLP

(57) ABSTRACT

The reaction rate of hydrocarbon pyrolysis can be increased to produce solid carbon and hydrogen by the use of molten materials which have catalytic functionality to increase the rate of reaction and physical properties that facilitate the formation and contamination-free separation of the solid carbon. Processes, materials, reactor configurations, and conditions are disclosed whereby methane and other hydro-
(Continued)

carbons can be decomposed at high reaction rates into hydrogen gas and carbon products without any carbon oxides in a single reaction step. The process also makes use of specific properties of selected materials with unique solubilities and/or wettability of products into (and/or by) the molten phase to facilitate generation of purified products and increased conversion in more general reactions.

21 Claims, 30 Drawing Sheets

(51) Int. Cl.
    *B01J 23/825*     (2006.01)
    *B01J 23/843*     (2006.01)
    *B01J 27/08*     (2006.01)
    *B01J 35/00*     (2006.01)
    *B01J 35/12*     (2006.01)

(52) U.S. Cl.
    CPC ........... *B01J 23/8437* (2013.01); *B01J 27/08* (2013.01); *B01J 35/0006* (2013.01); *B01J 35/12* (2013.01); *C01B 2203/0277* (2013.01); *C01B 2203/1011* (2013.01); *C01B 2203/1058* (2013.01); *C01B 2203/1241* (2013.01)

(56) References Cited

U.S. PATENT DOCUMENTS

| | | |
|---|---|---|
| 3,374,052 A | 3/1968 | Fan et al. |
| 3,679,577 A | 7/1972 | Wantland et al. |
| 4,107,036 A | 8/1978 | Giesen et al. |
| 4,191,651 A | 3/1980 | Cheysson et al. |
| 4,421,631 A | 12/1983 | Ampaya et al. |
| 5,298,233 A | 3/1994 | Nagel |
| 5,767,165 A | 6/1998 | Steinberg et al. |
| 2007/0253886 A1 | 11/2007 | Abatzoglou et al. |
| 2009/0087543 A1 | 4/2009 | Nicholas |
| 2010/0051515 A1 | 3/2010 | Schneider et al. |
| 2011/0089377 A1 | 4/2011 | Bingham et al. |
| 2012/0039795 A1 | 2/2012 | Chen et al. |
| 2012/0219490 A1 | 8/2012 | Noda et al. |
| 2013/0072739 A1 | 3/2013 | Ruettinger et al. |
| 2014/0338921 A1 | 11/2014 | Barry et al. |
| 2015/0064096 A1 | 3/2015 | Noyes |
| 2015/0075375 A1 | 3/2015 | Blount |
| 2017/0130135 A1 | 5/2017 | Kyllönen et al. |
| 2017/0217772 A1 | 8/2017 | Stiller |

FOREIGN PATENT DOCUMENTS

| | | |
|---|---|---|
| CN | 101687141 | 3/2010 |
| JP | 2015525179 A | 9/2015 |
| KR | 101520920 B1 | 5/2015 |
| WO | 2017147168 A1 | 8/2017 |

OTHER PUBLICATIONS

Extended European Search Report dated Jul. 9, 2021 for European Application No. 18877318.8.
PCT International Search Report & Written Opinion dated Apr. 12, 2019 PCT Application No. PCT/US2018/061474.
Geibler et al., "Hydrogen production via methane pyrolysis in a liquid metal bubble column reactor with a packed bed"; Chemical Engineering Journal, vol. 299, Sep. 1, 2016, pp. 1-19.
Second Office Action dated Jul. 15, 2022 for Chinese Application No. 201880084615.3.
Japanese Notice of Reasons for Refusal (with English translation) dated Jul. 5, 2022 for Japanese Patent Application No. 2020-527100.
Chinese Third Office Action (with English translation) dated Dec. 15, 2023 for Chinese Patent Application No. 201880084615.3.
Zheng, et al., "Melting and Casting of Non-ferrous Metals and Alloys", China Nonferrous Metal Industry Corporation Employee Education Teaching Material Editing Office, 1985, p. 82.
Yujing et al., "Recycling Aluminium Industry Research and Production Technology", Metallurgical Industry Press, 2018, pp. 172-173.
Japanese Decision to Grant a Patent dated Feb. 10, 2023 for JP Application No. 2020-527100.
Australian Examination Report dated Oct. 19, 2022 for Australian Application No. 2018370138.
Korean Office Action dated Apr. 22, 2023 for Korean Application No. 10-2020-7017370.
Chinese Rejection Decision (with English translation) dated May 13, 2023 for Chinese Patent Application No. 201880084615.3.
Australian Examination Report dated Sep. 15, 2023 for Australian Patent Application No. 2018370138.

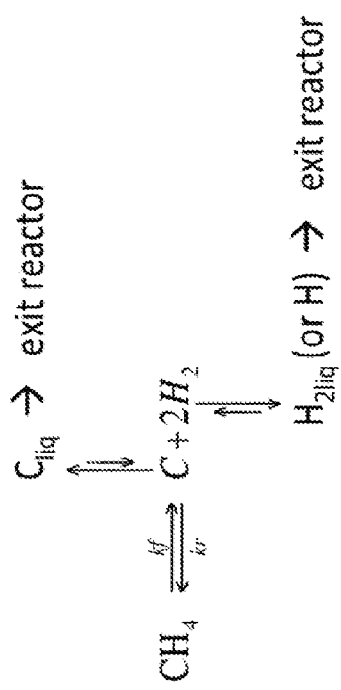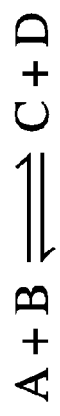
FIG. 8

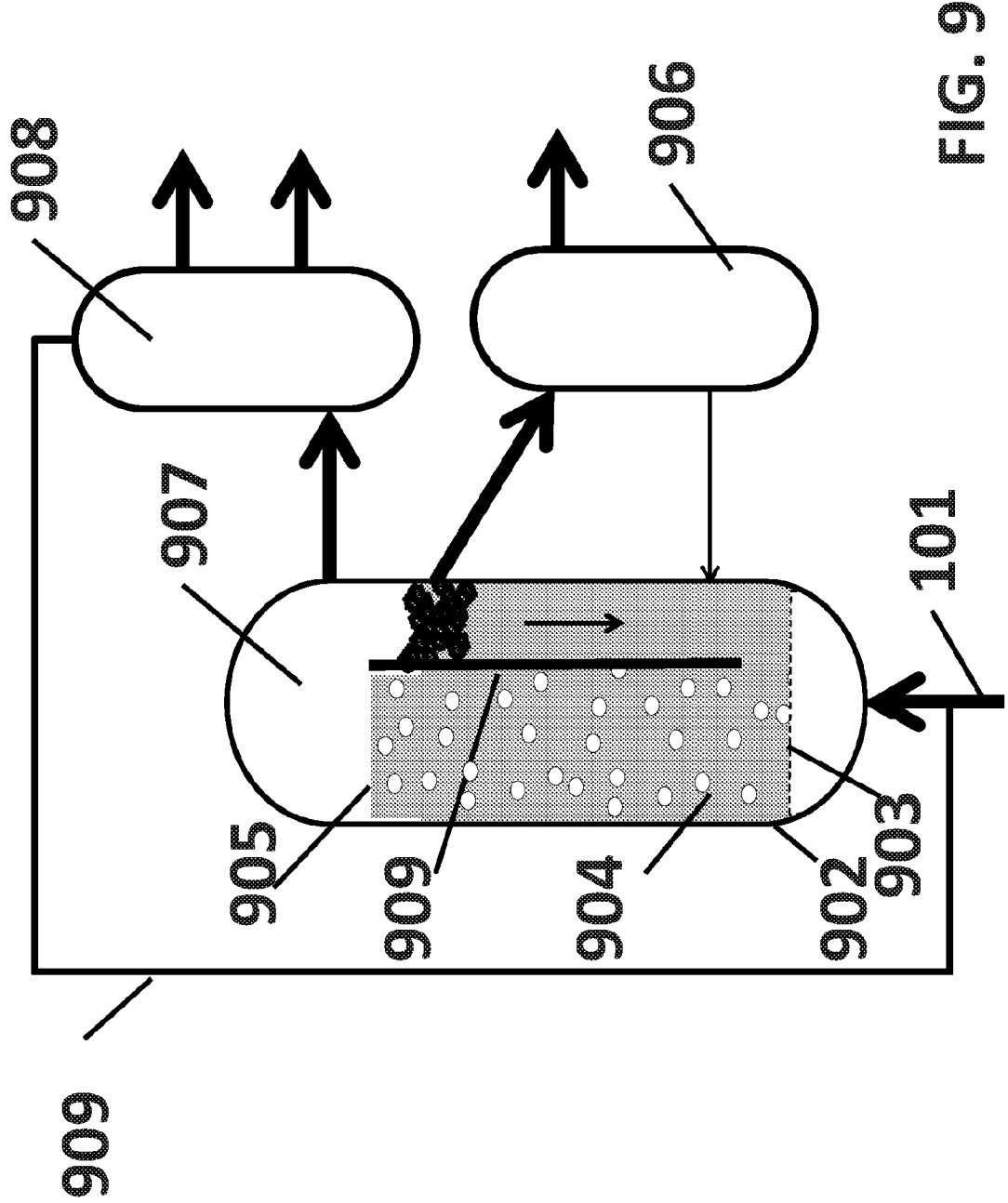

| Sample | C(wt%) | N(wt%) | B(wt%) | Na(wt%) | K(wt%) | Br(wt%) | Cl(wt%) |
|---|---|---|---|---|---|---|---|
| NIB | 17.36 | 12.98 | 69.66 | N.A. | N.A. | N.A. | N.A. |
| NIB/ABr | 74.19 | 0.06 | 0.42 | N.A. | 8.05 | 17.27 | N.A. |
| NIB/NaCl | 95.08 | 0.56 | 0.17 | 1.03 | N.A. | 3.06 | N.A. |

FIG. 21

SIMULTANEOUS REACTION AND SEPARATION OF CHEMICALS

CROSS-REFERENCE TO RELATED APPLICATIONS

This application claims priority to and the benefit under 35 U.S.C. Section 119(e) of commonly-assigned U.S. Provisional Application No. 62/586,943, filed on Nov. 16, 2017, and entitled "Simultaneous reaction and Separation of Chemicals", which application is incorporated herein by reference in its entirety.

STATEMENT OF FEDERALLY SPONSORED RESEARCH OR DEVELOPMENT

This invention was made with Government support under grant number DE-FG02-89ER14048 awarded by the U.S. Department of Energy and grant numbers CNS-0960316 & DMR-1121053 awarded by the National Science Foundation. The government has certain rights in the invention.

FIELD

The disclosure relates to the manufacture of hydrogen and solid carbon from methane. The present disclosure also relates to the manufacture of hydrogen and solid carbon from other hydrocarbon feedstocks including natural gas, petroleum, and their components. The present disclosure also relates broadly to reactive separation of reactants from products in molten metal and molten salt environments. More particularly, the disclosure relates to an improved process for conversion of hydrogen and carbon containing molecules into gaseous hydrogen and solid carbon in reactors whereby the removal of the solid carbon is facilitated.

BACKGROUND

The conversion of methane into useful chemical products without the co-production of carbon oxides in cost-effective processes has long been of interest. Hydrogen production from methane and other hydrocarbons is presently accomplished commercially using partial oxidation with steam and/or oxygen producing carbon oxides and requiring separation of the gas phase products from the hydrogen product.

Methane pyrolysis can be used as a means of producing hydrogen and solid carbon. The reaction, $CH_4 \leftrightarrow 2H_2 + C$ is limited by equilibrium such that at pressures of approximately 5-40 bar which are need for industrial production and temperatures below 1100° C. the methane conversion is relatively low. The many strategies investigated to date have been recently reviewed in *Renewable and Sustainable Energy Reviews* 44 (2015) 221-256 which highlighted solid catalysts including metals, metal enhanced carbons, and activated carbons *Applied Catalysis A General* 359(1-2):1-24-May 2009. *Energy & Fuels* 1998, 12, pp. 41-48 and Topics in Catalysis vol. 37, Nos. 2-4, April 2006, pp. 137-145 which assessed technologies pertaining to the catalytic decomposition of hydrocarbons for hydrogen production in general, the conclusions point to the rapid deactivation of solid catalysts (requiring reactivation steps) and the high power requirements and low pressures of hydrogen produced in plasma type systems. Other reviews of these same technologies include International Journal of Hydrogen Energy 24 (1999), pp. 613-624, and International Journal of Hydrogen Energy 35 (2010). pp. 1160-1190.

U.S. Pat. No. 9,061,909 discloses the production of carbon nanotubes and hydrogen from a hydrocarbon source. The carbon is produced on solid catalysts and the carbon is reportedly removed by use of "a separation gas".

In the 1920's the thermal decomposition of methane to produce carbon at very high temperatures was described, *J Phys. Chem.*, 1924, 28 (10), pp 1036-1048. Following on this approach, U.S. Pat. No. 6,936,234 discloses a process for converting methane to solid graphitic carbon without a catalyst in a high temperature process at 2100-2400° C. The methods of heating or for removing the carbon are not disclosed.

U.S. Pat. No. 6,936,234 discloses a process for converting methane to solid graphitic carbon without a catalyst in a high temperature process at 2100-2400° C. The methods of heating or for removing the carbon are not disclosed.

U.S. Pat. No. 9,776,860 discloses a process for converting hydrocarbons to solid graphitic carbon in a chemical looping cycle whereby the hydrocarbon is dehydrogenated over a molten metal salt (e.g. metal chloride) to produce a reduced metal (e.g. Ni), solid carbon, and a hydrogen containing intermediate (e.g. HCl). The reaction conditions are then changed to allow the intermediate to react with the metal to recreate the metal salt and molecular hydrogen.

Molten iron is employed in U.S. Pat. Nos. 4,187,672 and 4,244,180 as a solvent, for carbon generated from coal, the carbon is then partially oxidized by iron oxide and partially through the introduction of oxygen. Coal can be gasified in a molten metal bath such as molten iron at temperatures of 1200-1700° C. Steam is injected to react with the carbon endothermically and moderate the reaction which otherwise heats up. The disclosure maintains distinct carbonization and oxidation reaction chambers. In U.S. Pat. Nos. 4,574,714 and 4,602,574 describe a process for the destruction of organic wastes by injecting them, together with oxygen, into a metal or slag bath such as is utilized in a steelmaking facility. Nagel et. al. in U.S. Pat. Nos. 5,322,547 and 5,358,549 describe directing an organic waste into a molten metal bath, including an agent which chemically reduces a metal of the metal-containing component to form a dissolved intermediate. A second reducing agent is added to reduce the metal of the dissolved intermediate, thereby, indirectly chemically reducing the metal component. Hydrogen gas can be produced from hydrocarbon feedstocks such as natural gas, biomass and steam using a number of different techniques.

U.S. Pat. No. 4,388,084 by Okane et al. discloses a process for the gasification of coal by injecting coal, oxygen and steam onto molten iron at a temperature of about 1500 C. The manufacture of hydrogen by the reduction of steam using an oxidizable metal species is also known. For example, U.S. Pat. No. 4,343,624 discloses a three-stage hydrogen production method and apparatus utilizing a steam oxidation process. U.S. Pat. No. 5,645,615 discloses a method for decomposing carbon and hydrogen containing feeds, such as coal, by injecting the feed into a molten metal using a submerged lance. U.S. Pat. No. 6,110,239 describes a hydrocarbon gasification process producing hydrogen and carbon oxides where the molten metal is transferred to different zones within the same reactor.

Contacting methane with molten metals to produce solid carbon and hydrogen was described previously in *Energy & Fuels* 2003, 17, pgs 705-713. In this prior work, molten tin and molten tin with suspended silicon carbide particles were used as the reaction environment. The authors report that the thermochemical process has increased methane conversion due to increased residence time when the particles are added to the tin melt in what was considered a non-catalytic heat transfer medium. More recently, molten tin was again utilized as a reaction medium for methane pyrolysis, *Int. J. Hydrogen Energy* 40, 14134-14146 (2015), with the metal serving as a non-catalytic heat transfer medium which allowed separation of the solid carbon product from the gas phase hydrogen.

In 1990's the entrainment of dense liquid droplets into the less dense phase was discussed by a number of researchers. *International journal of heat and mass transfer,* 34(1), 149-157 presented the phenomenon of liquid entrainment by a gas bubble passing through the interface of the two immiscible liquids. In 2000 *Metallurgical and Materials Transactions B*. 31(3), 537-540 described X-Ray Fluoroscopy observations of bubble formation and separation at a metal-slag interface where they claimed the removal of solid particles from a liquid metal.

Molten salt/metal extractions have been widely used in metallurgical purification applications for more than a century. U.S. Pat. No. 4,036,713A discloses using a molten salt-molten metal extraction for removal of tritium from molten lithium into a molten lithium salt. Following on this approach, two-phase molten metal-molten salt reactor system was employed for pyrolysis of waste circuit boards. In this process, dense metals were extracted into the metal phase at the bottom of the reactor and lighter fractions and carbon char were recovered in the less dense upper layer, *Methods X* 2015, 2. pp. 100-106.

Bubbling gases through the molten Sn and LiCl—KCl discloses the entrainment of the of Sn particles in the form of a metal film, metal column, and droplets where the bubble becomes detached from the metal-salt interface, in *Metallurgical and Materials Transactions B,* 47(3), 1532-1537.

SUMMARY

The reaction rate of hydrocarbon pyrolysis can be increased to produce solid carbon and hydrogen by the use of novel molten materials which have catalytic functionality to increase the rate of reaction and physical properties that facilitate the formation and contamination-free separation of the solid carbon. This disclosure provides processes, materials, reactor configurations, and conditions whereby methane and other hydrocarbons can be decomposed at high reaction rates into hydrogen gas and carbon products without any carbon oxides in a single reaction step. The inventive process also makes use of specific properties of selected materials with unique solubilities and/or wettability of products into (and/or by) the molten phase to facilitate generation of purified products and increased conversion in more general reactions as described herein.

In some embodiments, a process for converting methane into solid carbon and hydrogen uses a bubble column reactor whereby methane is bubbled through the bottom of the reactor containing a molten metal of a specific composition with catalytic functionality that increases the rate of methane decomposition and has solubility for both hydrogen and carbon but little or no solubility for the methane. The melt thus has the ability to remove the reaction products from the reactants by transporting the products out of the bubble into the melt preventing their back reaction and allowing the conversion of methane to exceed the equilibrium conversion of a closed isolated reactor system. This allows high reactor pressures to be used with high methane conversions.

In some embodiments, a process for converting methane into solid carbon and hydrogen uses a bubble column reactor filled with two separate phases of molten liquids. The top of the reactor contains a molten salt that is immiscible with the bottom phase which is a molten metal of a specific composition with catalytic functionality that increases the rate of methane decomposition and has solubility for both hydrogen and carbon but no solubility for the methane. The molten metal thus has the ability to remove the reaction products from the reactants allowing the conversion of methane to exceed the equilibrium conversion of a closed reactor system. As the bubbles containing hydrogen, gas phase intermediate products, and particulate carbon with metal residue leave the molten metal phase and enter the molten salt phase, the high temperature salt with a specific composition facilitates the completion of the reaction and the removal of metal impurities carrying the low density pure carbon to the molten salt surface where it accumulates as a separate solid phase.

In some embodiments, a process for converting methane into solid carbon and hydrogen uses a reactor containing a high temperature liquid and a solid catalyst active for methane pyrolysis. The liquid is specifically selected for its ability to wet the solid catalyst surface. The gas phase methane contacts the solid catalyst and dehydrogenates to form solid carbon (coke) on its surface, the liquid, with a specific composition selected for both its ability to wet the solid surface facilitating the mobilization of the carbon off the metal surface and the solubility of the carbon particulates in the liquid which periodically contacts the surface of the solid catalyst and removes the carbon on the surface reactivating the catalysts and carrying the solid carbon to another reactor section where it aggregates as a separate solid phase.

In some embodiments, a process for converting hydrogen halides into halogens uses a reactor whereby the hydrogen halide gas and oxygen are contacted with a high temperature liquid salt in which the halogen or halogen and hydrogen halide are soluble. The oxygen reacts with the hydrogen halide to produce a halogen and water which are both soluble in the salt and removed from the reactants allowing the equilibrium to be pushed forward, the oxygen can react with the halogen salt producing a solid oxide which remains dispersed within the liquid and a halogen which is dissolved in the salt suspension. The hydrogen halide enters the liquid phase and contacts the suspended solid oxide producing water and a liquid salt. The water (steam) and halogen are disengaged from the liquid as the gas phase products.

BRIEF DESCRIPTION OF THE DRAWINGS

Referring now to the drawings in which like reference numbers represent corresponding parts throughout:

FIG. 8 illustrates an exemplary reaction pathway according to some embodiments.

FIG. 9 is a diagrammatic illustration of an exemplary process whereby a hydrocarbon containing gas is introduced into a reactor with a catalytic molten metal to produce low density solid carbon and hydrogen gas which are separated and the separation enhanced by virtue of a circulating bubble lift column with a lower pressure at the top than the bottom facilitating hydrogen gas removal and collection of carbon.

FIG. 21 Energy dispersive x-ray analysis from spot data of electron micrographs on carbon produced from methane pyrolysis in the metal/salt two-phase reactors described in Example 7.

DETAILED DESCRIPTION

Figure 1:
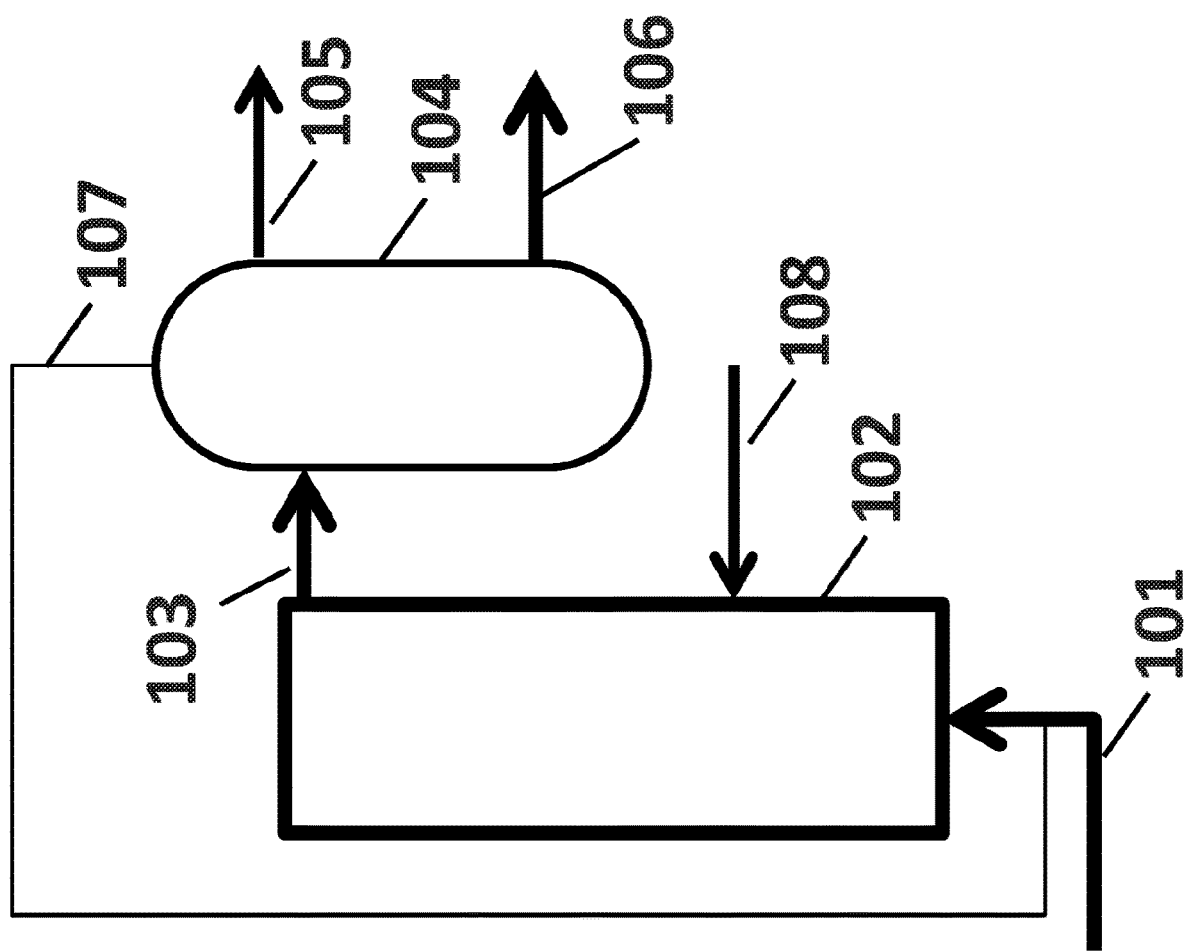
FIG. 1 is a schematic representation of the overall process according to some embodiments.

It is desirable to reduce the cost of chemical processes by combining reaction and separation steps into a single unit operation (process intensification). Many such implementations have been introduced. One particularly challenging and costly problem is the separation of the products of equilibrium limited reactions. Of particular importance is the separation of the hydrogen product from hydrocarbon dehydrogenation.

In the production of olefins (ethylene and propylene), saturated hydrocarbons are broken down or 'cracked' into smaller, unsaturated ones or dehydrogenated producing hydrogen. Cracking naptha in the presence of steam is one production method for olefins and aromatics, but the wide product distribution results in expensive separations and a complicated plant design. Steam cracking of ethane and propane is practiced in the US, with the advantage of primarily producing ethylene and propylene, respectively. This makes the plants cheaper to construct and less complicated to operate. Overall, steam cracking is an energy intensive process, thermodynamics favor high temperatures which makes the use of an oxidant such as oxygen attractive. Oxidative dehydrogenation (ODH) of ethane and propane has improved energy demands and overall conversion efficiencies of the process. However, all steam cracking plants cannot run for more than a few months without the need to pause operations to 'decoke' catalysts and furnaces with oxygen to remove deposited solid carbon. ODH processes, in fact, often spend more time decoking than they do producing olefins. Dehydrogenation is, in general, of major significance, but the hydrogen produced limits the conversion and its removal would have significant benefit.

In pyrolysis of alkane reactants, similar to the production of olefins from alkanes, alkanes of varying molecular weights and chain lengths are dehydrogenated, cracked and broken down into primarily hydrogen and varying amounts of lighter hydrocarbons, olefins, aromatics, and solid carbon. High temperatures and equilibrium restrictions favor the use of catalysts to hasten reaction rates and improve selectivities to desired products. When catalysts are used, catalyst surfaces are rapidly covered with solid carbon and deactivated (e.g., coked), only recovering their activity after burning the carbon off producing carbon oxide gases. In the pyrolysis of methane, a high-temperature arc furnace can be used to achieve high conversions to hydrogen and a valuable carbon black co-product. However, large energy inputs are required and the furnace operation must still be paused for removal of the solid carbon product. No economical alkane pyrolysis process exists in which hydrogen and a carbon product are made and continuously separated without interrupting operations.

If pyrolysis were efficient, as enabled by the systems and methods disclosed herein, then fossil hydrocarbons could be used to make hydrogen without producing carbon dioxide. At present, industrial hydrogen is produced primarily using the steam methane reforming (SMR) process, and the product effluent from the reactors contains not only the desired hydrogen product but also other gaseous species including carbon oxides (e.g., CO, $CO_2$, etc.) and unconverted methane. Separation of the hydrogen for shipment or storage and separation of the methane for recirculation back to the reformer is carried out in a pressure swing adsorption (PSA) unit, a costly and energy-intensive separation. This separation process exists as an independent unit after reaction. Overall the process produces significant carbon dioxide.

Other important chemical processes where separation of products from the reactants in the reactor would enable significantly the overall chemical process include dry reforming of alkanes with carbon dioxide and oxidation of hydrogen halides to produce molecular halogens and water (e.g. the Deacon Process).

As described herein, a specifically selected multiphase reaction environment is provided that makes possible reaction and separation of gas-phase chemical reactants and products enabled by the selection of the physical-chemical properties of the materials in the reaction environment to provide specific reactivities for desired chemical reactions and specific solubilities for products to facilitate separation and complete chemical conversion in otherwise equilibrium limited chemical reactions.

The systems are a new way of using gas-liquid and/or gas-liquid-solid interfaces in a high temperature molten metal(s), molten salt(s), with or without fixed or suspended solid particles to allow gas phase reactants to react in the gas phase or at the gas-liquid or gas-solid interface and separation of the products from the reactants by virtue of their differential solubilities and/or mobilities in the different phases.

In a preferred embodiment, an alkane reacts in or on the surface of a bubble within a specifically selected molten metal and undergoes a dehydrogenation reaction to produce hydrogen and a carbon containing product. The hydrogen is more soluble in the metal than the reactants and other products and it moves out of the gas phase within the bubble and into the liquid where is has reduced contact with the carbon. This shifts the reaction equilibrium towards the products allowing higher methane conversion within the bubble.

Described herein are a reactor systems containing specific liquids that allow for gas-phase reactants to be introduced and converted into products in the gas phase or at the liquid-gas interface and the subsequent separation of the products of reaction into the liquid phase by virtue of the solubility of the products in the liquid. In addition to the novel physical concept, specific materials and compositions that as liquids or solids suspended or fixed in the liquids, facilitating the reactions as catalysts are also disclosed. Further the liquid composition and solubility properties are distinct in that they allow for differing solubilities of the reactants and products that remove the reaction products from the site of reaction. For the specific preferred embodiment of alkane pyrolysis to produce hydrogen and solid carbon, specific compositions of the liquid and the reaction conditions allow the control of the type of solid carbon produced allowing different types and structures of carbon to be produced for different valuable applications.

In contrast to prior systems, the present systems and methods have a number of advantages. For example, the systems and processes disclosed herein produce hydrogen without any carbon oxides (e.g., CO, $CO_2$, etc.) using methane pyrolysis where methane is reacted at high temperatures to produce molecular hydrogen and solid carbon. The present systems and methods allow high pressure hydrogen to be produced and eliminate catalyst deactivation using a high temperature molten metal and/or molten salt medium. These fluid media help to eliminate deactivation by continuously regenerating the gas-catalyst interface and keeping it active by removing the solid carbon from the active catalyst sites. The present systems and methods also disclose how to keep the reaction products from reacting together, thereby allowing for high conversions to be achieved (e.g., reactive separation).

The present systems and methods provide reaction environments for performing pyrolysis of hydrocarbon gases in a catalytic environment at temperatures between 700 and 1100° C. and provide a means of separating the solid carbon from the reactor environment. Further, only a single reaction environment is used where reaction and separation of the solid carbon and gas phase hydrogen are achieved in the single reaction environment.

In the absence of a catalyst, the thermochemical reaction rates are insufficient to allow reactor size to be reduced for commercial purposed. The present systems and methods solve this problem through the use of specific compositions of molten metals with catalytic properties and melt compositions selected to facilitate separation of gas and solid products while keeping them chemically isolated. This further serves to increase the conversion of methane beyond what equilibrium would allow in a single reaction environment.

In some embodiments, the present systems and methods can perform pyrolysis of methane on a solid metal catalyst fixed or suspended within a molten metal (e.g., NiBi) and/or a molten salt (e.g., NaCl, KBr or KCl), where methane is contacted with the catalyst at about 1000° C. to produce hydrogen and solid carbon. The molten liquid properties are such that periodic contacting of the solid metal surface covered with carbon from pyrolysis promotes the wetting of the metal surface with the liquid and the removal of the carbon from the surface into the melt regenerating the catalytic surface with the molten liquid. This reaction configuration exploits the gas-solid, liquid-solid, and carbon-liquid interactions and wettability properties as a means of separating contamination-free carbon from the metal surface.

In some embodiments, the present systems and methods can perform pyrolysis of methane in a molten metal (e.g., NiBi)/molten salt (e.g., KBr/NaBr) two-phase bubble column at about 1000° C. in order to extract Ni and Bi from the developing solid carbon and return them to the dense lower phase while floating the low density carbon to the surface of the molten salt. This reaction configuration exploits the carbon-salt interaction and wettability properties as a means of separating the metal contaminations from solid carbon and recovering metal-free carbon on the surface of the salt.

In some embodiments, specific compositions of liquids used in the systems and processes described herein can provide for different types of carbon products. A composition of molten materials for performing alkane pyrolysis can include a metal having a high soluble for carbon including but not limited to alloys of Ni, Fe, Mn, which produce a carbon product which is mostly graphitic type carbon. A composition of molten materials for performing alkane pyrolysis can include a metal which has limited solubility to carbon including but not limited to alloys of Cu, Sn, Ag, which produce a carbon product which is mostly disordered type carbon. A composition of molten materials for performing alkane pyrolysis can include a molten salt which has limited solubility to carbon and produces a carbon product which is nanostructured and disordered.

The present systems and methods also rely on the fluid phase interactions a gas bubble exits the interface of the molten metal to the salt phase. When this occurs, the metal film ruptures and small metal droplets are generated. In addition, some carbon layers fluidize in the salt phase and the other layers float to the surface. According to the KBr and NaBr densities at 1000° C. (~1.91 $g \cdot cm^{-3}$ and ~2.14 $g \cdot cm^{-3}$, respectively), the carbon will float to the NaBr surface and fluidize in KBr. When carbon particles are not wetted by the salt, they can be captured by gas bubbles and floated to the gas-salt interface and maintained in a separate chemical environment preventing their back reaction with any hydrogen generated in the reaction.

In some embodiments, a reactor can be used to carry out the reactions and methods described herein. As illustrated schematically in FIG. 1, one or more chemical reactant streams 101 comprising at least one chemical that is a gas can be introduced into a reactor 102 containing liquid media in one or more phases and/or liquid and solid media whereby at least one of which is a catalyst for conversion of gas phase reactants to one or more products. By virtue of the specific physical properties of the liquid media, separation of the reaction products 103 is facilitated in one or more separation systems 104 to produce separate final chemical product streams 105 and 106 and return any unreacted reactants or incompletely reacted products to the reactor 102 through a recycle line 107. The separation systems are described in more detail herein. Heat may be produced and/or required for the reactor and the liquid media within the reactor, where the heat can be facilitated using a heat source 108 such as an external or internal heat exchanger.

The chemical reactant stream or streams 101 can comprise a hydrocarbon such as methane, ethane, propane, etc. and/or mixture such as natural gas. In some embodiments, a common source for methane is natural gas which may also contain associated hydrocarbons ethane and other alkanes and impurity gases which may be supplied into the inventive reactor system. The natural gas also may be sweetened and/or dehydrated prior to being used in the system. The methods and apparatus disclosed herein can convert the methane to carbon and hydrogen, and may also serve to simultaneously convert some fraction of the associated higher hydrocarbons to carbon and hydrogen.

At a high level, the present systems and methods may be described as hydrocarbon gas pyrolysis in a multi-phase reactor system, or more specifically, the conversion of natural gas to separable carbon and hydrogen via pyrolysis of methane in a multi-phase reactor system utilizing a liquid to remove the carbon. The reactor system generally includes at least one reactor in which or into which a liquid may be introduced to contact methane and/or carbon.

According to some embodiments, the chemical reactant stream 101 comprising methane can be converted to hydrogen and solid carbon by contacting the methane in a reactor with specific high temperature molten or solid catalysts at temperatures between 700° C. and 1500° C., or alternatively between 900° C. and 1100° C. The chemical reactant stream can be introduced at a pressure of between 0.1 and 100 bar, and more preferably between 1 and 30 bar. The hydrogen and carbon produced by pyrolysis occurs in the reaction run at a high temperature with a supply of heat, and a means of continuously recovering the solid carbon as an uncontaminated product. The high temperatures, the rapid supply of heat, and the recovery of the carbon without contamination have been a significant barrier to commercialization of pyrolysis.

A part of the systems and methods disclosed herein is the recognition that previously used molten metals such as lead and tin were not catalysts and/or did not exhibit catalytic behavior. It has been recognized herein that specific metal combinations could be creatively designed to serve as catalysts that allow the use of lower reaction temperatures and/or smaller, less costly, reactors, thereby overcoming the limitations of the prior art. Further, it is recognized herein that the previously used molten metals had little or no solubility of the carbon and/or hydrogen products and their properties did not allow for separation of uncontaminated carbon. The conversion of methane to hydrogen and carbon using prior systems is thus limited by equilibrium, especially at high methane pressures. The present systems and methods describe specific molten materials with high solubility for hydrogen and/or carbon which limits the back reaction rate and allows an increase in the methane conversion. Further, the interactions of specific molten materials allow the solid carbon to be removed from the reactor overcoming the limitations of the prior art.

In some embodiments, the liquids in the reactor can comprise molten salts that have high solubilities for carbon, solid carbon particles or properties that facilitate solid carbon suspension making them suitable media for the reactive-separation of hydrocarbon dehydrogenation processes, such as methane pyrolysis. The transport of solid carbon or carbon atoms in molten salts away from the gas phase reactions within bubbles would be effective in increasing the reactant conversion, as most thermal hydrocarbon processes have solid carbon formation. The affinity of solid carbon in molten salts is specific to the salt and can vary greatly.

In some embodiments, the liquids in the reactor can comprise molten metals, metal alloys, and molten metal mixtures that have high solubilities for hydrogen and low solubilities for alkanes, making them suitable media for the reactive-separation of hydrocarbon dehydrogenation processes, such as methane pyrolysis. The transport of solid carbon or carbon atoms in molten metals could play a similar role as hydrogen in the effective increase in reactant conversion, as most thermal hydrocarbon processes have solid carbon formation. The solubility of solid carbon in molten metals is specific to the metal and can vary greatly.

In some embodiments, a catalytic liquid may consist of a low-melting point metal with relatively low activity for the desired reaction combined with a metal with higher intrinsic activity for the desired reaction, but with a melting point above the desired operating temperature of reaction. The alloy may also consist of an additional metal or metals which further improve the activity, lower the melting point, or otherwise improve the performance of the catalytic alloy or catalytic process. It is understood and within the scope of the present disclosure that the melting point of a catalytic alloy may be above the reaction temperature, and the liquid operates as a supersaturated melt or with one or more components precipitating. It is also understood and within the scope of the present disclosure that one or more reactants, products, or intermediates dissolves or is otherwise incorporated into the melt and therefore generates a catalytic alloy which is not purely metallic. Such an alloy is still referred to as a molten metal or liquid phase metal herein.

The selection of the metal or metals can be based on the catalytic activity of the selected metal. The reactivity of molten metals for catalytic purposes is not well documented or understood. Current preliminary results suggest that metals in the liquid phase have far less activity for alkane activation processes than in their solid phases. Additionally, the differences in activity across different molten metals is far less when compared to the differences in solid metals for catalysis, which differ by orders of magnitudes in terms of turnover frequencies of reactant molecules.

In some embodiments, the liquid comprising a molten metal can comprise nickel, bismuth, copper, platinum, indium, lead, gallium, iron, palladium, tin, cobalt, tellurium, ruthenium, antimony, gallium, oxides thereof, or any combination thereof. For example, combinations of metals having catalytic activity for hydrocarbon pyrolysis can include, but are not limited to: nickel-bismuth, copper-bismuth, platinum-bismuth, nickel-indium, copper-indium, copper-lead, nickel-gallium, copper-gallium, iron-gallium, palladium-gallium, platinum-tin, cobalt-tin, nickel-tellurium, and/or copper-tellurium.

The specific composition of the alloys also influenced the catalytic activity. In some embodiments, the components of the molten metal can comprise between 5 mol. % and 95 mol. %, or between 10 mol. % and 90 mol. %, or between 15 mol. % and 85 mol. % of a first component, with the balance being at least one additional metal. In some embodiments, at least one metal may be selected to provide a desired phase characteristic within the selected temperature range. For example, at least one component can be selected with a suitable percentage to ensure the mixture is in a liquid state at the reaction temperature. Further, the amount of each metal can be configured to provide the phase characteristics as desired such as homogeneous molten metal mixture, an emulsion, or the like.

In some embodiments, the catalytic solid metal can comprise nickel, iron, cobalt, copper, platinum, ruthenium, or any combination thereof. The solid metals may be on supports such as alumina, zirconia, silica, or any combination thereof. The solids catalytic for hydrocarbon pyrolysis would convert hydrocarbons to carbon and hydrogen and subsequently be contacted with a liquid molten metal or molten salt to remove the carbon from the catalyst surface and regenerate catalytic activity. Preferred embodiments of the liquids include but are not limited to molten metals of: nickel-bismuth, copper-bismuth, platinum-bismuth, nickel-indium, copper-indium, copper-lead, nickel-gallium, copper-gallium, iron-gallium, palladium-gallium, platinum-tin, cobalt-tin, nickel-tellurium, and/or copper-tellurium. The molten salts can include, but not limited to, NaCl. NaBr, KCl, KBr, LiCl, LiBr, $CaCl_2$, $MgCl_2$, $CaBr_2$, $MgBr_2$ and combinations thereof.

In some embodiments, specific compositions of molten metal(s) used in the systems and processes described herein can provide for different types of carbon products. A composition of molten materials for performing alkane pyrolysis can include a metal having a high soluble for carbon including but not limited to alloys of Ni, Fe, Mn, which produce a carbon product which is mostly graphitic type carbon. A composition of molten materials for performing alkane pyrolysis can include a metal which has limited solubility to carbon including but not limited to alloys of Cu, Sn, Ag, which produce a carbon product which is mostly disordered type carbon.

The separation systems can include mechanical separation systems and/or chemical separation systems. For example, the carbon can be physically removed as a solid stream, using for example, mechanical conveyors to move the carbon. In some embodiments, the solid carbon at the surface of the melt is contacted with a high velocity (e.g., sufficient velocity to entrain the solids) of gas (e.g., possibly recirculated hydrogen or an inert gas) causing the fine solid particles to be entrained in the gas and exit the reactor with the gas. The solid carbon removed using a gas can be later separated using traditional gas-solid separation methods (cyclone, electrostatic precipitation, etc.).

Figure 2:
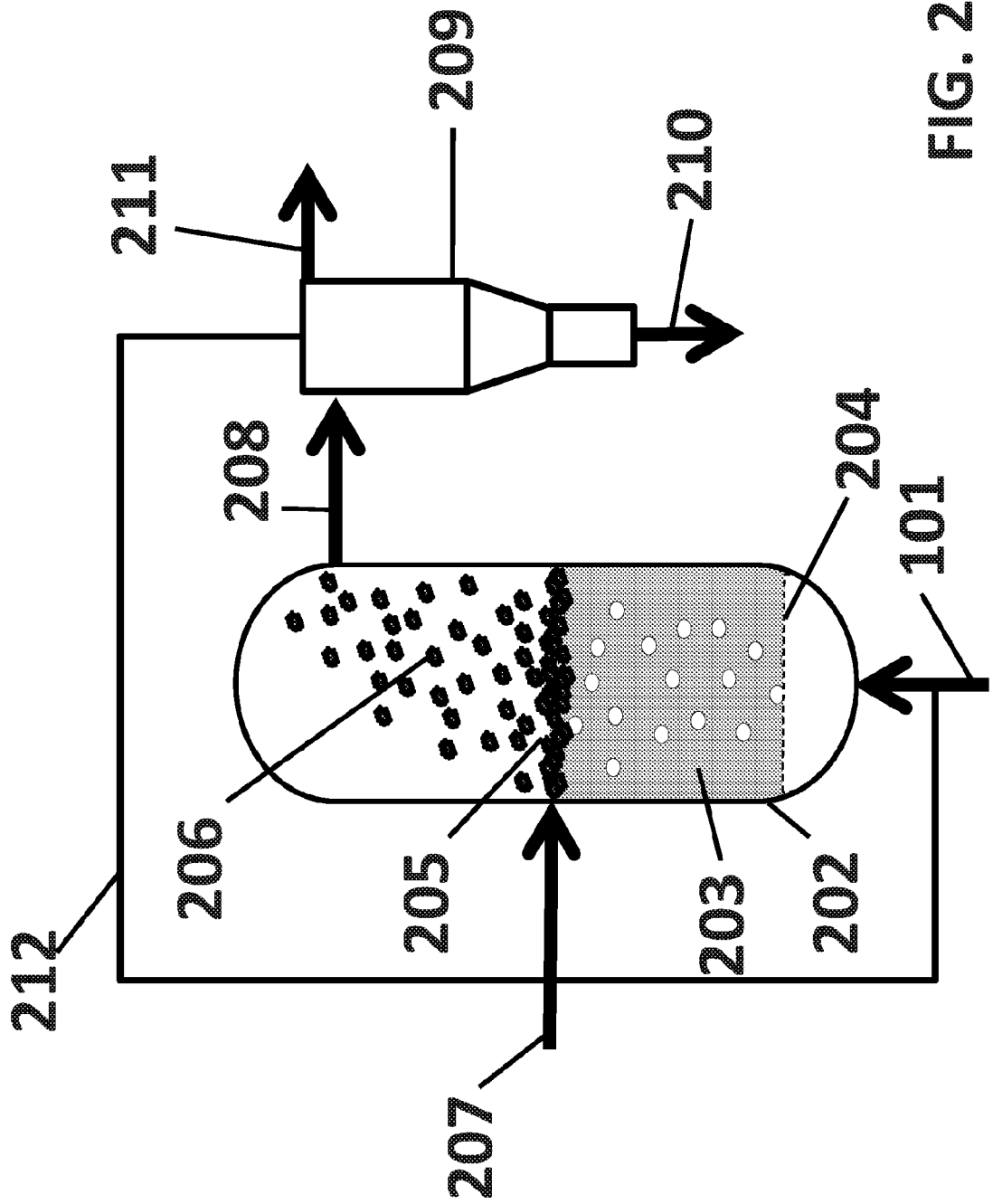
FIG. 2 illustrates an exemplary embodiment of a reactor system.

The separation of the carbon from the reactor can be performed within the primary reactor vessel that is filled with a specifically selected molten material that, by virtue of its properties of not wetting the carbon allows the solid carbon accumulated at the surface of the liquid to be entrained in a moving gas passing over and/or through the carbon. As illustrated schematically in FIG. 2, one or more hydrocarbon chemical reactant streams 101 can be introduced as a gas through a distributor 204 into a reactor 202, whereby carbon can be produced either in or on the liquid metal and/or salt and/or solid as described by the other embodiments disclosed herein. The reactant stream, a liquid phase can comprise any of those described herein. The carbon 206 can become suspended in the liquid media 203 and accumulate at the surface of the liquid media 203. By virtue of the specific physical properties of the liquid media and any solid carbonaceous products formed from thermal decomposition of the gas-phase reactants, the solid carbon materials can segregate on the surface of the liquid 205. By virtue of the material choices, the solid carbon can be entrained in the product gas flowing about (e.g., over, above, and/or on) the surface 206. In some embodiments, additional gas, including recirculation of the hydrogen product gas, may be added as a carrier 207 to provide more favorable fluidization properties of the carbonaceous materials. The gas-phase products and the entrained solid carbon particles can be removed together through a product line 208 from the reaction vessel 202 and separated using additional unit operations 209. Various separation processes can be employed to separation the fluidization gas from the solid carbon. For example, direct gas filtration can be used to remove solid particles of carbon in the gas stream. As shown in FIG. 2, a cyclone separator can be employed to achieve the gas-solid separation whereby solid particles exit the bottom of the cyclone 210 and gaseous products 211 can be either collected and post-processed, or recycled and returned through a recycle line 212 to the initial reactant stream 101 for further catalytic decomposition. Alternative filtration processes can include filtration with size exclusion as part of the separation scheme as would be familiar to those skilled in the art with the benefit of this disclosure.

Figure 3:
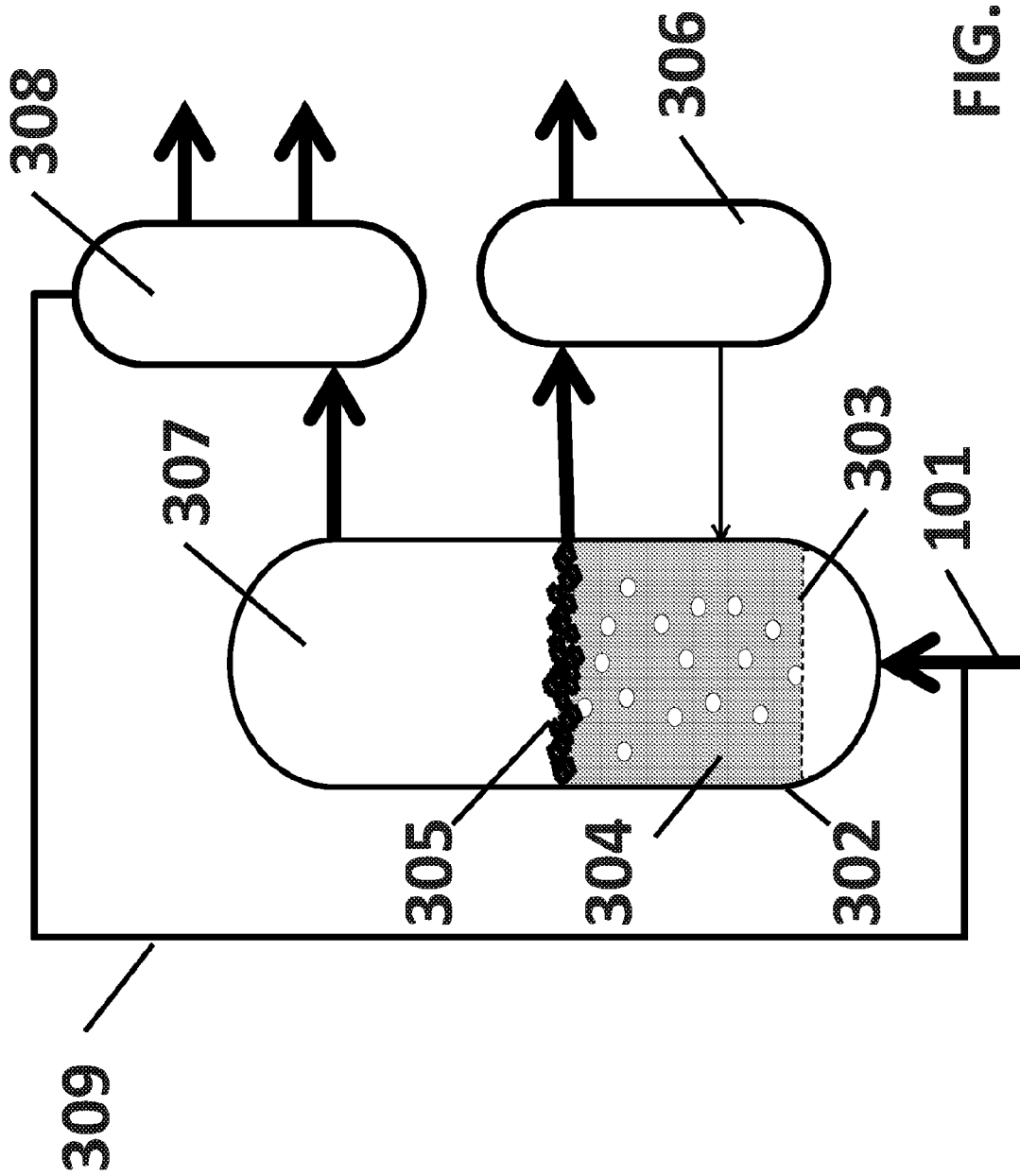
FIG. 3 is a diagrammatic illustration of an exemplary process whereby a hydrocarbon containing gas is introduced into a reactor with a catalytic molten metal to produce low density solid carbon and hydrogen gas which are separated.

A carbon collection vessel can be used to collect and retain the carbon produced during the reaction process. As illustrated schematically in FIG. 3, an embodiment of system can include a chemical reactant stream 101 comprising methane and/or natural gas hydrocarbon components being introduced into a reactor 302 containing a molten metal 304 that has a specific composition that makes the melt catalytic for methane pyrolysis. The chemical reactant stream and/or the molten metal can comprise any of those metals disclosed herein (e.g., described with respect to FIG. 1, etc.). In some embodiments, the molten metal can include Ni and a lower melting temperature metal (e.g. Bi, Cu, Sn, Pb, Ga, etc.). The chemical reactant stream can be in the gas phase and can be bubbled into the reactor through a distributor 303 (or 403) to react to form products as the bubbles rise to the surface of the liquid in the reactor. At the liquid surface, the hydrogen product and any other gases can disengage from the liquid and solid in a disengagement region 307 before leaving the reactor and entering a gas separation unit 308. A purified hydrogen product can be produced in the gas separation unit 308 and any unreacted feed of byproducts can be recycled to the reactor through a recycle line 309. The lower density solid 305 (e.g., solid carbon) can aggregate on top of the molten metal 304 as a separate phase and be removed from the reactor into a separation unit 306 where the solid carbon can be separated from the molten metal while the molten metal is returned to the reactor 302. Heat addition may be required for the reactor to remain in steady-state and the heat may be added to the liquid in reactor 302 (e.g., using internal or external heat exchange), in the separation unit 306, and/or using a separate heat exchanger in the process.

In some embodiments, the reactor 302 can comprise a bubble column reactor. There are many bubble column reactor designs with the gases introduced through inlet tubes suspended in the reactor, through perforated distributors at the bottom of the reactor, or through fritted elements at the bottom of the reactor. The gas phase can form the continuous phase or the liquid can form the continuous phase. In either flow regime, the reaction can occur at the gas-liquid interface. The amount of reactive surface area or gas-liquid contact area that a bubble column manifests depends on the height of the liquid media, the size of the individual gaseous bubbles, and the total flowrate of gases into the bubble column. It is assumed that mass transfer is encouraged in smaller diameter bubbles, as the diffusion distance from gas to liquid is shortened relative to larger bubbles. Smaller bubbles could easily be formed by sparging the gas in the liquid which would also increase the amount of reactive surface area per volume of gas in the liquid column. Bubble columns present a unique opportunity to perform a reactive-separation, especially for hydrocarbon processes that produce hydrogen and carbon. As the reaction progresses at the bubble interface, soluble species can be easily transported away from the local reacting environment of the bubble.

In some embodiments, a molten salt cap can be used in the reactor design. Systems that use molten metals for hydrocarbon pyrolysis typically obtain solid carbon with significant metal contamination. Another aspect of the systems and methods disclosed herein is the recognition that producing a solid carbon product that is free of metal contamination is important to obtaining value for the carbon co-product and that adding a molten salt cleaning layer on top of a catalytic molten metal would overcome previous limitations. As illustrated schematically in FIG. 4, a chemical reactant stream 101, which can comprise methane and/or natural gas hydrocarbon components, can be introduced through a distributor 403 into a reactor 402 containing a catalytic molten metal 404 (e.g., a molten metal, a molten metal mixture, alloy, emulsion, etc.) and a separate liquid phase of a less dense molten salt 409. The chemical reactant stream and/or the molten metal can comprise any of those metals disclosed herein (e.g., described with respect to FIG. 1, etc.). The molten salt phase can have a specific composition that provides for a density, carbon solubility, and wettability to facilitate separation of solid carbon 405 on the top of the molten salt 409 and return metal removed from the carbon as it passes through the molten salt to the lower reactor layer 404. At the gas-liquid interface, the hydrogen product and any other gases disengage from the liquid and solid in a disengagement region 407 before leaving the reactor and entering a gas separation unit 408 where a purified hydrogen product can be produced and any unreacted feed of byproducts can be recycled to the reactor. The solid carbon product can be transferred to a separate separation unit 406 in some embodiments.

The molten salt layer 409 serves two roles. First the molten salt suppresses evaporation of any molten metal, and second, molten salt facilitates solid carbon separation. When the molten salt exhibits hydrogen solubility, the hydrogen solubility in the molten metal can provide for enhanced conversion limits from equilibrium.

Molten salts are a low vapor pressure liquid that can exhibit differential solubility for reaction products. Often they have little to no solubility for species such as hydrogen or carbon, however, for water and halogens they can have high solubility. Further, redox active salts can facilitate reactions such as those involving relatively insoluble oxygen by reacting to form metal oxides. Molten salts can also solvate electrons which in themselves are strong Lewis base catalysts. In some embodiments, the molten salt can comprise chlorides of sodium, potassium, magnesium, lithium, and any combinations thereof.

In some embodiments, specific compositions of liquids used in the systems and processes described herein can provide for different types of carbon products. As noted above, the selection of the molten metal composition can affect the structure of the carbon produced. Similarly, a composition of the molten salt which has limited solubility to carbon can produce a carbon product which is nanostructured and disordered.

In some embodiments, the reactor can comprise a packed bed or slurry bed reactor. Another part of the systems and methods disclosed herein is the recognition that solid catalysts previously used for pyrolysis and other hydrocarbon reactions would deactivate when solid carbonaceous deposits developed on their surfaces (e.g., due to coking, etc.). The present systems and methods describe a solution to this important problem by the use of specific liquid compositions that remove the carbon from the surface to expose again the reactive catalyst surface. As illustrated schematically in FIGS. 5A-5D, a chemical reactant stream, which can comprise methane and/or natural gas hydrocarbon components, can contact a solid catalyst in a packed bed or slurry bed reactor and reacts to form hydrogen gas and a solid carbon product, which can build up on the surface of the catalyst and deactivate the catalyst over time (e.g., steps 5A-5B). The chemical reactant stream can be comprised of methane or other hydrocarbon and the solid catalyst can comprise any of the well-know solid catalysts for pyrolysis that are compatible with specific molten liquid. Specifically the metals may be nickel, iron, cobalt, copper, platinum, ruthenium, rhodium, or any combination thereof and they may or may not be supported on common supports (e.g., alumina, silica, zirconia, etc.). A liquid can then be introduced into the reactor with specific properties in order to remove the solid carbon from the metal catalyst surface. The liquid is selected so that i) it wets the solid catalyst surface and removes the solid carbon, and ii) the liquid suspends the solid carbon and forms a separate phase from the liquid allowing the carbon to be transported in the liquid away from the catalytic metal surface to the top of the liquid (e.g., steps 5C-5D) or with some less dense liquids, to the bottom of the liquid.

Figure 6:
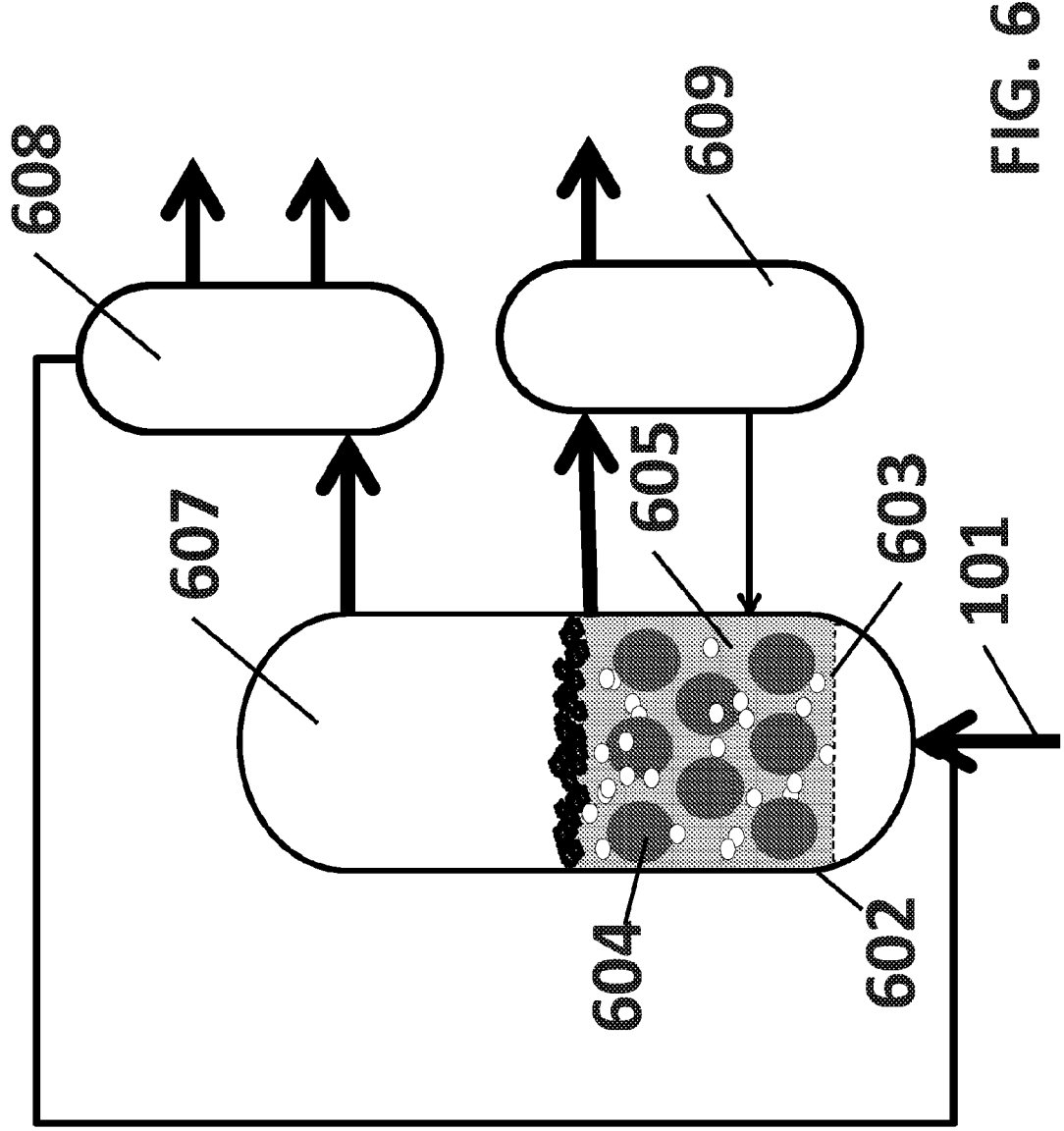
FIG. 6 is another diagrammatic illustration of an exemplary process whereby a hydrocarbon containing gas is introduced into a reactor containing a solid catalyst and a liquid. The hydrocarbon gas reacts with the solid catalyst to produce hydrogen gas and carbon on the solid catalyst surface. The liquid removes the solid carbon as it is produced and the solid carbon is separable from the liquid.

In the process illustrated schematically in FIG. 6, a chemical reactant stream 101, which can comprise methane and/or natural gas hydrocarbon components, can be introduced into a reactor 602 containing a solid catalyst 604 active for methane pyrolysis. The chemical reactant stream and/or the molten metal can comprise any of those metals disclosed herein (e.g., described with respect to FIG. 1, etc.). In some embodiments, the solid catalyst contains one or more metals, which can include, but are not limited to: Ni, Fe, Co, Cu, Ru, and/or Pt. The reactor can be maintained at a temperature of between 600° C. and 1300° C. The reactor also contains a liquid 605 and the gas can be bubbled into the reactor through a distributor 603. The reactant gas reacts on the solid catalyst surface to form hydrogen gas and solid carbon products at the solid surface. The specifically selected liquid can remove the solid carbon from the solid catalyst surface to help reduce or prevent catalyst deactivation while suspending the carbon in the liquid where it is transferred and allowed to aggregate at the surface of the liquid. At the liquid surface, the hydrogen products and any other gases can disengage from the liquid and solid in a disengagement region 607 before leaving the reactor and entering a gas separation unit 608 where a purified hydrogen product can be produced and any unreacted feed of byproducts recycled to the reactor. The lower density solid carbon can aggregate on top of the liquid as a separate phase and be removed from the reactor into a separation unit 609 where the solid carbon is separated from the liquid and the liquid returned to the reactor. Heat can be transferred to the reactor to retain the reaction in a steady-state, and the heat may be added to the liquid in reactor 602, in the separation step 609, and/or using a separate heat exchanger.

As noted above, solids can be present in and/or suspended in the molten metal and/or molten salt. The incorporation of solid catalyst particles into a liquid metal can increase the catalytic surface area. Solid catalysts could be advantageously chosen based on their known catalytic performances and their propensity to form bonds with carbon. This propensity must be outweighed by the tendency for deposited carbon to dissolve into the liquid media due to carbon solubility in order to ensure the reactive system does not succumb to plugging from coke deposition, as many hydrocarbon processes do.

In some embodiments, a solid catalyst can be used with a molten metal and/or molten salt solvent. Another part of the systems and methods disclosed herein is the recognition that solid catalysts previously used for pyrolysis and other catalytic reactions of methane or other hydrocarbons that are deactivated from solid carbon deposited on the solid surface can be reactivated by removal of the carbon from the surface into specific molten liquids. The systems can comprise solid catalysts disposed in a liquid such as a molten metal, metalloid, alloy, molten salt, or the like. For example, a solid catalyst can be used with a molten salt solvent (e.g., with or without a molten metal). The molten liquids can include any of those described herein. Solid catalysts could be advantageously chosen based on their known catalytic performances and their propensity to form bonds with carbon. This propensity must be outweighed by the tendency for deposited carbon to dissolve into the liquid media due to carbon solubility in order to ensure the reactive system does not succumb to plugging from coke deposition. In some embodiments for hydrocarbon gas pyrolysis, the gas (preferably natural gas or methane, ethane, and/or propane) can reacts on the solid surface of the solid catalyst, which can include a metal such as Ni, Fe, Co, Ru, Pt, and/or metal oxide to form hydrogen and carbon. The active catalyst may be supported on common supports such as alumina, silica, and zirconia.

Figure 7:
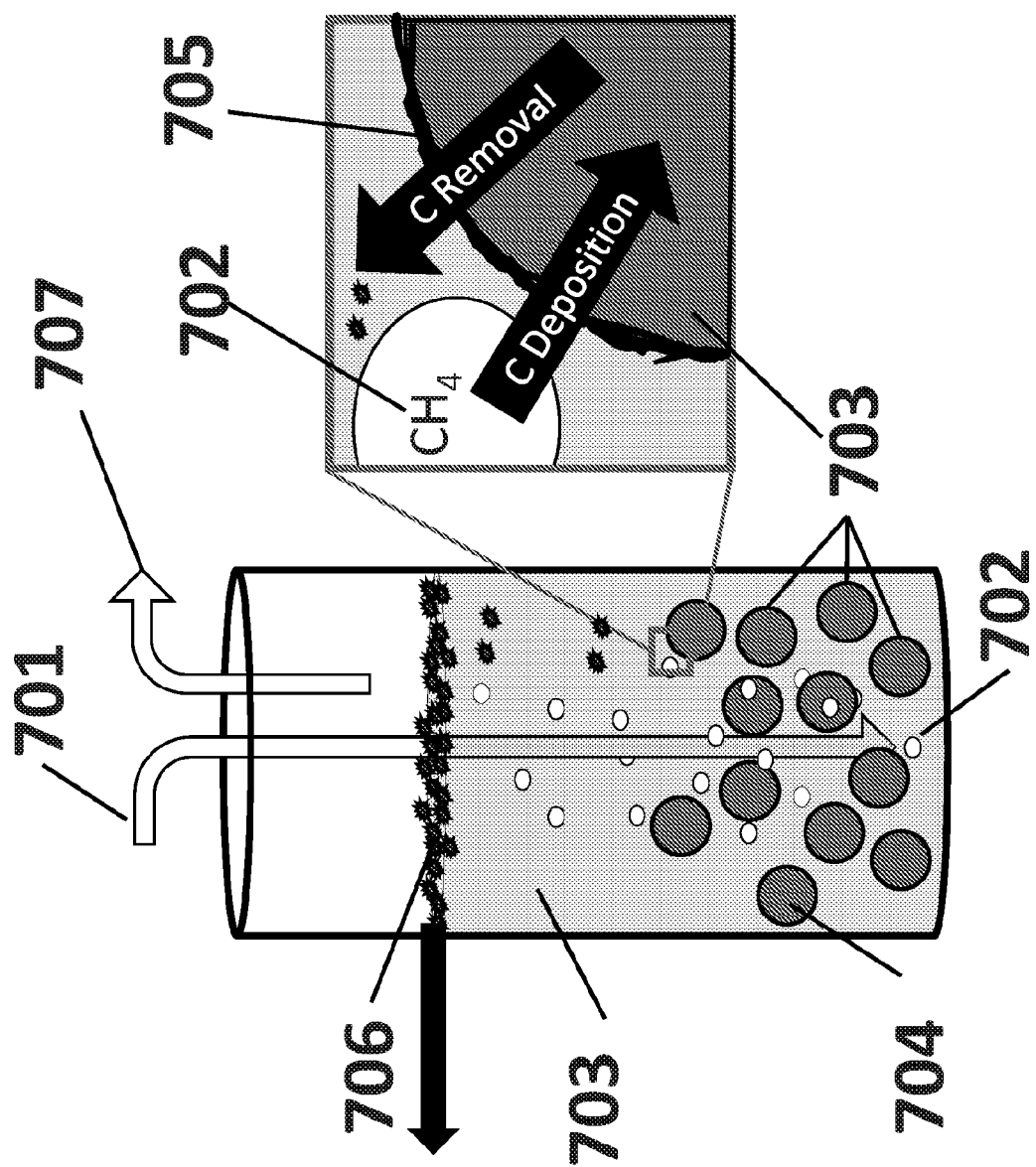
FIG. 7 illustrates schematically another exemplary embodiment whereby solid carbon deposited on solid catalysts is removed by virtue of its interaction with the specific liquid in the reactor which prevents catalyst deactivation.

Referring to FIG. 7, for example, a hydrocarbon reactant stream 701 (e.g., which can comprise methane) can be introduced into a reactor in gas phase bubbles 702 within a high temperature liquid 703. The chemical reactant stream and/or the molten metal can comprise any of those metals disclosed herein (e.g., described with respect to FIG. 1, etc.). The gas phase reactants can contact the surface of solid catalysts 704, which can be fixed or suspended in the reactor. The gas phase reactants can react to form gas phase products (e.g., $H_2$) and deposit solid carbon on the solid catalyst surface 705. By virtue of the specific composition of the liquid, the carbon in contact with the liquid can be continuously removed and surrounded by the liquid preventing further reactions. The continuous removal of the aggregated carbon 706, which has density and floatation differences with respect to the liquid, allows high conversion of the methane with limited back reaction of the hydrogen with the solid carbon. The gas phase hydrogen product 707 can be removed from the reactor.

The system as described with respect to FIG. 7 can also be considered a reactive separation system that can be used in a reactor packed with solid materials active for the reaction of interest and present as a suspension or in a packed stationary bed surrounded by liquid(s). The high activity surface produces products which have a higher solubility in the liquid than the reactants and are removed from the gas phase. In some embodiments, the gas (e.g., natural gas or methane, ethane, and/or propane) can react on the solid surface (e.g., of a solid catalyst such as a metal eg. Ni, Fe, Co, Ru or metal oxide) to form hydrogen and carbon. The surrounding liquid (e.g., any of the molten metal, metalloid, and/or alloys described herein, including but not limited to Ni, Fe, Co, Ru, In, Sb, Sn, Bi or a molten salt, including but not limited to Na, K, Li chlorides) can serves to: i) pull hydrogen out of the gas phase and into the liquid by virtue of its solubility, and/or ii) remove the carbon produced on the solid catalyst surface by virtue of its carbon solubility in the liquid, or the greater wettability (affinity) of the surface for the liquid than for the carbon. The carbon can be removed from the active surface and float away from the surface carried by the liquid and separated at another location in the reactor using standard liquid solid separation methods (e.g. floatation or density). Removal of the carbon from the solid surface by the liquid interaction with the surface maintains an active solid surface and separates the carbon to the top of the reactor.

Figure 28A:
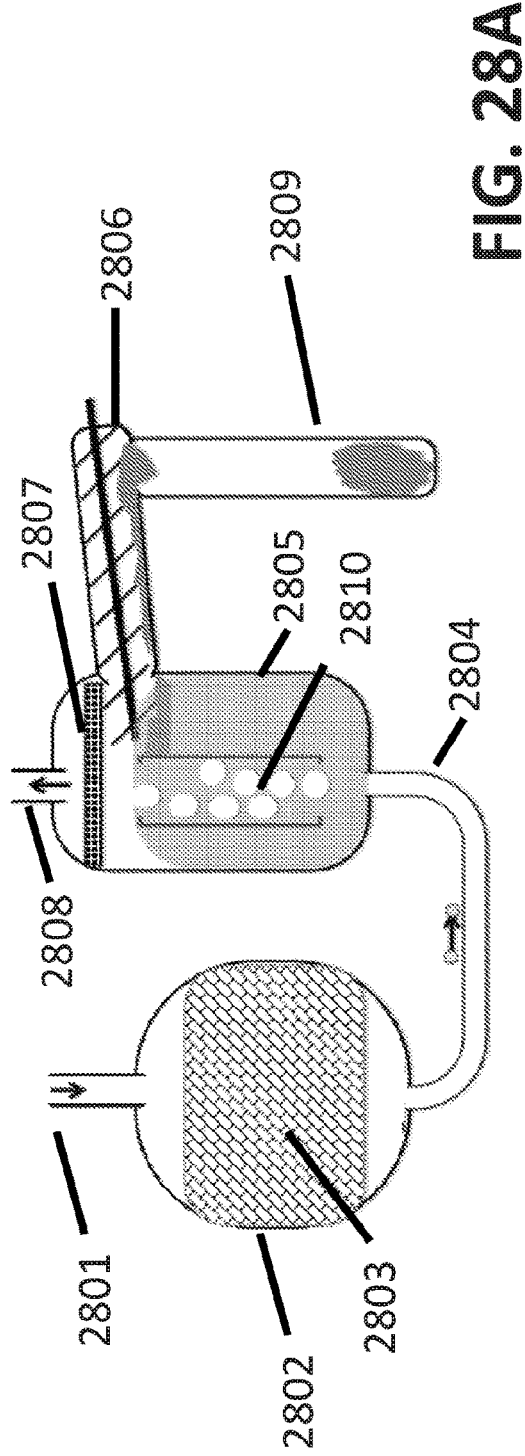
FIGS. 28A and 28B illustrate an embodiment of a cyclic reactor system whereby solid carbon is produced on solid fixed catalysts first, then the carbon is removed from the solid catalyst by a molten liquid.
Figure 28B:
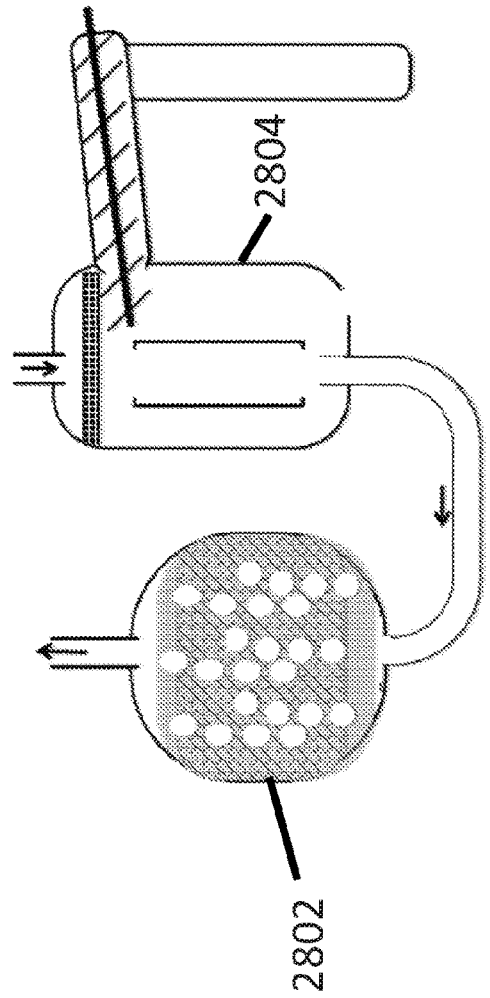

In an embodiment of a reactor configuration shown schematically in FIG. 28A-28B, a bed of solid catalyst 2803 within a reactor vessel 2802 is contacted with a hydrocarbon gas feed through an inlet 2801 which flows through the bed and out the bottom through a connecting conduit 2804 to a second reactor section 2805 pushing as it goes, molten liquid (molten metal or molten salt) out of reactor 2802 and allowing the solid catalyst bed 2803 to react with the gaseous hydrocarbon to produce solid carbon. The hydrocarbon gas feed can comprise any of the hydrocarbon feeds described herein. In a portion of the cycle, the liquid can cover the solid catalyst and remove the solid carbon. When the liquid is pushed out, the liquid can carry the carbon into the reactor 2805, where it can be removed using a solid/liquid separation system 2806 to separate the solid carbon 2809. The hydrogen gas 2810 produced on the solid bed in reactor 2802 can pass through the liquid medium in the reactor 2805 and flow out of reactor 2805 through an outlet 2808 and any residual vapor can be removed with a demister 2807 or other gas liquid separation system. Once the catalyst bed is deactivated from solid carbon, the flow direction can be reversed, and the molten liquid can be pushed by the gas from reactor 2805 over to reactor 2802 to fully contact the carbon on the solid catalyst. Once the carbon on the solid catalyst is removed and mobilized into the liquid the process can be repeated in a cyclic manner.

As shown in FIG. 8, the general concept captured in certain aspects of the systems and methods disclosed herein starts with the fact that reversible reactions including hydrocarbon pyrolysis (e.g., methane pyrolysis) can react with a maximum conversion, X, of the reactants in a closed system determined by the equilibrium constant. Thus, the final concentration of reactant $[A]_{equilibrium}$ may not be low and require separation.

At high pressures, the maximum methane conversion is significantly limited. Liquid compositions have been developed as described herein where the methane is not soluble and remains in the gas phase bubbles. However, in some selected liquids, hydrogen can enter the liquid phase and/or carbon can enter the liquid phase where they are prevented from contacting one another at rates that are higher than they are removed from the reactor. The properties of the liquids allow a "reactive separation" of the products away from the reactants and each other. The reactions are shown in FIG. 8 for methane pyrolysis, however, the basic concepts are true of any reversible reaction where the products are removed from the phase in which they were produced and their backwards reaction rates inhibited.

Thus, the high temperature liquid serves as a medium in which the products are caused to be produced and then separated from one another, thereby allowing otherwise equilibrium limited reactions to be pushed to higher conversions. In some embodiments, the reaction medium can be a molten metal alloy having catalytic properties, including any of those disclosed herein. In some embodiments, the molten metal can comprise Ni and Bi which has a high solubility for both hydrogen and carbon. At approximately 1000° C. the reaction proceeds when methane is bubbled into the molten metal melt and the hydrogen is removed from the gas phase bubble of methane as it is made. The carbon can also be pulled away from the reaction. This can help to reduce or prevent the carbon from reacting with the hydrogen before both are removed from the reactor. The hydrocarbon gas in the bubble cannot enter the liquid phase, and the hydrocarbon can react to nearly 100% conversion.

In some embodiments, a circulation mechanism can be included within the reactor system. The reactor configuration can be used to complement the properties of the specific liquid as shown schematically in FIG. 9. As shown, a chemical reactant steam 101 comprising a hydrocarbon gas (e.g., methane and/or natural gas hydrocarbon components) can be introduced into a reactor 902 containing a molten metal 904 that has a specific composition that makes the melt catalytic for methane pyrolysis and has a high solubility for hydrogen. The chemical reactant stream and/or the molten metal can comprise any of those metals disclosed herein (e.g., described with respect to FIG. 1, etc.). In some embodiments, the molten metals can include Ni and a lower melting temperature metal (e.g., Bi, Cu, Sn, Pb, and/or Ga). The gas can be bubbled into the reactor through a distributor 903 and react to form products as the bubbles rise to the surface of the reactor. The reactor pressure at the bottom of the motel metal is greater than at the top. Due to the pressure gradient, the hydrogen is thus less soluble at the top 905 and can more readily degas from the liquid. A separator 909 can be used to allow the bubble lift to circulate the melt upwards (e.g., on the left in FIG. 9) and carry the carbon over the separator into a side channel (e.g., to the top right in FIG. 9) where the carbon can be removed as a separate phase and removed from the reactor into a separation unit 906. The solid carbon can be separated from the molten metal and the metal returned to the reactor from the separation unit 906. At the liquid surface, the hydrogen product and any other gases can disengage from the liquid and solid in a disengagement region 907 before leaving the reactor and entering a gas separation unit 908. A purified hydrogen product can be produced in the gas separation unit 908 and any unreacted feed of byproducts can be recycled through a recycle line 909 to the reactor 902.

In some embodiments, a reactor can have an outlet that is separated from an inlet of the gaseous reactants. This can allow a portion of the products that are soluble in the liquid phase to exit the reactor at a separate point from any unreacted gaseous reactants. Referring to FIG. 10A-10D, for example, the chemical reactant stream 101 can be introduced 1002 to a molten media 1003. The chemical reactant stream and/or the molten metal can comprise any of those metals disclosed herein (e.g., described with respect to FIG. 1, etc.). A portion of the reaction products 1004, 1005 can be removed at a first location, while another portion comprising one or more reaction products 1006, 1007 can be completely or partially transported in the molten media to be removed in a separate location. By virtue of the specific physical properties of the molten media 1003, transport of some products can be facilitated.

The molten media 1003 can comprise any of the molten metals described herein. In some embodiments, the molten media 1003 can comprise a molten salt layer on top of one or more sides of the reactor (e.g., any of the molten salts described herein). The gaseous reactants can comprise methane and/or other hydrocarbon gases.

Figure 10B:
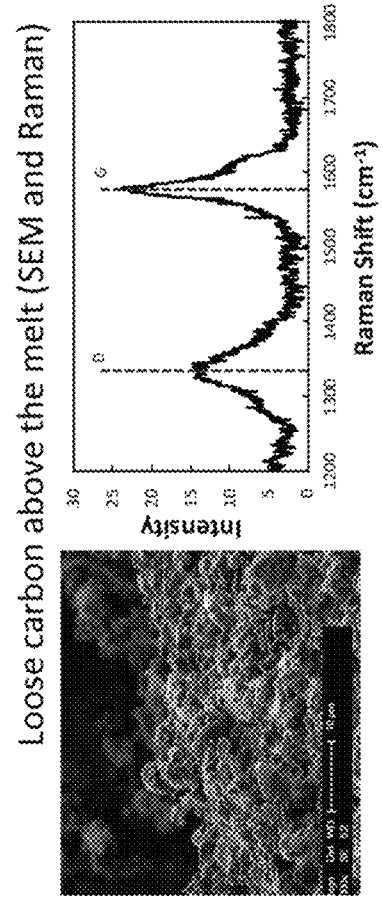
FIGS. 10A-10D are a schematic representation of the separation of one or more products using a melt.
Figure 10C:
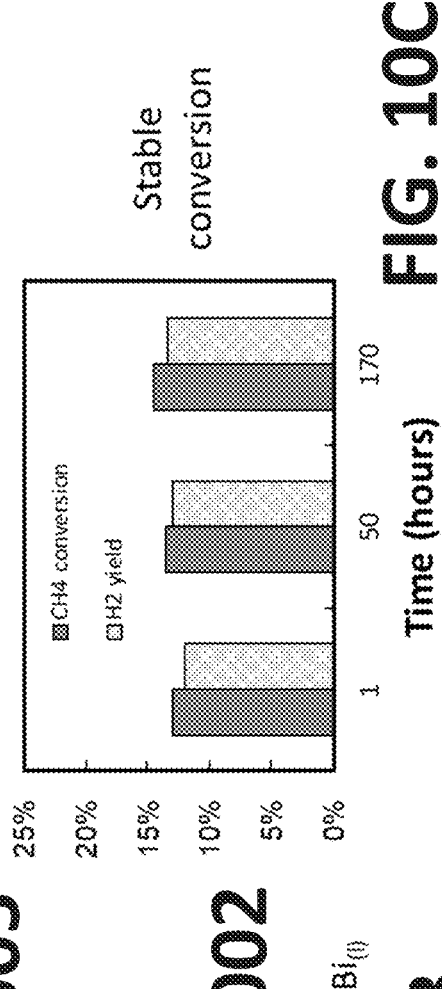
Figure 10A:
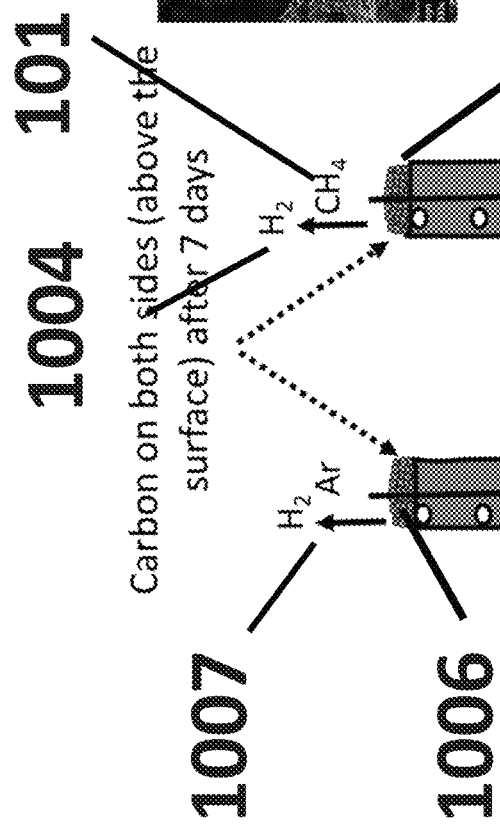
Figure 10D:
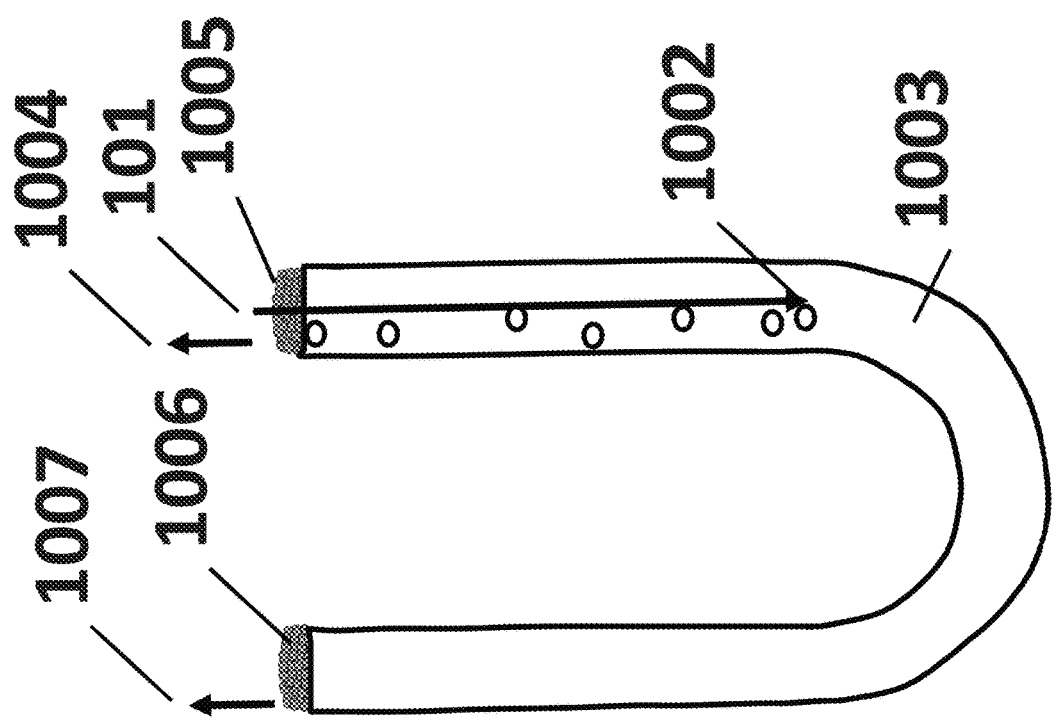

In some embodiments, the gaseous reactant stream can comprise natural gas as the sole reactant, the reaction products can comprise hydrogen and carbon, and carbon may dissolve in the molten media and be transported to two or more separate locations (e.g., any of the outlets of the reactor). Although the two locations at which products are removed are identified as gas-liquid surfaces in FIG. 10A, it is understood that it is within the scope of the present systems and methods that the locations may be solid-liquid interfaces, and may involve addition separations beyond what is illustrated in FIG. 10A.

In some embodiments, the gaseous reactants can comprise natural gas as the sole reactant mixture, the reaction products can comprise hydrogen and carbon, and some or all of the hydrogen may dissolve in the molten media 1003 and be transported to one or more locations different from the outlet of any unreacted natural gas or other product(s). In some embodiments, unreacted portions of the reactant or reactant streams can be removed at a first location 1004, and owing to the specific physical properties of the molten media 1003, a lesser amount of the reactant or reactant streams relative to the product or products can be removed at a separate location 1007, resulting in a separation of the reactant or reactant streams and the product or products within the reactor itself.

In some aspects described herein, the systems and methods include a process for the separation of a solid from a liquid surface. Preferably, the removal of the solid can be continuous and result in continuous reaction at the surface that is not slowed or inhibited by accumulation of the solid.

For example, the pyrolysis of methane in a liquid catalytic metal bubble column results in the production of solid carbon that is continuously removed from the surface. This element of the reaction processes results in continuous operation without a need to stop the reaction or remove the catalyst to re-condition the surface or remove solid carbon.

According to some embodiments, the conversion of methane to hydrogen and carbon can occur. The selectivity to hydrogen over other hydrogen containing products, for example but not limited to $C_2$ hydrocarbons, results in an improved process. The selective conversion is achieved through the use of a melt (e.g., a molten metal including any of those described herein, a molten salt as described herein, or any combination thereof), with a specific composition selected for the desired melt properties, reactivities, and solubilities.

Figure 11:
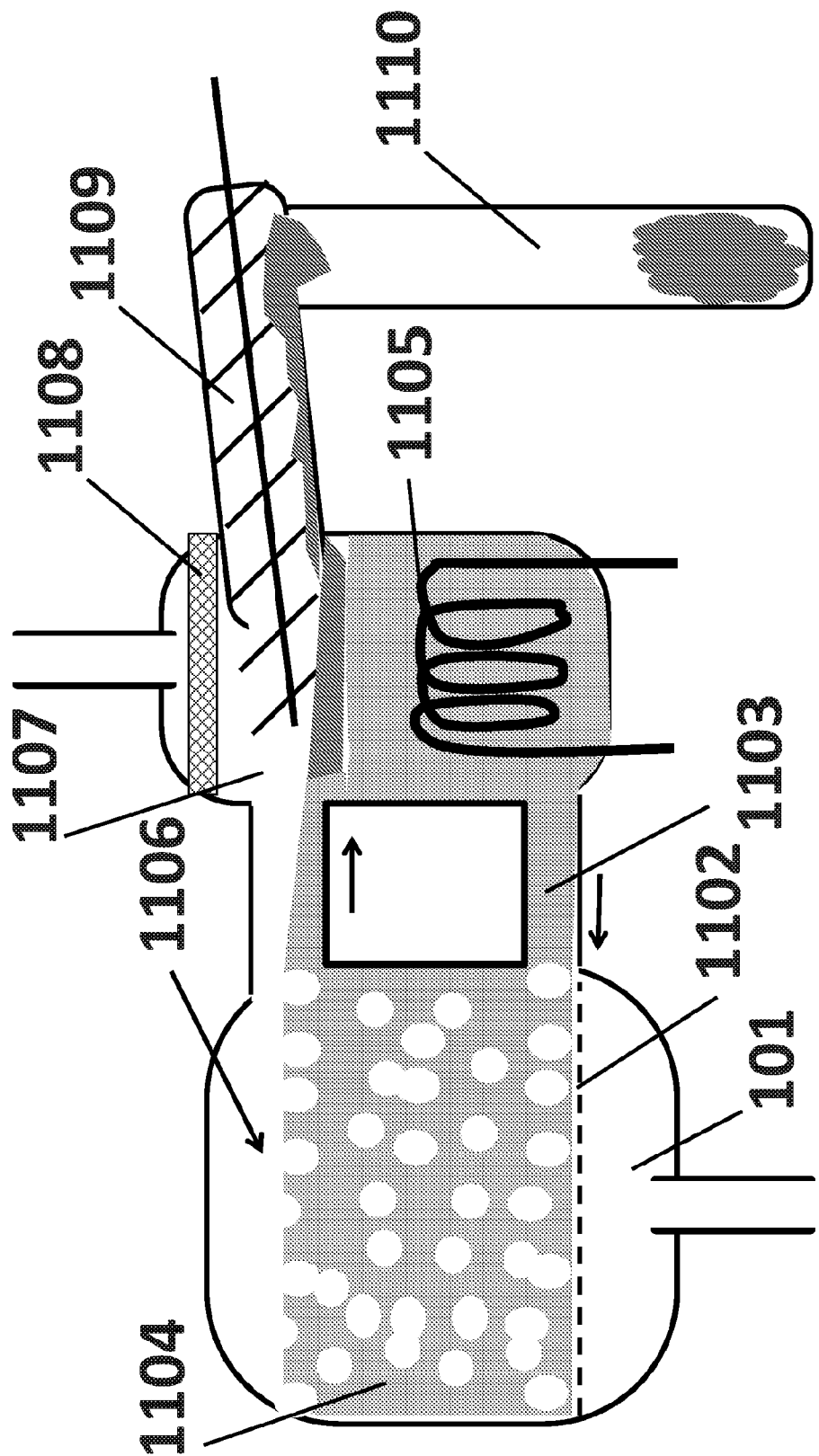
FIG. 11 is another diagrammatic illustration of an exemplary process whereby continuous production of carbon within one reactor section is performed and the bubble lift of the reactor used to circulate the solid carbon to a second section where the hydrogen and carbon are continuously removed.

The various aspects of the systems and methods described herein lead to opportunities in reactor design using the techniques recognized herein to integrate all aspects of hydrocarbon conversion to solid carbon and hydrogen gas. As illustrated in FIG. 11, for example, the chemical reactant stream 101 can be introduced into the reactor (e.g., through a gas distributor 1102) and into the reactive molten media 1104. The chemical reactant stream and/or the molten metal can comprise any of those metals disclosed herein (e.g., described with respect to FIG. 1, etc.). The reaction can be conducted while the reactant bubbles rise. At the surface, the gas phase products can disengage from the liquid at the top of the reactor, 1106 and the liquid and gas can move into a second reactor section 1107 where the solid products accumulate at the top of the liquid. The products can be removed continuously using, for example, a mechanical system 1109 to be transferred to a collection vessel 1110. The gas phase products can be separated from any residual droplets through a demisting assembly 1108. The gas phase products and any unreacted reactants can then pass out of the top of the reactor while any droplets can coalesce and return to the liquid for recirculation within the reactor. Heat addition 1105 may be performed in the molten liquid to provide heat to the reactor. The heat addition can occur before it is returned to the main reactor 1103 and/or provided within the main reactor section using internal or external (e.g., a heat jacket, etc.) heat exchange 1105.

Figure 12:
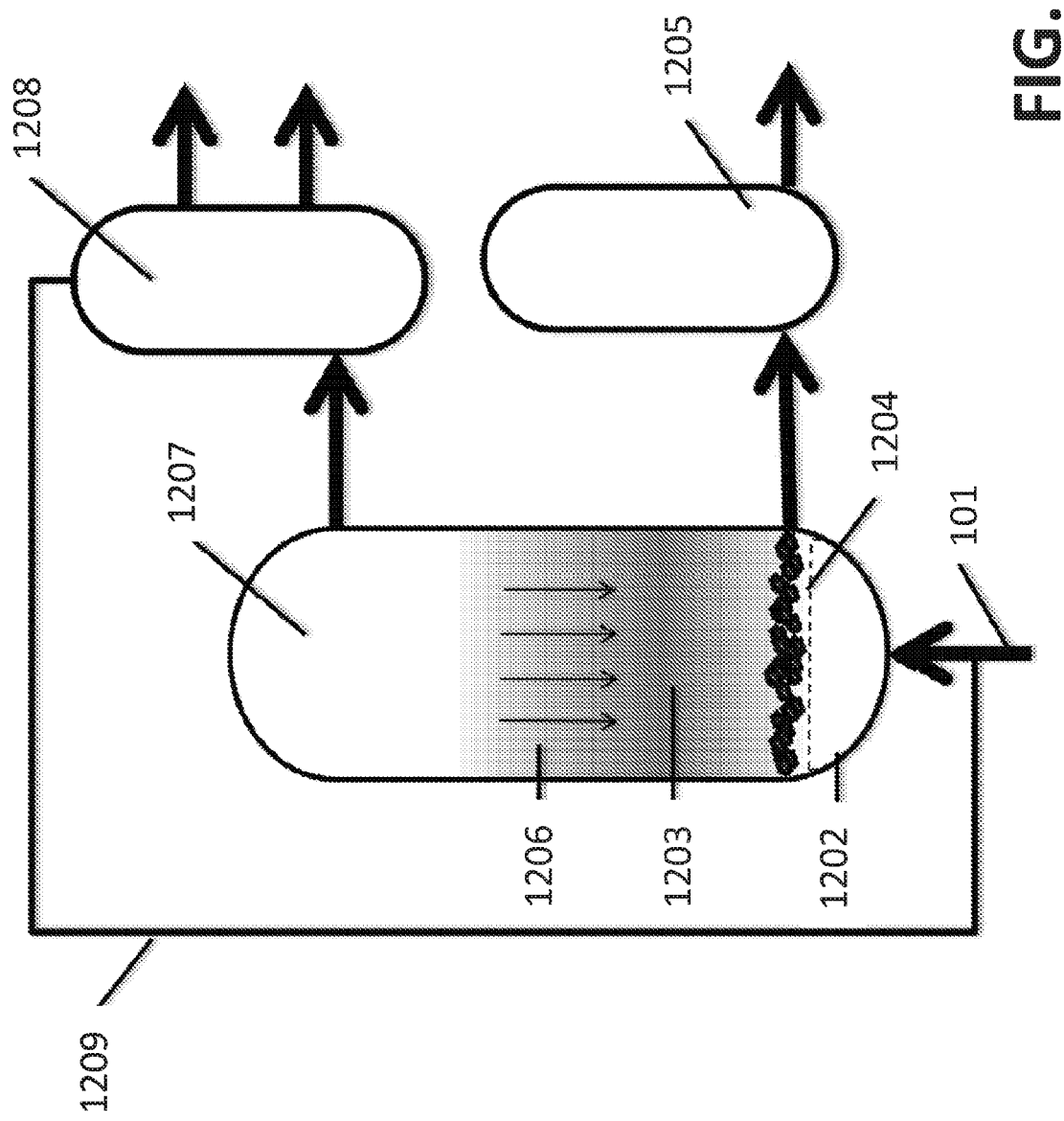
FIG. 12 illustrates another exemplary embodiment of a reactor system where a liquid with a high vapor pressure reacts with a hydrocarbon in the gas phase and the solid carbon formed is deposited and collects on the liquid surface below.

In some embodiments, the reaction can occur in the presence of a molten liquid and/or a vapor phase of the reactants. This reactor configuration is based on the recognition herein that a reflux reactor design can be used to enable the use of liquid catalysts with high vapor pressures at reaction temperature. As illustrated schematically in FIG. 12, a chemical reactant stream 101 comprising a hydrocarbon reactant such as methane and/or natural gas hydrocarbon components can be introduced to a reactor 1202 containing a catalyst vapor 1203, and react to form hydrogen gas and solid carbon product 1204. The catalyst vapor 1203 can comprise a vapor phase of any of the metals, metal alloys, metal mixtures, etc. described herein with respect to the molten metal liquid melts. The resulting reaction products can sink down to the bottom of the reactor 1202 and be removed from the reactor 1202 into a separation unit 1205. At the top 1206 portion of the reactor 1202, the temperature can be maintained low enough for the catalysts vapor to condense to a liquid and flow back to the high temperature reaction zone. The hydrogen product and any other gases can disengage from the catalysts vapor and reaction product solid in a disengagement region 1207 before leaving the reactor and entering a gas separation unit 1208 where a purified hydrogen product can be produced and any unreacted feed of byproducts recycled through a recycle line 1209 to the reactor 1202.

Within the upper portion of the reactor, any catalyst vapors can be condensed to a liquid, thereby effecting a separation of the reaction products from the catalyst vapors within the reactor 1202. Suitable heat exchange can be used to supply heat to the lower portion of the reactor 1202 to vaporize the catalyst, and separate heat exchange can be used at the top portion of the reactor to condense the catalyst vapors. When condensed, the catalyst vapors can flow down the surfaces of the reactor 1202 and/or any internal structures or packings to return to the lower portion of the reactor to be re-vaporized.

Figure 13:
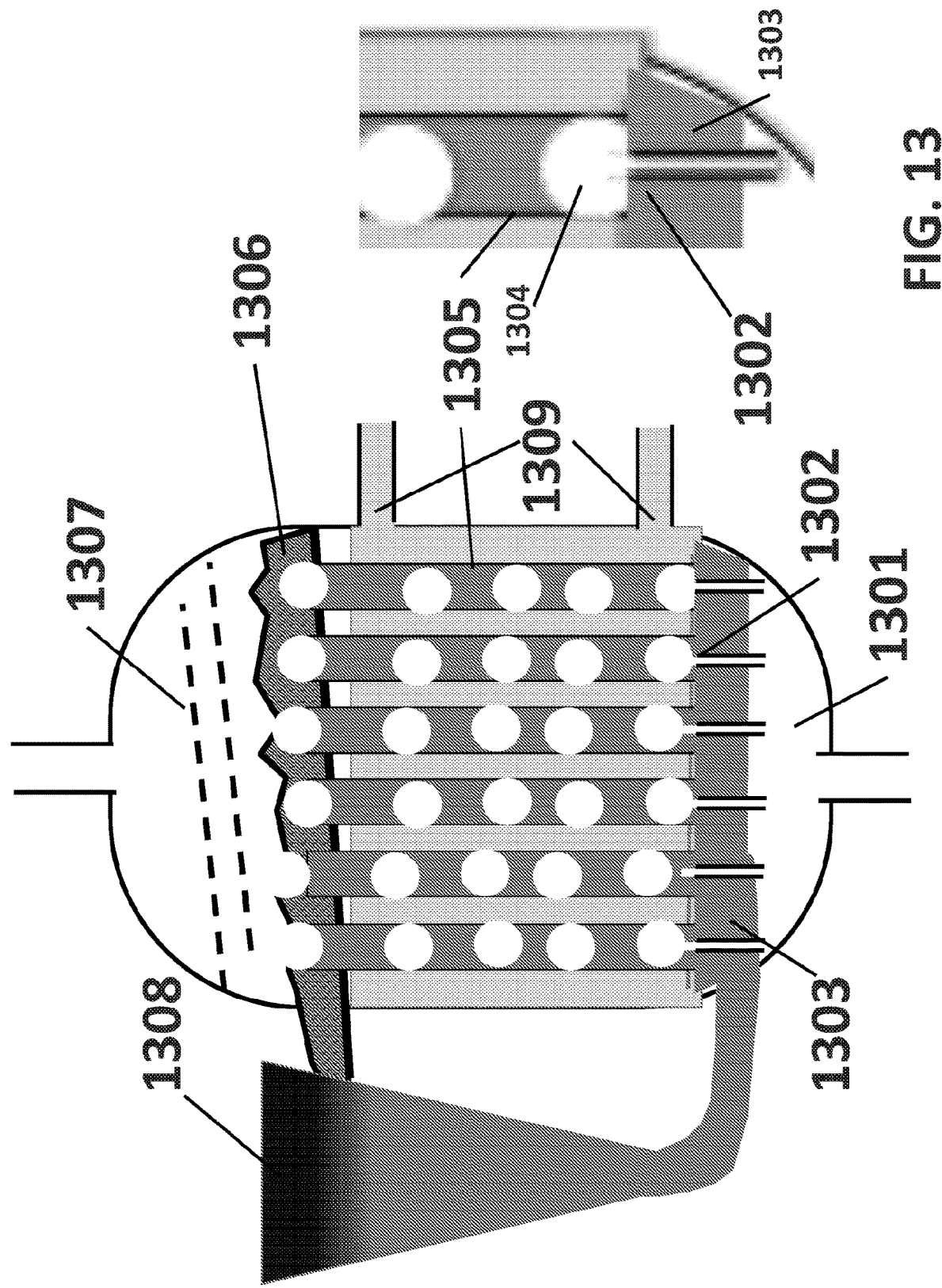
FIG. 13 illustrates another exemplary embodiment of a reactor system, including multiple tubes with a catalytic surface where gas phase reactants can react and with gas introduced such that bubbles of gas are followed by plugs of liquid to contact catalytic surface and remove any deposited carbon.

In some embodiments, the reactor system for hydrocarbon pyrolysis used to form carbon and hydrogen may be described as a modified tube-shell construction as illustrated in FIG. 13. On the shell side of the reactor (e.g., between the shell and an exterior of the tubes 1309), a heat exchange medium can be introduced around the tubes 1309 to provide the heat for pyrolysis and maintain the temperature within the reactor tubes 1309. On the tube side (e.g., within an interior of the reactor tubes 1309), gas phase reactants can be introduced into a distributor 1301 which can deliver reactant gas to gas delivery tubes 1302. The gas reactants can pass into the gas delivery tubes 1302 then into the liquid medium 1303 to form bubbles of gas that pass into the tubes made of or coated with a solid catalyst (e.g. Ni tubes). The tube diameters are selected such that the gas bubbles contact the walls of the tubes. Between bubbles, plugs of liquid are lifted and pulled behind the gas to wash the carbon from the catalyst to reactivate the catalyst surface and carry the carbon in the flowing liquid to where it can be removed 1308. The chemical reactant stream comprises methane or other hydrocarbons and the liquid can comprise a molten metal or molten salt which can comprise any of those liquids disclosed herein (e.g., described with respect to FIG. 1, etc.).

A lower portion of the tubes can be open to space retaining the liquid media, and the opening and gas delivery tubes 1302 can be arranged to deliver liquid into the tubes where the liquid can be drawn into the tubes due to gas lift as the gas bubble 1304 moves upward. In some embodiments, the gas bubbles can contact the walls of the tubes which can be covered with a solid catalyst 1305. The hydrocarbon reactant can react to form hydrogen and solid carbon within the tubes. The liquid drawn into the tubes by the rising bubble can remove at least a portion of the solid carbon formed on the catalyst and carry it with the liquid upward in the reactor tube to the top liquid zone which contains suspended solid carbon 1306 removed from the tube 1305 walls. The gas phase products, including primarily hydrogen, can disengage from the liquid and suspended solids before exiting the main reactor section. A demister 1307 can be present at the outlet of the reactor to separate any liquids from the gaseous products prior to the gaseous products passing out of the reactor. The liquid combined with the carbon can pass out of the main reactor vessel and collect in a collection vessel. The low density solid carbon 1308 can rise a surface of the more dense liquid and be separated and removed from the reactor while the liquid can be circulated back to the lower section of the reactor. For example, the liquid that is separated from the carbon can be recirculated to the lower portion of the reactor for lift back through the tubes 1309.

While described as having a solid catalyst on a surface of the tubes, one or more solid catalysts or particles can be packed into the tubes. The gas bubbles and liquids can then pass over the solid catalyst particles to react while the resulting carbon can be removed by the liquid media. The remainder of the reactor configuration can be the same or similar and operate in the same fashion to remove the carbon and hydrogen products.

Figure 14:
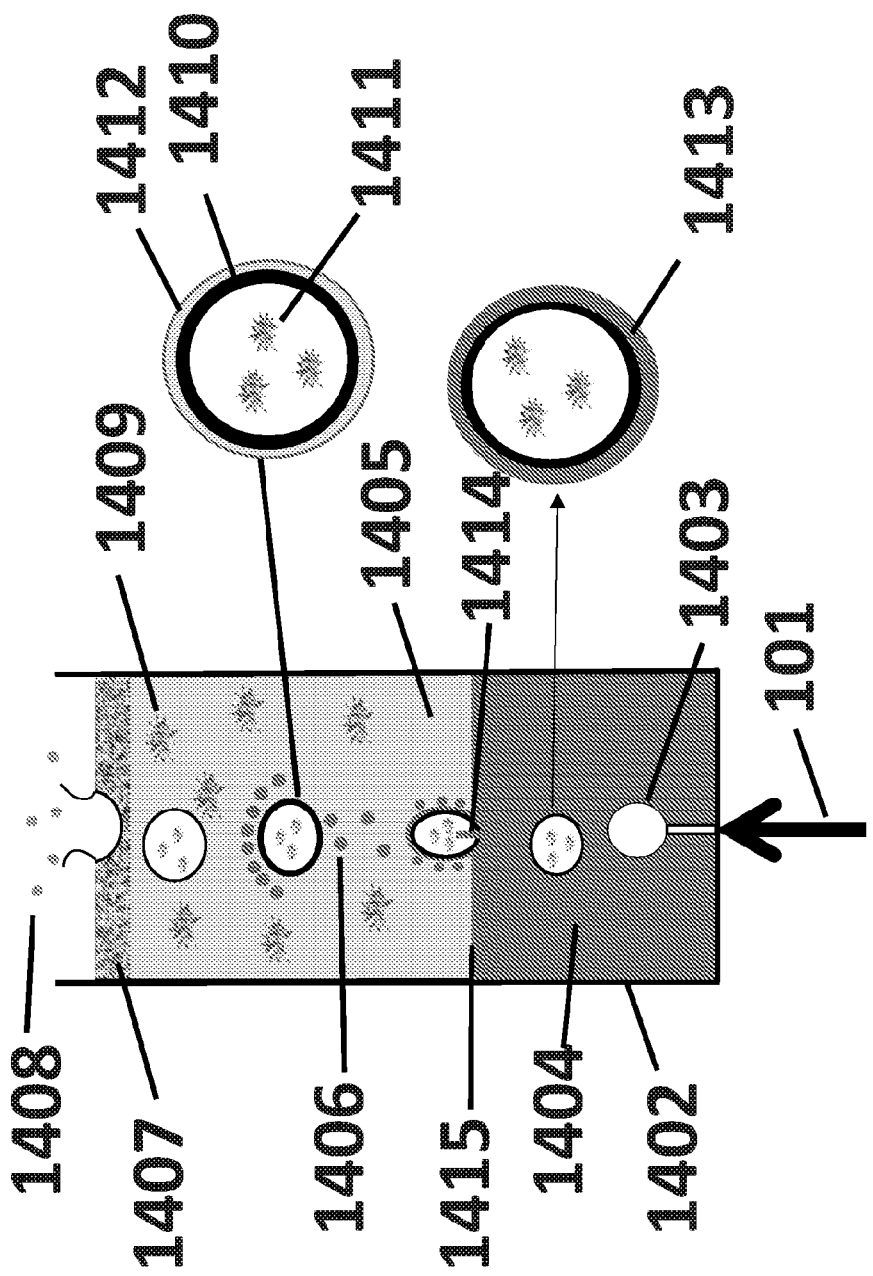
FIG. 14 is a schematic diagram of bubbles passing through molten metal bubble columns.

In some embodiments, the reactor system can have a reactor with a molten salt wash. Prior systems that utilized molten metals for pyrolysis obtained solid carbon with significant metal contamination. Another aspect of the systems and methods described herein is the recognition herein that producing a solid carbon product free of metal contamination can be important to obtaining value for the carbon co-product and that adding a molten salt cleaning layer on top of a catalytic molten metal would improve upon and overcome previous limitations. As illustrated schematically in FIG. 14, a chemical reactant stream 101 comprising a hydrocarbon reactant (e.g., methane and/or natural gas hydrocarbon components) can be introduced into a reactor 1402 containing a catalytic molten metal 1404 and a separate phase of a less dense molten salt 1405 that has a specific composition that provides for a density and carbon solubility and wettability to facilitate separation of solid carbon on the top of the melt 1407. The gas phase reactants and/or the molten metal can comprise any of the molten metals, metalloids, alloys, or the like described herein, and the molten salt can comprise any of the molten salts as described herein. Within the liquid-liquid system a molten metal film 1413, molten metal column 1414, and molten metal droplets 1406 can be formed when a bubble 1403 passes from the molten metal, through the molten metal-salt interface 1415, and into the molten salt where it becomes detached. Depending on the molten salt and solid carbon interface properties, particles can be dispersed in the salt 1409, stay in the bubble 1411, or make a layer around the bubble 1410. At the top of the molten salt surface, the salt film 1412 can rupture to form salt droplets 1408 and the hydrogen product and any other gases (e.g., any unreacted hydrocarbon gases, by-products, etc.) can disengage from the liquid and solid before leaving the reactor. Within the molten salt any molten metal droplets that are formed can sink back to the molten metal-molten salt interface to rejoin the molten metal liquid phase. This process allows for any entrained molten metal to be removed from the reaction products, thereby producing a carbon product and hydrogen that contain less metal than a system without the molten salt layer.

The present systems and methods may be described as hydrocarbon gas pyrolysis in a multi-phase reactor system or more specifically the conversion of natural gas to separable carbon and hydrogen via pyrolysis of methane in a molten metal-molten salt two-phase reactor system utilizing a less dense liquid (e.g., the molten salt layer) to remove the metal and product free carbon. The reactor system generally includes at least one reactor in which or into which a liquid may be introduced to contact with methane and/or carbon.

Another complex molten reactor design that could improve catalytic activity is an emulsion of molten metal and molten salt, for example. Molten salts can easily be suspended above molten metals but will most likely not immerse in one another without an emulsification agent such as sulphur. This emulsion could provide more surface area for gas to contact liquid metal, the known catalytic species, through molten metal emulsified spheres suspended in this solution.

Figure 27:
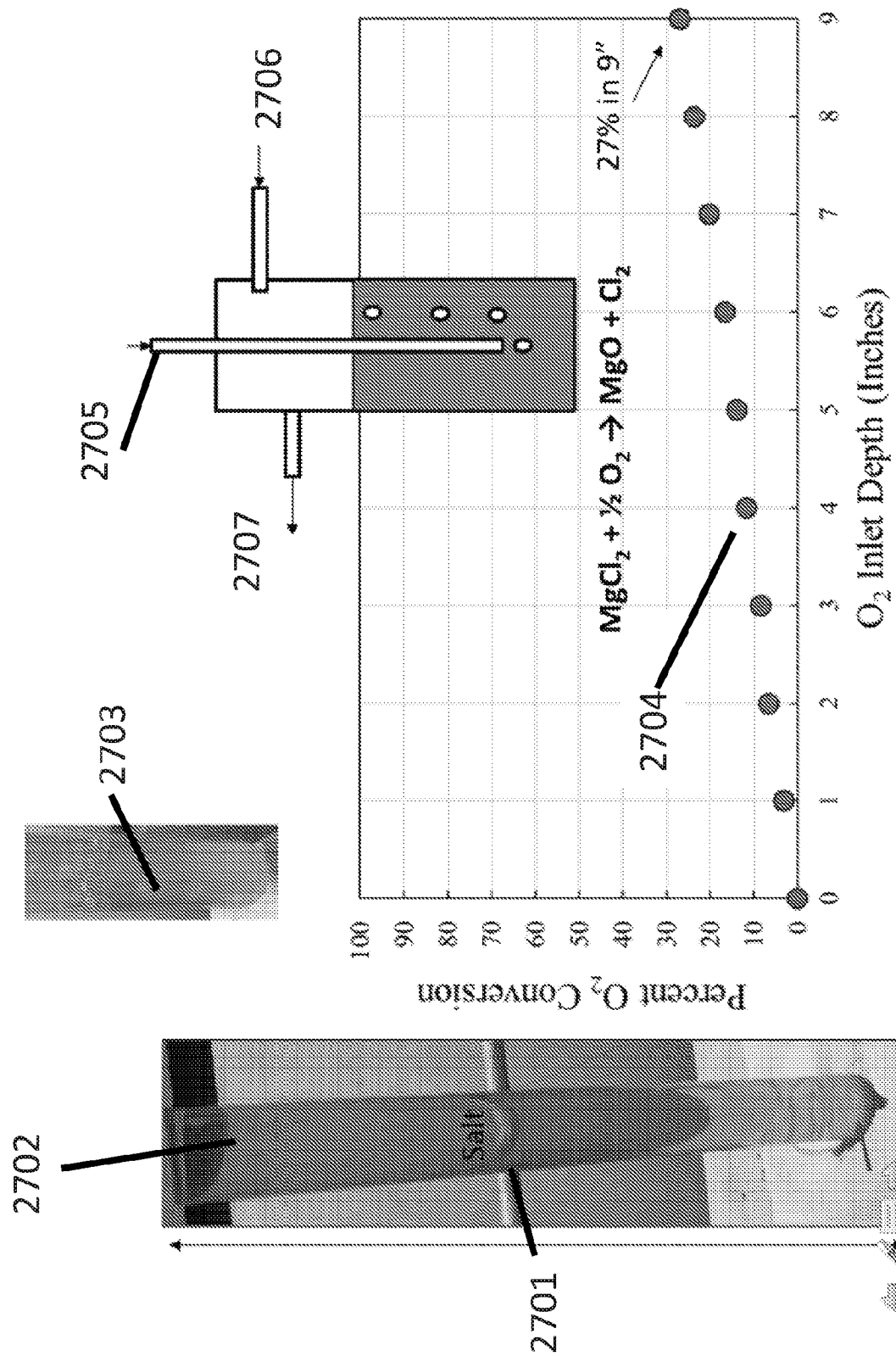
FIG. 27 is a photograph showing the salts used for producing chlorine with oxygen. In the color version what is shown as a darkened hue, is a distinct yellow color of chlorine dissolved in the previously clear salt as described more fully along with the data described Example 10.

In an embodiment as shown in FIG. 27, the equilibrium limited reaction of HCl and oxygen ($2HCl+\frac{1}{2}O_2 \leftrightarrow H_2O+Cl_2$) can be carried out in a specific molten salt mixture designed to absorb the product $Cl_2$ into the melt thereby allowing higher conversion of HCl. In this embodiment, shown schematically in FIG. 27, the salts are selected to have minimal solubility for oxygen and the reaction with oxygen and HCl occurs at the surface. The $Cl_2$ is produced when $O_2$ is reacted with a mixture of molten salts. In some embodiments, the molten salt can comprise chlorides such as KCl and $MgCl_2$ (e.g., KCl (44 wt. %) and $MgCl_2$ (56 wt %) salts). First, HCl can be introduced into the reactor shown in FIG. 27 through an inlet tube 2705 and allowed to react with MgO suspended in the molten salt to form a clear eutectic salt mixture 2703 of KCl (44 wt. %) and $MgCl_2$ (56 wt %). The water co-produced is soluble in the salt and can boil out. Oxygen can then be introduced into the bubble column reactor 2701 through the inlet tube 2705. The oxygen is substantially insoluble in the molten salt and reacts at the surface to produce chlorine. The chlorine is soluble in the salt and rapidly dissolves pulling the reaction forward and coloring the salt yellow (or darkened hue in black and white photo shown in FIG. 27). The product salt of reacting the MgO to produce the eutectic salt was then reacted with oxygen to produce chlorine. This reaction then provides the ability to cyclically produce a halogen using the appropriate salt mixture.

Other reactions can also be carried out using the systems and methods described herein. In some embodiments, the reactors, and molten metals can be used to carry out a dry reforming reaction. Returning to the simplified illustration FIG. 15, mixtures of methane and carbon dioxide 1501 can be introduced through an inlet 1502 and reacted in a molten metal environment 1503 in a reactor 1504 to produce products 1505 comprising synthesis gas (e.g., carbon monoxide and hydrogen). High $CO_2$ conversions can be achieved when one (or both) of the metals in the alloy makeup has a propensity for $CO_2$ reduction, such as indium, gallium, tin and/or zinc. The example illustrated in FIG. 15 employs indium as the reducing agent for $CO_2$ (e.g., as shown in the reaction 1507), but in no way limits the inventive design to only metal alloys containing indium. The oxidized metal species can then be reduced via methane (e.g., as shown in reaction 1508), completing the redox chemical loop and generating synthesis gas. At high-temperatures, methane can thermochemically decompose into hydrogen and solid carbon 1506 (e.g., as shown in reaction 1509). The solid carbon formed can be gasified to carbon monoxide from oxidation by carbon dioxide (e.g., as shown in reaction 1510), also known as the reverse Boudouard reaction. Any water produced from reverse water gas shift reactions will rapidly react with methane through steam reforming (i.e., as shown in reaction 1511) to produce synthesis gas as the thermodynamically-stable product. Moreover, the simultaneous reaction-separation improves reactant conversions as hydrogen 1512 and carbon 1513 species dissolve into the melt. Decreasing the concentrations of hydrogen and carbon in the local reacting environment will not only directly lead to increased methane conversions, but it will also suppress the reverse water gas shift reaction ($H_2+CO_2 \leftrightarrow H_2O+CO$) from occurring. Suppressing this reaction is ideal for generating a hydrogen-rich synthesis gas product.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

Figure 16:
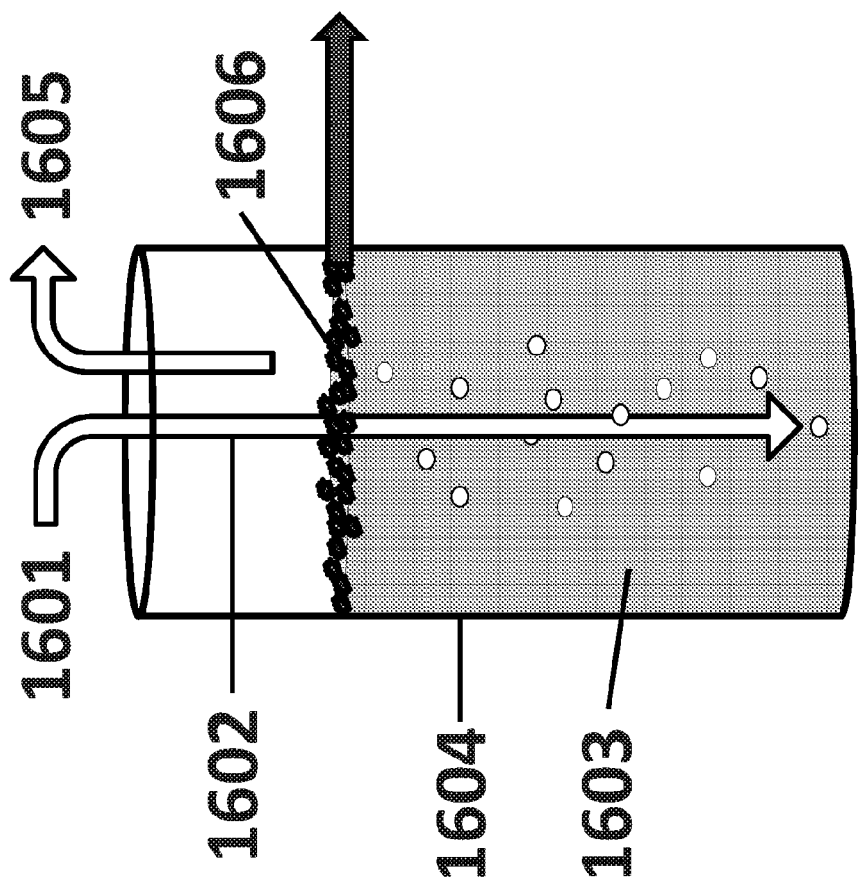
FIG. 16 is a diagrammatic illustration of an exemplary process whereby a hydrocarbon containing gas is introduced into a reactor with a catalytic molten metal to produce low density solid carbon and hydrogen gas.

In a first example, methane is converted to hydrogen and carbon in a reactor configuration according to simplified illustration FIG. 16. Methane is bubbled along with argon 1601 into a molten metal alloy 1603 consisting of Ni/Bi at 1065° C. in the molar ratio of 0.27:0.73, and hydrogen and carbon are produced. Referring to Table 1, nearly complete conversion and high selectivity to hydrogen result when a catalytic molten metal is used, which demonstrates the successful application of molten metals to methane pyrolysis.

The melt is prepared by combining solid bismuth and nickel in the molar ratio Ni/Bi of 0.27:0.73 in a stainless steel tube that was 3 cm×1.2 m and closed on one end with a welded cap. The reactor was fitted into a 4 cm alumina sleeve, which was surrounded by four 30.5 cm 850 Watt ceramic heaters surrounded by ceramic insulation. The space between the alumina tube and the stainless-steel reactor was purged with nitrogen gas to prevent scaling of the stainless steel by oxidation at high temperatures. The bottom of the reactor and heaters were supported by ceramic insulation on a sand bed. The metals were heated until liquid.

The temperature of each of the four heaters was controlled independently using thermocouples inside the furnace. A 6 mm 316 stainless steel tube with a closed end was inserted into the melt as a sleeve for a K-type thermocouple. The thermocouple inside the melt was used to adjust the temperature profile of the reactor to get as close to isothermal conditions as possible. A 3 mm quartz tube was used to introduce the gas and was inserted from the top of the reactor. In order to prevent reactions in the headspace, possibly catalyzed by the stainless steel, the top 5 cm of the melt was kept cool by filling the tube above the level of the heaters and cooling in air with a fan from the outside. Nickel and bismuth for this reactor were purchased from Rotometals. A mass spectrometer (SRS RGA 200) was used to analyze the products.

TABLE 1

| Catalyst | Temperature | Bubble Column Height | Methane Conversion | Hydrogen Yield |
| --- | --- | --- | --- | --- |
| $Ni_{0.27}Bi_{0.73}$ | 1065° C. | 1.1 meters | 95% | 93% |

Example 2

In a second example, methane is converted to hydrogen and carbon and other products in a reactor configuration according to simplified illustration FIG. 16. The reactor was placed so that the head space had a lower temperature than the melt. Methane was bubbled along with argon 1601 through a tube 1602 inserted into the molten metal alloy 1603 consisting of Ni/Bi at 1050° C. in the molar ratio of 0.27:0.73 in a first test and consisting of pure bismuth at 1050° C. in a second test. The bubble column reactor was constructed out of quartz and connected to a mass spectrometer to analyze the products 1605. The molten metal column 1604 was 150 mm high and had a 12 mm in diameter. A 3 mm quartz tube, that went down into the liquid metal 1602, was used to introduce gas into the melt. The depth of the tube could be controlled to any height using Swagelok UltraTorr fittings. A 850 watt ceramic fiber heater was used to heat the entire liquid. A mass spectrometer (SRS RGA 200) was used to analyze the products of one side at a time. Mass flow controllers (MKS 1179) were used to deliver methane and argon through Teflon lines that were heated to 110° C. in an oven. The temperature was controlled using a K-type thermocouple inside the furnace, but outside the reactor tube. The region in which the molten metal was isothermal was determined by inserting a thermocouple inside the reaction gas inlet and measuring the temperature profile. The results of the product analysis are reported in Table 2.

TABLE 2

| Liquid Catalyst | Yield to Hydrogen | Yield to Aromatic Hydrocarbons | Yield to $C_{2+}$ Hydrocarbons |
| --- | --- | --- | --- |
| Bismuth | 18% | 12% | 6.6% |
| $Ni_{0.27}Bi_{0.73}$ | 44% | 0% | 3% |

Referring to Table 2, the reaction of methane in a melt consisting of pure bismuth was shown to generate significant amounts of aromatic hydrocarbons and $C_{2+}$ products, while a melt consisting of 27% mole nickel dissolved in bismuth resulted in nearly 2.5 times higher yield to hydrogen, and higher selectivity to hydrogen. This difference in activity and selectivity with identical bubble column heights and under the same reaction conditions demonstrates that molten metals of differing composition affect the (1) conversion and (2) selectivity of methane pyrolysis.

Example 3

In a third example, methane is converted to hydrogen and carbon in a reactor configuration according to simplified illustrations in FIGS. 10A-10D. Methane is bubbled along with argon into a molten metal alloy consisting of Ni/Bi at 1050° C. in the molar ratio of 0.27:0.73 at location 1002, and hydrogen and carbon are produced. All of the unreacted methane leaves the reactor as a gas at location 1004 along with some hydrogen gas. Some carbon is deposited at location 1005. Some carbon dissolves into the melt 1003 and diffuses to a separate location and is deposited at location 1006. In addition, some hydrogen dissolves and diffuses in the melt and leaves the reactor separately from the unreacted methane at location 1007.

The methane conversion and hydrogen yield from the outlet gas stream 1004 are shown in Table 3, below, for this experiment. During the pyrolysis in this example, the conversion of methane was observed to be stable for 170 hours, supporting the conclusion that the solid carbon formed moves to the surface of the molten metal, preventing deactivation of the catalytic liquid surfaces of the bubbles. Analysis of the carbon product by Raman spectroscopy, FIG. 10b shows the presence of mixed graphitic type carbon. This example is merely illustrative of one exemplary embodiment in which a solid is produced and removed from a catalytic surface using a liquid, and the reactivity data is not meant to be performed at optimum conditions, conversions, yields, or flow rates. More sophisticated carbon removal and hydrogen removal may be added at optimized conditions.

TABLE 3

| Time on stream (hours) | Methane conversion | Hydrogen Yield |
|---|---|---|
| 1 | 13.0% | 12.0% |
| 50 | 13.5% | 13.0% |
| 170 | 14.5% | 13.3% |

This example demonstrates the successful separation of products during reaction and supports the following conclusions: (1) carbon is soluble in some molten metals and the dissolved carbon can be removed from the melt in one or more chosen locations; (2) hydrogen is soluble in some molten metals and can be removed from the melt at an interface that is different from unreacted reactant gas: and (3) separation of a solid product from a catalytic surface occurs if the surface is liquid.

Example 4

In a fourth example methane is thermally decomposed in a reactor configuration according to simplified illustration shown in FIG. 16. Some embodiments may also include more reaction zones, post-reaction separation units, or gas preheating units.

In this specific example, methane (15 sccm) (1601) at 1 bar of pressure is bubbled through a quartz inlet tube (3 mm OD, 2 mm ID) (1602) into a molten metal alloy comprised of 45 molar percent copper and 55 molar percent bismuth (1603) housed in a quartz reactor (25 mm OD, 22 mm ID) (1604) 60 cm³ of molten metal in total are loaded in the reactor. Bubble rise velocities are estimated to be 25 cm/s, resulting in a gas residence time of about 0.6 seconds. Gaseous products such as hydrogen, $C_2$ hydrocarbons (e.g. ethane, ethene, and acetylene), aromatics (e.g. benzene), and unreacted methane are collected from the top of the column (1605). Solid carbon formed from thermal decomposition of methane floats to the surface of the molten metal by virtue of its low density where it can be removed (1606).

Figure 17:
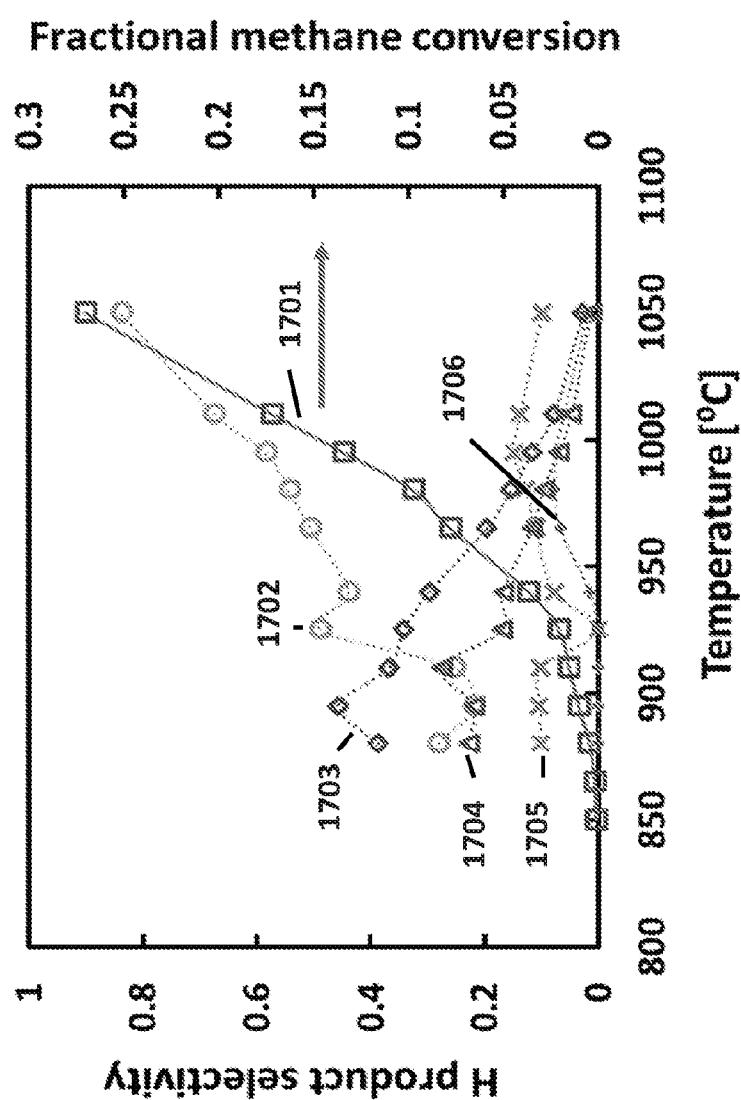
FIG. 17 is data described in Example 4 showing the fractional conversion of methane and product selectivity (hydrogen basis) in a molten metal reactor versus temperature.

The fractional conversion of methane and product selectivity (hydrogen basis) in the reactor effluent (1705) versus temperature is shown in FIG. 17. FIG. 17 illustrates the fractional methane conversions (right axis) and hydrogen product selectivities (left axis) versus temperature for the methane pyrolysis As shown, the following legend applies: (1) Methane conversion. H selectivity: (2) Hydrogen (3) Ethane (4) Ethylene (5) Benzene (6) Acetylene.

As shown in FIG. 17, methane conversion (1701) begins around 875° C. and increases exponentially with temperature, with 14% conversion at 1000° C. and 27% conversion at 1050° C. At lower temperatures, product selectivity to hydrogen (2) is poor, owing to the short gas residence time of 0.6 seconds which leads to incomplete conversion of the $C_2$ (e.g. ethane (1703), ethylene (1704), and acetylene (1706)) and aromatic (e.g. benzene (1705)) intermediates well-known to form in gas-phase methane pyrolysis. As the temperature increases, the selectivity to hydrogen (1702) improves. At 1050° C., the selectivity to hydrogen is approximately 85%, with benzene (1705) comprising most of the missing 15%. At longer gas residence times (e.g., using taller bubble columns), the selectivity to hydrogen and methane conversions would improve further. Solid carbon is made at steady-state and collected from the surface of the melt after cooling down.

This Example demonstrates the successful conversion of methane in a catalytic molten metal bubble column reactor. The solid carbon formed from the decomposition of methane at high temperatures inherently floats to the surface of the 45 mol % Cu-55 mol % Bi melt, preventing catalytic deactivation or plugging of the reactor. Current heterogeneous catalytic reactor designs are unable to avoid deactivation and reactor plugging from the solid carbon formed during methane pyrolysis without burning it.

Example 5

Figure 18:
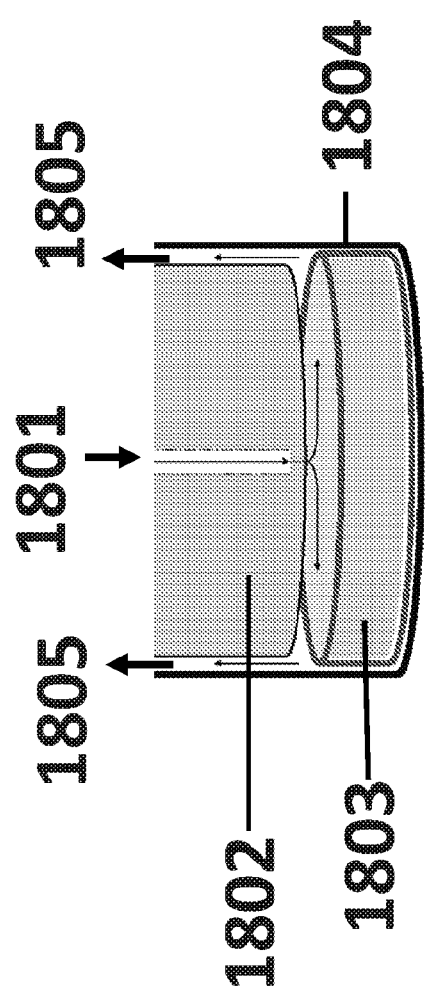
FIG. 18 is a diagrammatic illustration of the experimental set-up described in Example 5 where methane is passed over molten metals.

In a fifth example, a catalytic liquid metal surface is used to increase a rate of reaction. The catalytic liquid metal surface may be a pure metal or an alloy consisting of two or more metals combined. Referring to FIG. 18, for example, a known surface area of metal or metal alloy is prepared 1803 within a container 1804, and reactant gases 1801 flow over the surface of the metal or alloy. In some embodiments, the reacting gas 1801 is methane and the product gas 1805 is hydrogen, and the rate of methane conversion to hydrogen is used as the metric for activity. In some embodiments, a portion or all of the reaction pathway occurs on the melt surface, and the activation energy of one or more of the elementary steps is lowered when compared to the activation energy of a reaction network taking place entirely in the gas-phase.

In this specific example, a mixture of methane (0.25 sccm) and argon (2.5 sccm) at 1 bar of pressure are flown through a quartz inlet tube (8 mm OD, 1 mm ID) over the surface of a ceramic crucible (8 mm OD, 5 mm height) filled with a molten metal mixture that is housed in a quartz reactor vessel (12 mm OD, 10 mm ID). Methane decomposition reactions take place on the molten metal surface (0.38 cm²). Gaseous products such as hydrogen, $C_2$ hydrocarbons (e.g. ethane, ethene, and acetylene), aromatics (e.g. benzene), and unreacted methane are collected from the effluent.

Figure 19:
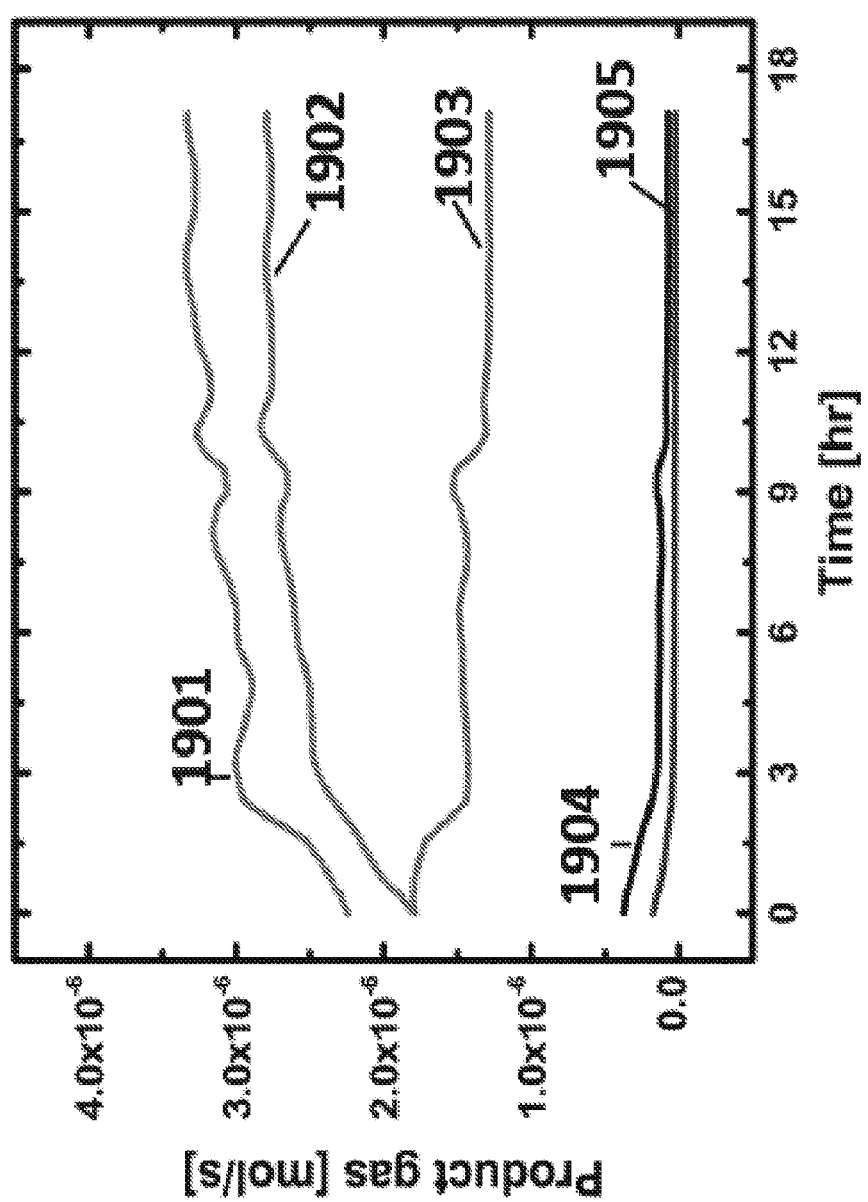
FIG. 19 is experimental data described in Example 5 from the dry reforming of methane.
Figure 20:
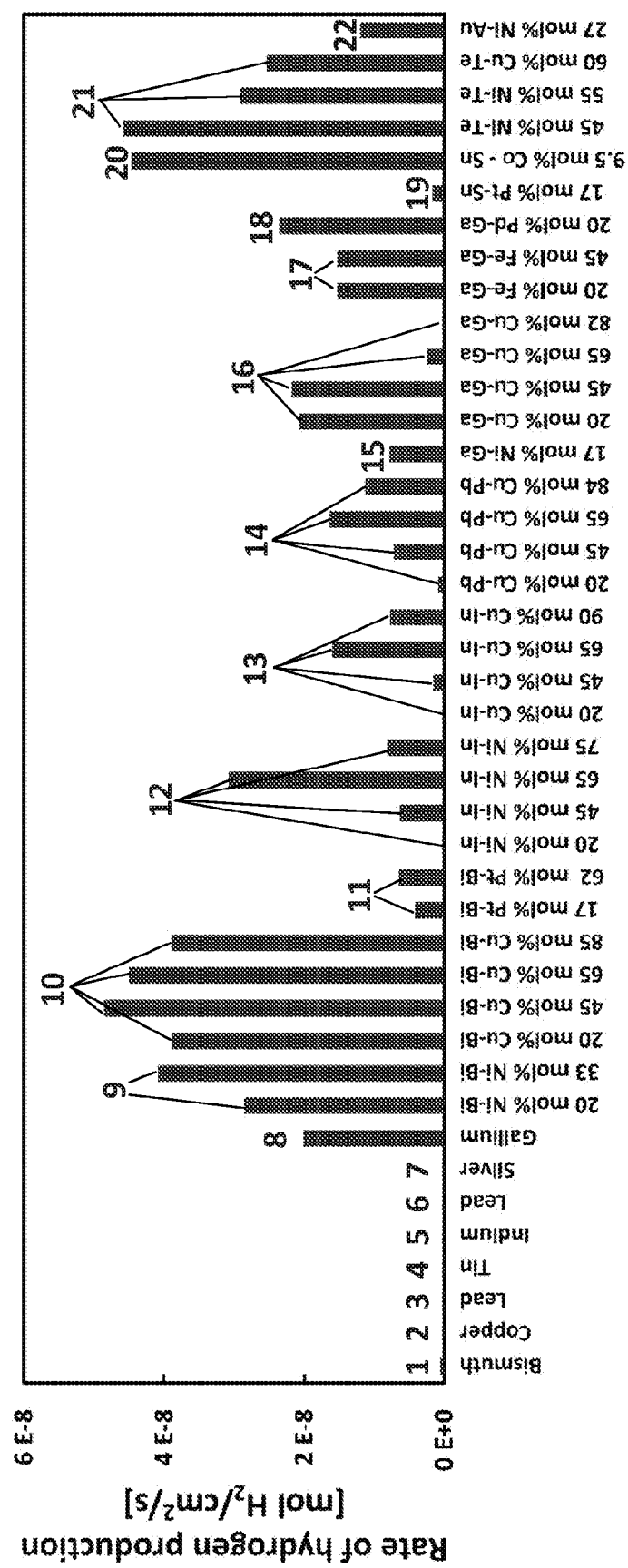
FIG. 20 is data described in Example 5 of the rates of hydrogen production on different molten metals from the decomposition of methane.

The rates of hydrogen production from stream 5 from the decomposition of methane on the surface of different liquid metals at 1000° C. are shown in FIG. 20. FIG. 19 shows the rates of hydrogen production from the decomposition of methane on 0.38 cm² of molten metal surfaces at 1000° C. as 0.25 sccm of methane and 2.5 sccm of argon are flown over the surfaces of the molten metals. In order to subtract any gas-phase reactions in the headspace above the melt, a blank crucible is used as a reference system. The data presented in FIG. 20 is the rate of hydrogen production from the reactor with liquid metals minus the rate of hydrogen production from the same system but with a blank (unfilled) crucible. Pure metals tested include bismuth (1), copper (2), lead (3), tin (4), indium (5), lead (6), silver (7), and gallium (8), all of which exhibited no catalytic activity for methane pyrolysis except for pure gallium (8). However, many mixtures of inactive pure metals or mixtures of inactive pure metals in alloys with high-melting metals such as nickel, copper, platinum, iron, palladium, and cobalt exhibited activity for methane pyrolysis. Specific molten metal mixtures measured in this example include nickel-bismuth (9), copper-bismuth (10), platinum-bismuth (11), nickel-indium (12), copper-indium (13), copper-lead (14), nickel-gallium (15), copper-gallium (16), iron-gallium (17), palladium-gallium (18), platinum-tin (19), cobalt-tin (20), nickel-tellurium (21), and copper-tellurium (22). The specific composition of the alloys also influenced the catalytic activity.

This Example demonstrates the successful conversion of methane on a catalytic molten metal surface and supports the conclusion that the liquid metals used in prior bubble columns for methane pyrolysis (e.g. tin and lead) exhibit low to no catalytic activity whereas certain molten metal mixtures described in the reactor systems described herein are indeed catalysts for methane activation and conversion. This Example by no means limits the combinations of molten metal mixtures that could be used as a catalytic medium in the inventive reactor embodiments.

Example 6

Figure 15:
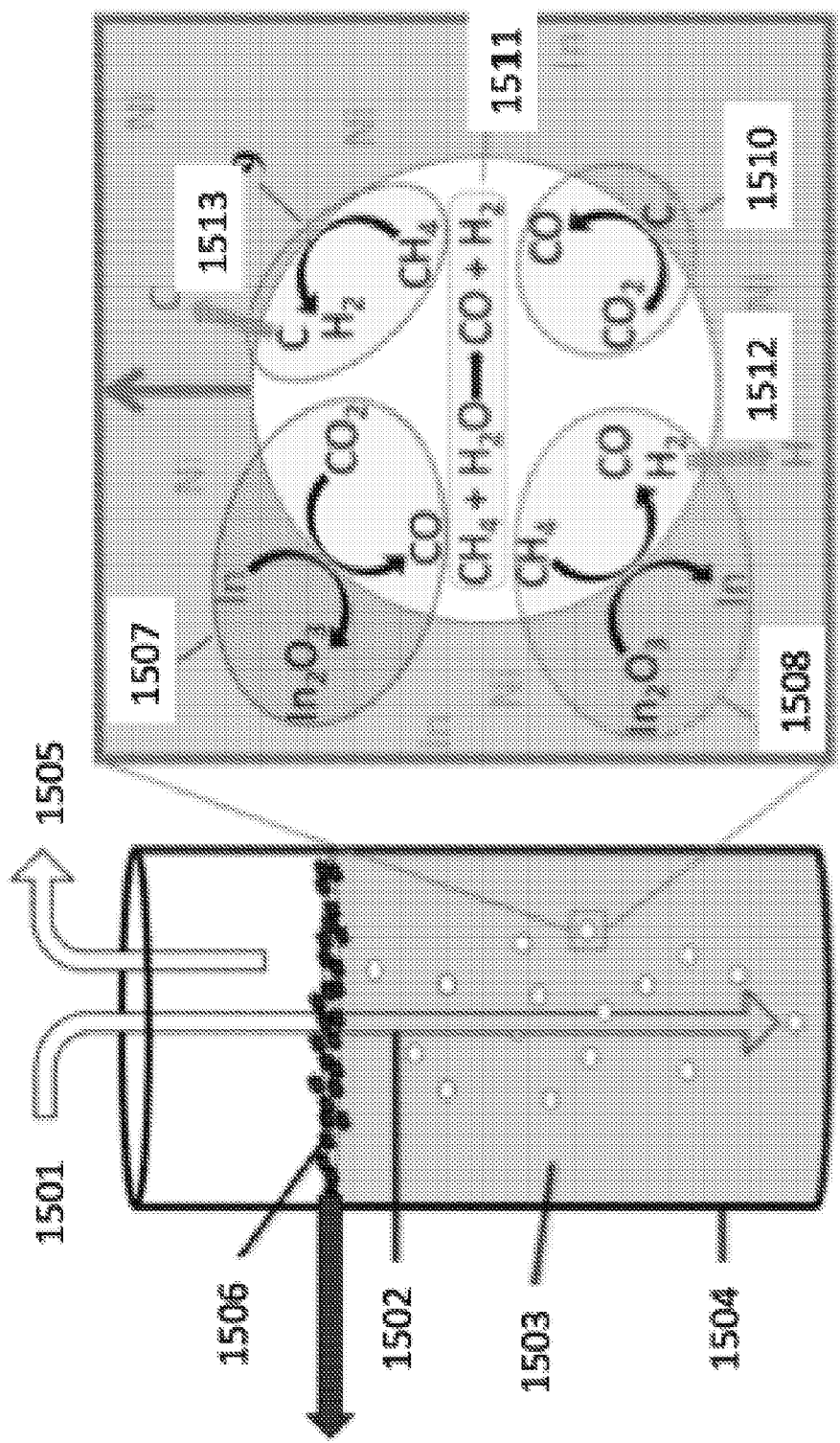
FIG. 15 is a diagrammatic illustration of an exemplary process for dry reforming whereby a hydrocarbon containing gas and $CO_2$ are introduced into a reactor with a catalytic molten metal to produce low density solid carbon together with carbon monoxide and hydrogen gas.

A sixth example can be carried out as shown in FIG. 15. In this specific example, as shown schematically in FIG. 15, methane (4 sccm), carbon dioxide (2 sccm), and argon as a carrier gas (4 sccm) (1) at 1 bar of pressure are bubbled through a quartz inlet tube (3 mm OD, 2 mm ID) into a molten metal alloy comprised of 65 molar percent nickel and 35 molar percent indium housed in a quartz reactor (12 mm OD, 10 mm ID) (4). 10 cm$^3$ of molten metal in total are loaded in the reactor. Bubble rise velocities are estimated to be 15 cm/s, resulting in a gas residence time of about 0.9 seconds. Gaseous products such as hydrogen, carbon monoxide, water, and unreacted methane and carbon dioxide are collected from the top of the column. Solid carbon formed from thermal decomposition of methane floats to the surface of the molten metal by virtue of its low density where it can be removed).

The reactor effluent (5) versus time is shown in FIG. 19 where the reaction temperature is 1080° C. FIG. 19 illustrates the effluent gas flowrates [mol/s] versus time for the dry reforming of methane in 65 mol % nickel-35 mol % indium at 1080° C. 4 sccm of methane, 4 sccm of argon (carrier gas) where 2 sccm of carbon dioxide are bubbled into a molten metal bubble column to produce synthesis gas and solid carbon. (1901) Hydrogen (1902) Carbon monoxide (1903) Methane (1904) Carbon dioxide (1905) Water.

The methane (1903) and carbon dioxide (1904) consumption rates initially increase as a function of reaction time as solid carbon and metal oxide species accumulate, which both facilitate reactions. The reactant conversions level off to 56% methane conversion and 95% carbon dioxide conversion after approximately 10 hours (with the given reaction conditions) signifying a steady-state amount of metal oxides present the melt. The molar production rates of hydrogen (1901) and carbon monoxide (1902) increase and level off accordingly. Solid carbon is made at steady-state and collected from the surface of the melt after cooling down. The molar production rate of water vapor (1905) rapidly drops to approximately zero and the selectivity to hydrogen is 100% under steady-state conditions. The product syngas ratio ($H_2$:CO) at steady-state is 1.2:1.0.

This Example demonstrates the successful conversion of mixtures of methane and carbon dioxide to synthesis gas and solid carbon in a catalytic molten metal bubble column reactor, and supports the following conclusions: (1) the ability to produce a synthesis gas ratio ($H_2$:CO) from mixtures of methane and carbon dioxide that is greater than 1:1, while current dry reforming of methane reactors are restricted to a 1:1 product ratio; (2) high selectivity to synthesis gas and a separable solid carbon product where the ability for hydrogen to dissolve into the liquid medium suppresses the reverse water-gas-shift reaction; and (3) high catalytic activity for carbon dioxide conversion, attributed to the propensity of indium to reduce carbon dioxide into carbon monoxide.

Example 7

Figure 4:
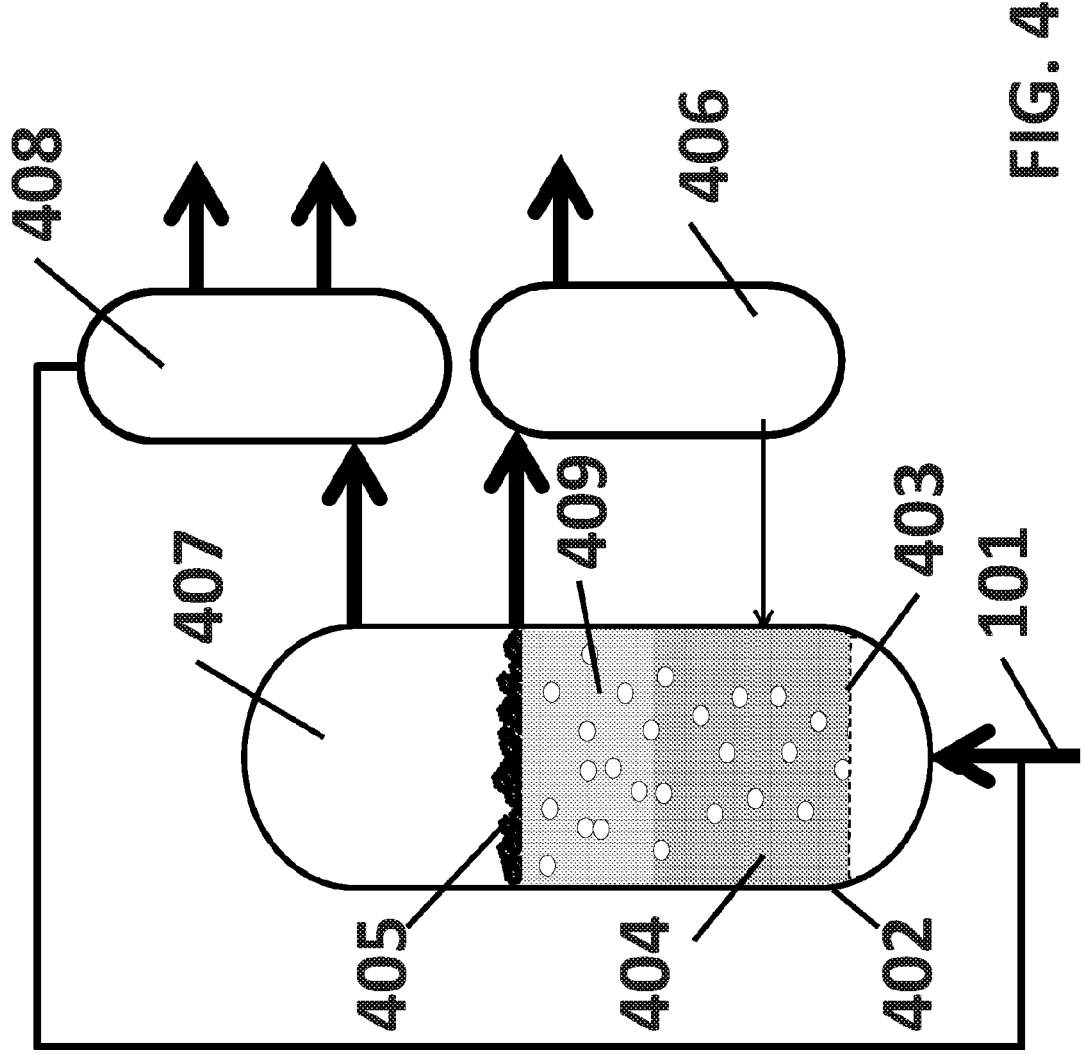
FIG. 4 is another diagrammatic illustration of an exemplary process whereby a hydrocarbon containing gas is introduced into a reactor with a catalytic molten metal (bottom) and a molten salt (on top) to produce low density solid carbon and hydrogen gas which are separated.
Figures 5A, 5B, 5C, 5D:
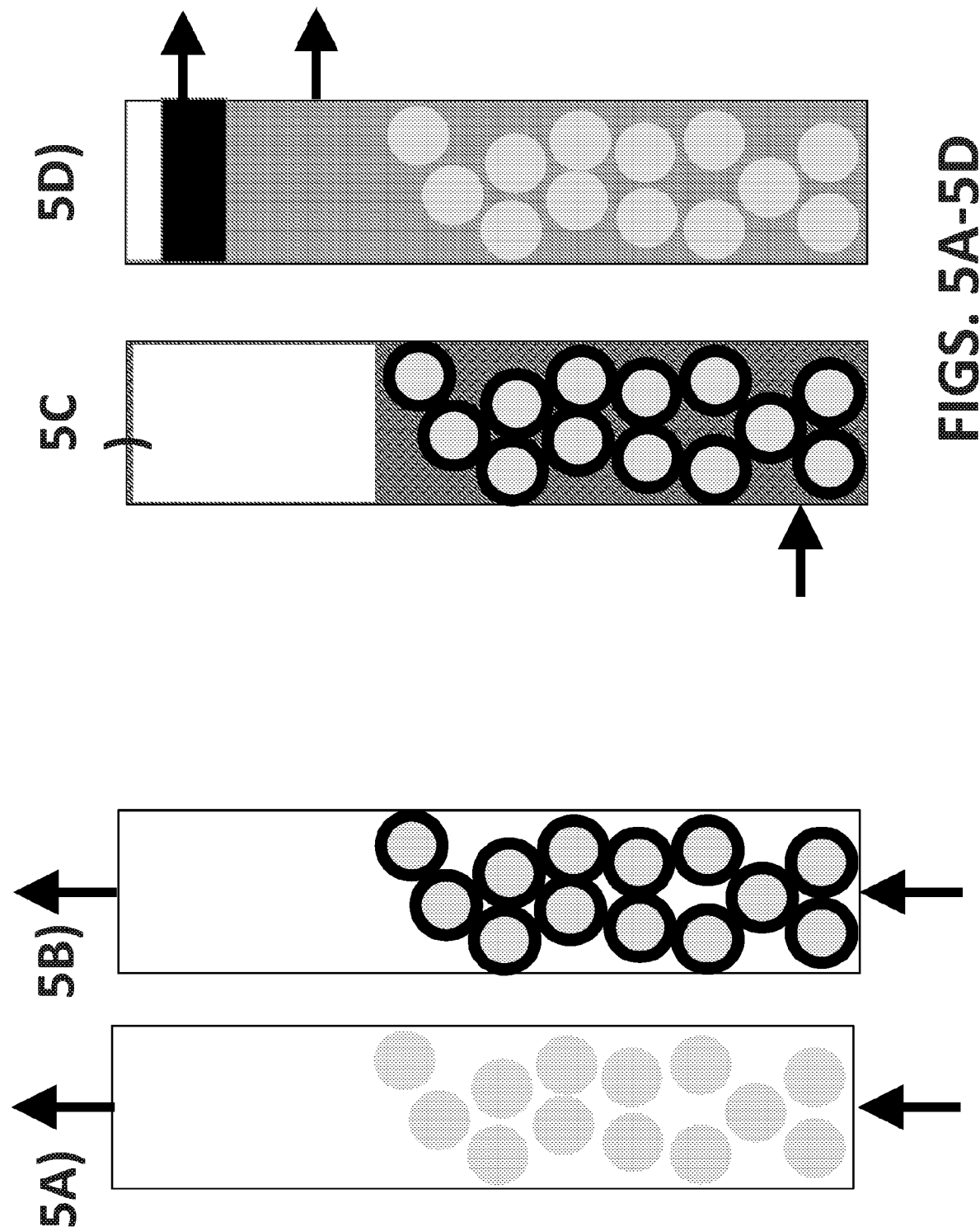
FIG. 5A-5D is an illustration of a two-step process whereby in the first step a hydrocarbon containing gas contacts a solid catalyst producing solid carbon on the catalyst surface and hydrogen gas. In the second step a specific molten liquid is introduced into the reactor which removes the solid carbon from the catalyst surface reactivating the surface. The low density of the carbon and its interactions with the liquid allows it to be separated from the liquid for removal. The liquid is removed from the reactor to restart the cycle leaving only the solid catalyst.
Figure 22:
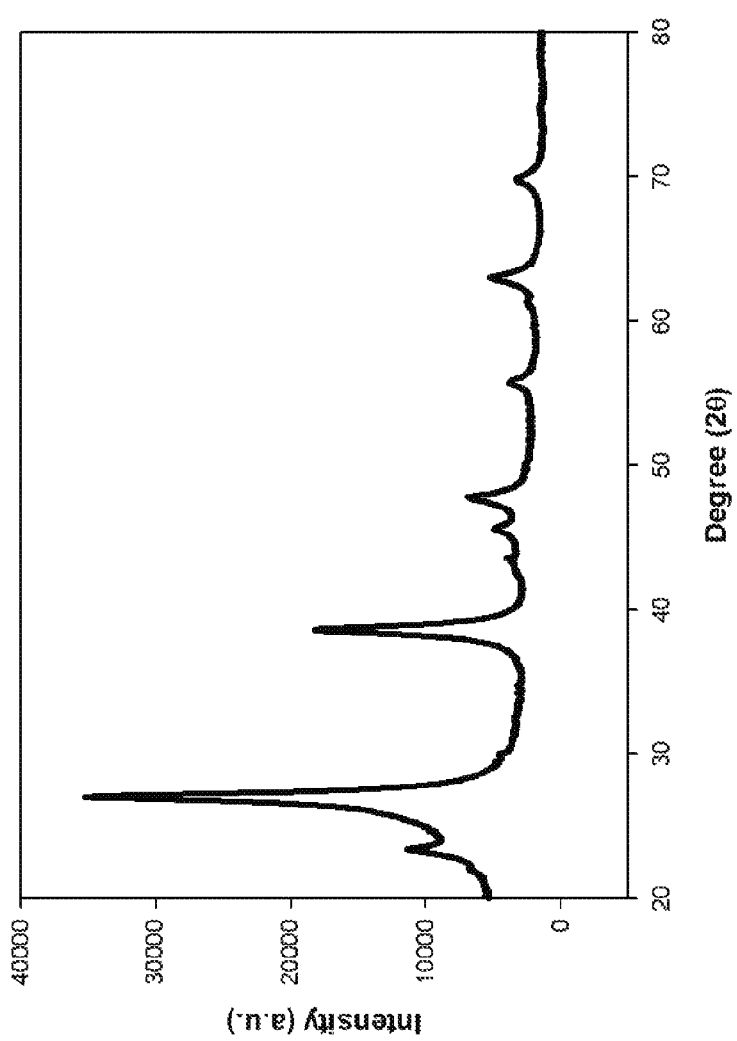
FIG. 22 shows the x-ray diffraction spectra of carbon samples collected from NiBi/KBr described in Example 7.

In a seventh example, methane is converted to hydrogen and carbon in a reactor configuration according to simplified illustration FIG. 4. Methane is bubbled into a molten metal/ molten salt two-phase reactor consisting of NiBi 404 with molar ratio 27/73 and bromide salts (Na/KBr) 409 at their eutectic mixtures. In a specific example, methane/argon is introduced at a rate of 7 sccm/3 sccm, 101 respectively, into 40 mL of NiBi melt and 90 ml of the salt at 1000° C. for 9 h to produce 2.5 g solid carbon. This disclosure suggests the floatation of the metal free carbon at the top salt-gas interface and the removal of metal contamination as the carbon passes through the salt from the metal section. The electron microscopy and energy dispersive x-ray analysis (SEM/EDX) on carbon recovered from two-phase bubble column reactors indicates that metal contaminations significantly decreased in the two-phase reactors comparing to the NiBi single-phase molten metal reactor, FIG. 21. The data in FIG. 22 shows the x-ray diffraction pattern of carbon recovered from the NiBi/KBr two-phase bubble column reactor shows no Ni and Bi peaks supporting the role of the salt layer in cleaning the carbon of metal contamination.

Example 8

Figure 23:
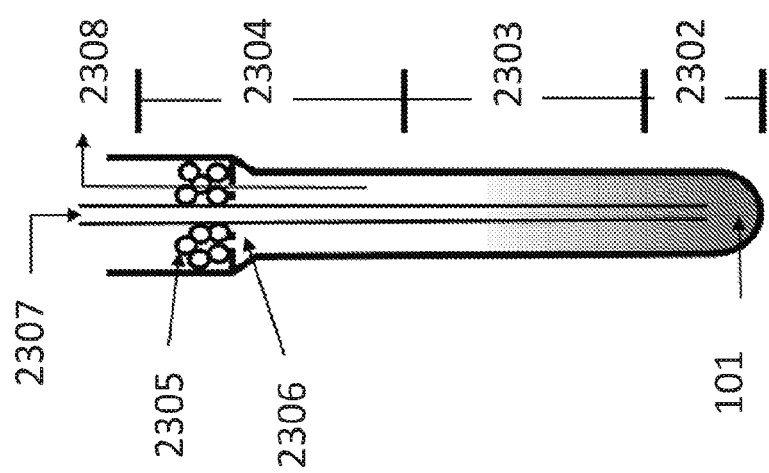
FIG. 23 illustrates the experimental set-up for the experiment of Example 8.
Figure 24:
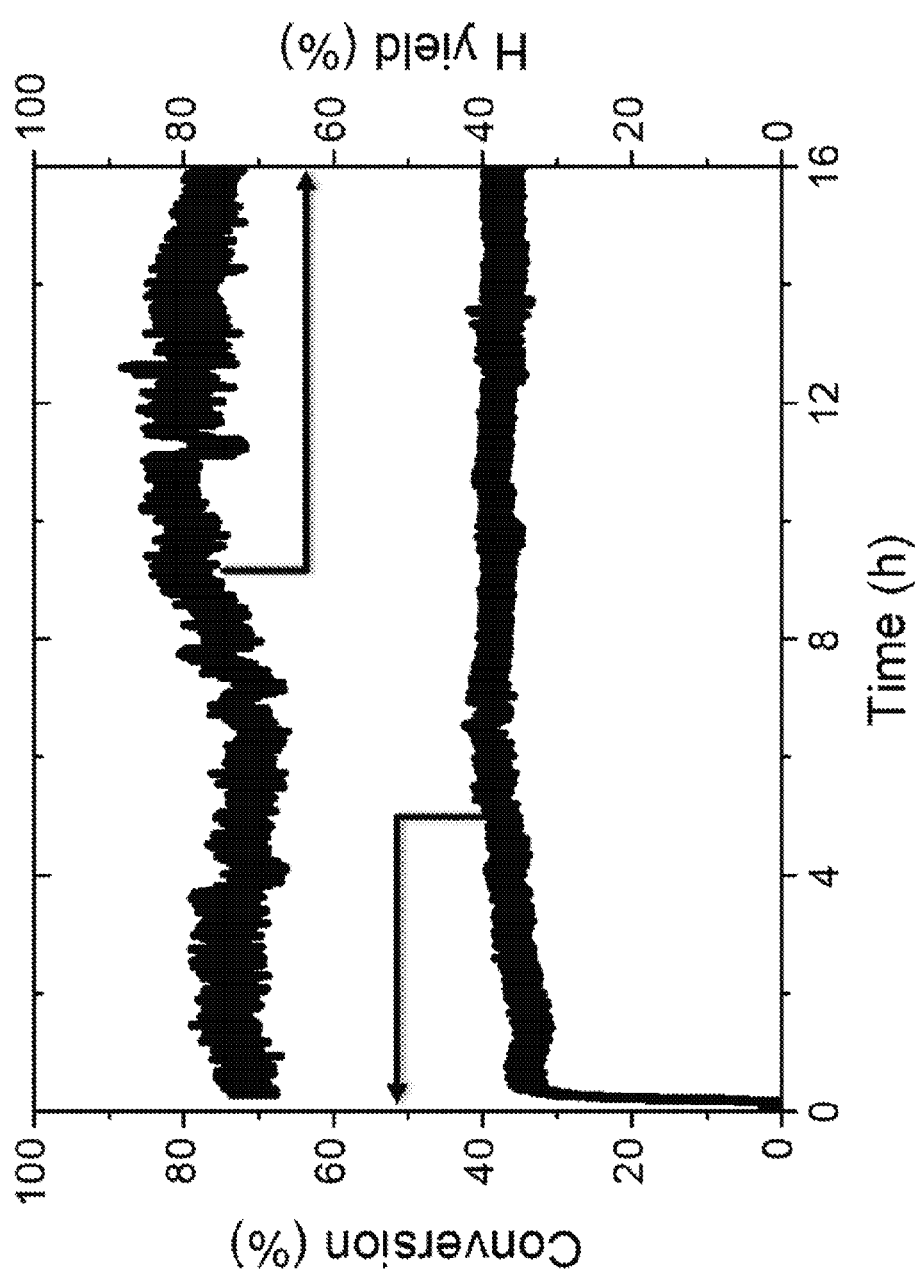
FIG. 24 is data obtained from conversion of methane to produce hydrogen and carbon as described in Example 8.

In an eighth example, according to simplified illustration FIG. 23, tellurium is loaded into the bottom (2302) of a reflux reactor where the temperature, 1273 K, is slightly above the boiling point of Te (1263 K). The temperature of the middle part of the reactor (2303) is less than 1173 K, and the temperature at the top part of the reactor (2304) is kept at 753 K, slightly higher than the melting point of Te (723 K). This design allows Te to exist as vapor in the hot reaction zone, and condense to liquid and flow back in the cold reflux zone. In the reflux zone a quartz plate with holes (2306) and quartz beads (2305) are placed to provide extra surface area to ensure the condensation of Te vapor. Methane (2307) is introduced to the bottom of the reactor and partially converted to a product stream containing hydrogen and other hydrocarbon (2308). Data in FIG. 24 shows that a stable methane conversion of 37% is maintained for more than 16 hours without observable catalyst deactivation, and the yield of hydrogen is ~75%. This example shows that Te is an active catalyst for methane pyrolysis, and can perform steadily in a reflux reactor.

Example 9

Figure 25:
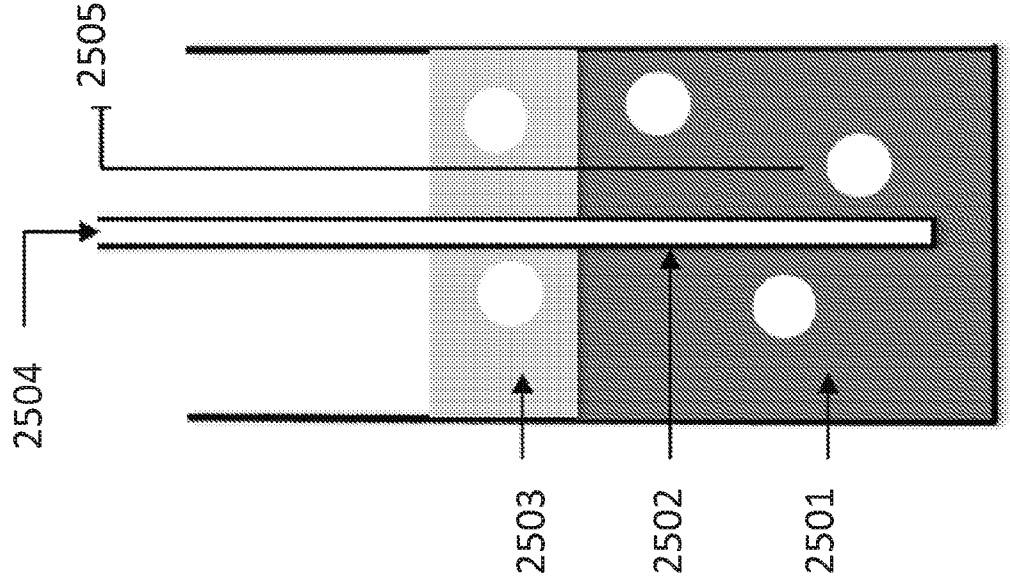
FIG. 25 illustrates the experimental set-up for the solubility experiment of Example 9.
Figure 26:
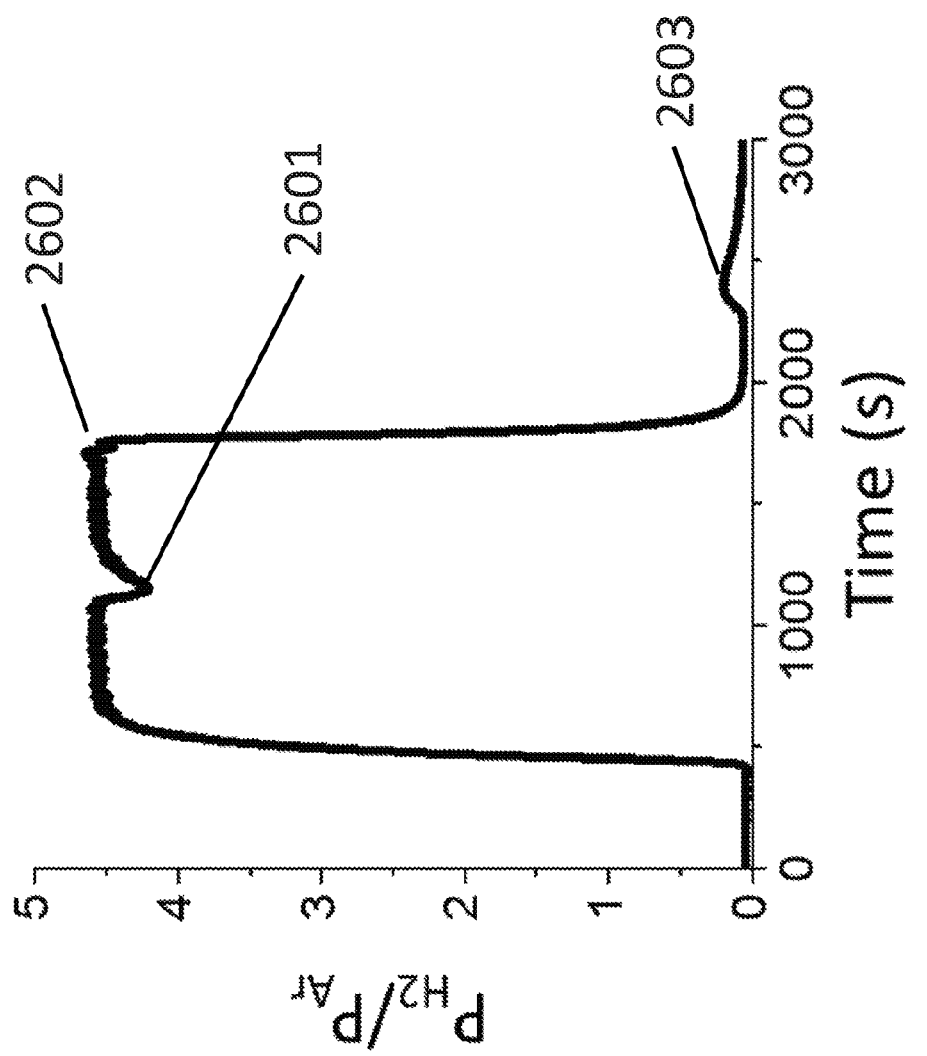
FIG. 26 is data obtained from mass spectrometry of the ratio of hydrogen to argon pressures as described in Example 9.

In a ninth example provided with referenced to FIG. 25, the reaction takes place in a quartz glass reactor filled with molten 27 mol % Ni-73 mol % Bi alloy (1) at 1000° C. with an adjustable inlet tube (2502). Above the liquid alloy is a layer of molten 50 mol % NaCl-50 mol % KCl eutectic molten salt cap (2503). A gas stream containing Ar and $H_2$ (2504) is bubbled in liquid or flowed over the liquid, and the outlet gas composition (2505) is monitored in time; the data is shown in FIG. 26. First, the gas is flowed above the surface of salt layer until the signal is stable, then the inlet tube is inserted into the bottom of the molten metal liquid to bubble $H_2$. A clear consumption of $H_2$ is observed (2601), indicating the solubility of $H_2$. After the $H_2$ signal rises back and levels off, the inlet tube is lifted above the liquid surface and the $H_2$ flow is turned off (2602). The head space is purged with Ar. The inlet tube is inserted to the bottom again after no $H_2$ signal can be observed and Ar is flowed into the liquid. A clear generation of $H_2$ is observed (2603), showing the dissolved H is bubbled out. Same experiment with Cu—Bi molten alloy shows no such $H_2$ generation behavior. This experiment indicates that $H_2$ is soluble and has certain stability in molten Ni—Bi.

Example 10

In another specific example referenced to FIG. 27, the equilibrium limited reaction of HCl and oxygen (2HCl+ ½O2←→H$_2$O+Cl$_2$) when conducted in a specific molten salt mixture designed to absorb the product Cl$_2$ into the melt thereby allowing higher conversion of HCl. In the example, Cl$_2$ is produced when O$_2$ is reacted with a mixture of molten KCl (44 wt. %) and MgCl$_2$ (56 wt %) salts. First, HCl was introduced into the reactor shown in FIG. 27 through an inlet tube 2705 and caused to react with MgO suspended in the molten salt containing 44 wt % KCl and MgCl$_2$ to form the clear eutectic salt mixture of KCl (44 wt. %) and MgCl$_2$ (56 wt %) 2703. The water co-produced is soluble in the salt and boils out. Oxygen is then introduced into the 25 cm bubble column reactor 2701 at a flowrate of 10 sccm through the inlet tube 2705. The oxygen is insoluble in the molten salt and reacts at the surface producing chlorine. The chlorine is soluble in the salt and rapidly dissolves pulling the reaction forward and coloring the salt yellow (or darkened hue in black and white photo as shown in FIG. 27). In this specific example the product salt of reacting the MgO to produce the eutectic salt was then reacted with oxygen to produce chlorine. The products were measured in the outlet of the reactor 2707 using a mass spectrometer and the oxygen conversion determined and plotted in FIG. 27 as 2704. An inert argon carrier gas was introduced 2706 to facilitate measurement. The example illustrates how the specific salt mixture with a high solubility for the product, Cl$_2$ (or H$_2$O) can separate and prevent from reacting the products (such as Cl$_2$ from steam) away from a reactant such as O$_2$ to prevent back reactions and achieve higher conversions.

Example 11

Figure 29:
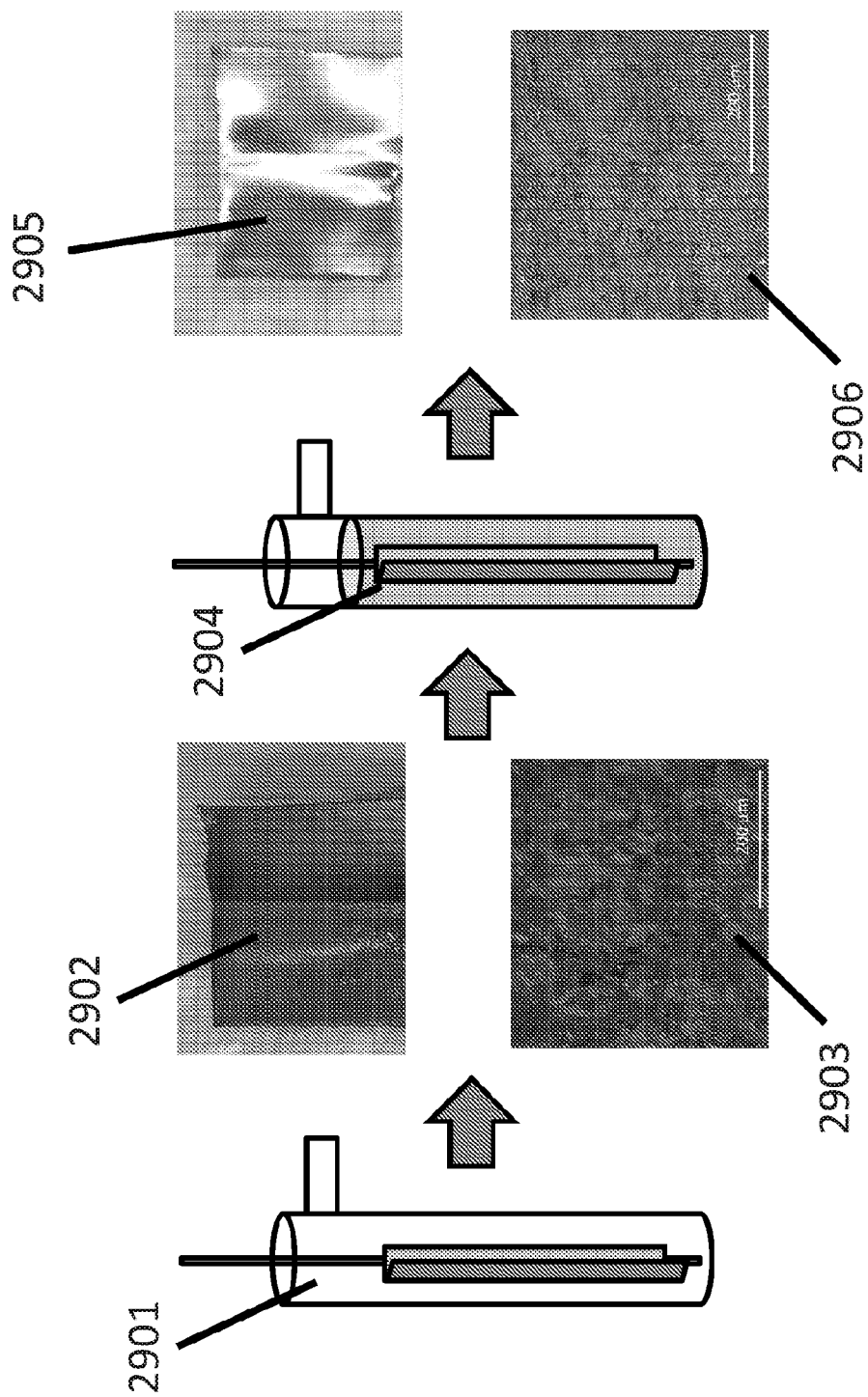
FIG. 29 contains photographs illustrating how the molten salt servers as a solvent to remove carbon from the metal catalyst foil as described in Example 11.

In an eleventh example provided referenced to FIG. 29. A solid catalyst consisting of a pure nickel foil was pre-reduced in hydrogen at 1000° C. then reacted with methane flowing at 14 standard cubic centimeters per minute (SCCM) for 15 minutes into a quartz reactor 2901 containing the foil. Methane was converted to hydrogen gas and solid carbon on the foil surface. The photograph in FIG. 29 on the left, 2902 shows the Ni foil after reaction with an obvious coating of dark dull carbon. The electron micrograph image 2903 shows the carbon covering the Ni surface. The foil is then immersed in 25 grams of a eutectic mixture of LiBr—KBr molten salt at 1000° C. with 50 sccm of Argon bubbled into the vessel to mix and stir the system 2904. The carbon was observed to migrate off the surface of the foil and into the molten salt over 50 minutes. The photograph of the foil after the carbon is removed by the molten salt, 2905 shows the shiny metal surface of the reactivated Ni foil after washing off the carbon in the salt. The electron microscopy image also shows the clean Ni surface, 2906. This example shows how the reactor designs and schematics of FIGS. 5, 6, 7, 13, and 28 may be realized.

As described above, the systems and methods can include various aspects, which include, but are not limited to:

In a first aspect, a multiphase reaction system comprises: a feed stream (101) comprising one or more hydrocarbon gas phase reactants: a liquid phase (203, 304, 404, 605, 703, 904, 1003, 1104, 1303) comprising a molten metal or a metalloid; and one or more products, wherein the one or more products comprise solid carbon (206, 305, 405, 706, 1006, 1110, 1204, 1308) and hydrogen (208, 707, 1004, 1007,) (e.g., in response to the gas phase reactants contacting the liquid phase, or another phase in the reactor). A second aspect can include the system of the first aspect, wherein the one or more hydrocarbon gas phase reactants are less soluble in the liquid phase than at least one of the one or more products, and wherein the one or more products of the reaction are more soluble in the liquid phase than the one or more hydrocarbon gas phase reactors, thereby allowing separation of one or more of the products into the liquid phase. A third aspect can include the system of the first aspect, wherein the liquid phase comprises a molten metal, and wherein the hydrogen is soluble in the molten metal. A fourth aspect can include the system of the first aspect, wherein the one or more hydrocarbon gas phase reactants comprise an alkane. A fifth aspect can include the system of the first aspect, wherein the one or more products comprise a hydrocarbon. A sixth aspect can include the system of the first aspect, wherein the feed stream comprise an alkane and carbon dioxide. A seventh aspect can include the system of the sixth aspect, wherein the one or more products further comprise carbon monoxide. An eighth aspect can include the system of the first aspect, wherein the liquid phase is selected from at least one molten metal comprising Ni, Co, Fe, Pd, Cu, Pt, Al, Sn. Pb, Au, Ag, In, Ga, Te, Bi, Sb, or any mixture thereof. A ninth aspect can include the system of the first aspect, wherein the multiphase reaction system further comprises: a reactor vessel; an inlet to the reactor vessel configured to receive the feed stream; and at least one outlet from the reactor vessel. A tenth aspect can include the system of the ninth aspect, wherein the inlet comprises a tube configured to be passed through the liquid phase and introduce the one or more gas phase reactants into the liquid phase. An eleventh aspect can include the system of the ninth aspect, wherein the inlet comprises a distributor plate disposed at a bottom of the reactor vessel, wherein the liquid phase is disposed above the distributor plate. A twelfth aspect can include the system of the ninth aspect, further comprising: a separator configured to receive a vapor stream from the reaction vessel and separate the hydrogen from unreacted components of the one or more hydrocarbon gas phase reactants; and a recycle line coupled to the separator and the inlet, wherein the recycle line is configured to pass the unreacted components back to the inlet of the reactor vessel.

A thirteenth aspect can include the system of any of the first to twelfth aspects, further comprising a molten salt (409) disposed above the liquid phase. A fourteenth aspect can include the system of any of the first to twelfth aspects, wherein the liquid phase comprises a plurality of liquids that are immiscible in each other. A fifteenth aspect can include the system of the fourteenth aspect, wherein the plurality of liquid phases comprises two or more molten metal phases. A sixteenth aspect can include the system of the fourteenth aspect, wherein the plurality of liquid phases comprises a molten salt. A thirteenth aspect can include the system of any of the first to twelfth aspects, A seventeenth aspect can include the system of any one of the first to twelfth aspects, further comprising: a solid phase (604, 704) mixed with the liquid phase. An eighteenth aspect can include the system of the seventeenth aspect, wherein the solid phase comprises a solid phase catalyst. A nineteenth aspect can include the system of the seventeenth aspect, wherein the solid phase is formed in a packed bed of solid particles with the liquid phase between the solid particles, and wherein the solid particles have catalytic activity to the one or more gas phase reactants. A twentieth aspect can include the system of the seventeenth aspect, wherein the solid phase comprises a salt. A twenty first aspect can include the system of the seventeenth aspect, further comprising: a molten salt disposed above the liquid phase.

In a twenty second aspect, a multiphase reaction method comprises: contacting one or more gas phase reactants (101) with a liquid phase (203, 304, 404, 605, 703, 904, 1003, 1104, 1303) in a reactor, wherein the one or more gas phase reactants comprise a hydrocarbon, and wherein the liquid phase comprises a molten metal or a metalloid; and producing one or more reaction products in response to contacting the one or more gas phase reactants with the liquid phase, wherein the reaction products comprise solid carbon (206, 305, 405, 706, 1006, 1110, 1204, 1308) and hydrogen (208, 707, 1004, 1007). A twenty third aspect can include the method of the twenty second aspect, further comprising: solvating at least a portion of the one or more products in the liquid phase, wherein the one or more gas phase reactants are less soluble in the liquid phase than the portion of the one or more products; and separating at least the portion of the one or more products from the one or more gas phase reactants in response to the solvating. A twenty fourth aspect can include the method of the twenty second aspect, wherein the liquid phase comprises a molten metal, and wherein the hydrogen is soluble in the molten metal. A twenty fifth aspect can include the method of the twenty second aspect, wherein the one or more gas phase reactants comprise an alkane. A twenty sixth aspect can include the method of the twenty second aspect, wherein the one or more products comprise a hydrocarbon. A twenty seventh aspect can include the method of the twenty second aspect, wherein the one or more gas phase reactants comprise an alkane and carbon dioxide. A twenty eighth aspect can include the method of the twenty seventh aspect, wherein the one or more products comprise hydrogen and carbon monoxide. A twenty ninth aspect can include the method of the twenty second aspect, wherein the liquid phase is selected from at least one molten metal comprising Ni, Co, Fe, Pd, Cu, Pt, Al, Sn, Pb, Au, Ag, In, Ga, Te, Bi, Sb, or any mixture thereof. A thirtieth aspect can include the method of the twenty second aspect, wherein contacting the one or more gas phase reactants with a liquid phase comprises bubbling the one or more gas phase reactants through the liquid phase from the bottom of the reactor. A thirty first aspect can include the method of the thirtieth aspect, wherein the liquid phase circulates within the reactor in response to the bubbling.

A thirty second aspect can include the method of any one of the twenty second to thirty first aspects, wherein a molten salt (409) is disposed on top of the liquid phase, and wherein the method further comprises: passing the solid carbon through the molten salt; and separating any liquid phase components from the solid carbon within the molten salt; and producing a layer of the solid carbon layer on top of the molten salt. A thirty third aspect can include the method of any one of the twenty second to thirty first aspects, wherein a molten salt is disposed on top of the liquid phase, and wherein the method further comprises: passing at least a portion of the one or more gas phase reactants through the liquid phase into the molten salt; and producing one or more additional products in response to contacting the portion of the one or more gas phase reactants with the molten salt. A thirty fourth aspect can include the method of any one of the twenty second to thirty first aspects, wherein the liquid phase comprises a molten metal alloy comprising one or more of Ni, Fe, and Mn, and wherein the one or more products comprise graphitic type carbon. A thirty fifth aspect can include the method of any one of the twenty second to thirty first aspects, wherein the liquid phase comprises a molten metal alloy comprising one or more of Cu, Sn, and Ag, and wherein the one or more products comprise disordered type carbon. A thirty sixth aspect can include the method of any one of the twenty second to thirty first aspects, wherein the liquid phase comprises a molten metal alloy configured to have a limited solubility to carbon, and wherein the one or more products comprise a nanostructured and disordered carbon product.

A thirty seventh aspect can include the method of any one of the twenty second to thirty first aspects, wherein the liquid phase further comprises a solid phase (604, 704) mixed with the liquid phase. A thirty eighth aspect can include the method of the thirty seventh aspect, wherein the solid phase comprises a solid phase catalyst. A thirty ninth aspect can include the method of the thirty seventh aspect, wherein the solid phase comprises a salt. A fortieth aspect can include the method of the thirty seventh aspect, wherein the solid phase is formed in a packed bed of solid particles with the liquid phase between the solid particles, and wherein the solid particles have catalytic activity to the one or more gas phase reactants. A forty first aspect can include the method of the thirty seventh aspect, wherein a salt is disposed on the liquid phase, wherein at least a second portion of the one or more products is immiscible in the liquid phase or the salt and is more buoyant than the liquid phase or the salt, wherein the method further comprises: removing the second portion of the one or more products from a top of the salt. A forty second aspect can include the method of the twenty second aspect, further comprising: introducing a gas stream into the reactor above the liquid phase: entraining at least a portion of the solid carbon in the gas stream, and removing the portion of the solid carbon from the reactor in the gas stream.

In a forty third aspect, A multiphase reaction system comprises: a feed stream (101) comprising one or more hydrocarbon gas phase reactants: a liquid phase comprising a molten salt (409); a solid phase (604, 704) disposed within the liquid phase; and one or more products, wherein the one or more products comprise solid carbon (206, 305, 405, 706, 1006, 1110, 1204, 1308) and hydrogen (208, 707, 1004, 1007). A forty fourth aspect can include the system of the forty third aspect, wherein the solid phase comprises a solid phase catalyst. A forty fifth aspect can include the system of the forty third aspect, wherein the solid phase is assembled as a packed bed of solid particles, pellets, or structure with the liquid phase between the solid particles, and wherein the solid particles have catalytic activity to the one or more gas phase reactants. A forty sixth aspect can include the system of the forty third aspect, wherein the solid phase comprises a metal, wherein the metal comprises nickel, iron, cobalt, copper, platinum, ruthenium, rhodium, or any combination thereof. A forty seventh aspect can include the system of the forty third aspect, wherein the solid phase comprises a mixed metal oxide, wherein the metal oxide comprises titanium oxide, zirconia, tungsten oxide, or any combination thereof. A forty eighth aspect can include the system of the forty seventh aspect, wherein the solid phase is supported on alumina, silica, zirconia, or any combination thereof. A forty ninth aspect can include the system of any one of the forty third to forty eighth aspects, wherein the molten salt comprises NaCl, NaBr, KCl, KBr, LiCl, LiBr, $CaCl_2$, $MgCl_2$, $CaBr_2$, $MgBr_2$ and combinations thereof.

In a fiftieth aspect, a multiphase reaction method comprises: contacting one or more gas phase reactants with a solid phase disposed within a liquid phase in a reactor, wherein the one or more gas phase reactants comprise a hydrocarbon, and wherein the liquid phase comprises a molten salt, and wherein the solid phase comprises a solid phase catalyst; and producing one or more reaction products in response to contacting the one or more gas phase reactants with the solid phase, wherein the reaction products comprise solid carbon and hydrogen. A fifty first aspect can include the method of the fiftieth aspect, further comprising: solvating at least a portion of the one or more reaction products in the liquid phase, wherein the one or more gas phase reactants are less soluble in the liquid phase than the portion of the one or more reaction products; and separating at least the portion of the one or more reaction products from the one or more gas phase reactants in response to the solvating. A fifty second aspect can include the method of the fiftieth aspect, wherein the solid phase is assembled as a packed bed of solid particles, pellets, or structure with the liquid phase between the solid particles, and wherein the solid particles have catalytic activity to the one or more gas phase reactants. A fifty third aspect can include the method of any one of the fiftieth to fifty second aspects, wherein the solid phase comprises a metal, wherein the metal comprises nickel, iron, cobalt, copper, platinum, ruthenium, rhodium, or any combination thereof. A fifty fourth aspect can include the method of any one of the fiftieth to fifty second aspects, wherein the solid phase comprises a mixed metal oxide, wherein the metal oxide comprises titanium oxide, zirconia, tungsten oxide, or any combination thereof. A fifty fifth aspect can include the method of the fifty third aspect, wherein the solid phase is supported on alumina, silica, zirconia, or any combination thereof. A fifty sixth aspect can include the method of any one of the fiftieth to fifty fifth aspects, wherein the molten salt comprises NaCl. NaBr, KCl, KBr, LiCl, LiBr, $CaCl_2$, $MgCl_2$, $CaBr_2$, $MgBr_2$ and combinations thereof.

In a fifty seventh aspect, a multiphase reaction method comprises: contacting one or more gas phase reactants with a solid phase disposed within a reactor, wherein the one or more gas phase reactants comprise a hydrocarbon, and wherein the solid phase comprises a solid phase catalyst; producing one or more reaction products in response to contacting the one or more gas phase reactants with the solid phase, wherein the reaction products comprise solid carbon and hydrogen, wherein the solid carbon is disposed on the solid phase; contacting a liquid phase with the solid phase in the reactor; and removing at least a portion of the solid carbon from the solid phase using the liquid phase. A fifty eighth aspect can include the method of the fifty seventh aspect, wherein the liquid phase comprises a molten metal. A fifty ninth aspect can include the method of the fifty seventh aspect, further comprising: solvating at least a portion of the one or more reaction products in the liquid phase, wherein the one or more gas phase reactants are less soluble in the liquid phase than the portion of the one or more reaction products; and separating at least the portion of the one or more reaction products from the one or more gas phase reactants in response to the solvating. A sixtieth aspect can include the method of the fifty seventh aspect, wherein the solid phase is formed in a packed bed of solid particles with the liquid phase between the solid particles, and wherein the solid particles have catalytic activity to the one or more gas phase reactants. A sixty first aspect can include the method of the fifty seventh aspect, wherein the solid phase comprises a metal, wherein the metal comprises nickel, iron, cobalt, copper, platinum, ruthenium, rhodium, or any combination thereof. A sixty second aspect can include the method of the fifty seventh aspect, wherein the solid phase comprises a mixed metal oxide, wherein the metal oxide comprises titanium oxide, zirconia, tungsten oxide, or any combination thereof. A sixty third aspect can include the method of the sixty first or sixty second aspect, wherein the solid phase is supported on alumina, silica, zirconia, or any combination thereof. A sixty fourth aspect can include the method of any one of the fifty seventh to sixty second aspects, wherein the liquid phase comprises a molten salt, and wherein the molten salt comprises NaCl, NaBr, KCl, KBr, LiCl, LiBr, $CaCl_2$, $MgCl_2$, $CaBr_2$, $MgBr_2$ and combinations thereof.

Having described various systems and methods herein, some embodiments can include, but are not limited to:

In a first embodiment, a multiphase reaction system comprises: one or more gas phase reactants: a liquid phase; and one or more products, wherein the one or more gas phase reactants comprises one or more reactants are less soluble in the liquid phase than at least one of the one or more products, and wherein the one or more products of the reaction are relatively soluble, thereby allowing separation of one or more of the products into the liquid phase.

A second embodiment can include the system of the first embodiment, wherein the liquid phase comprises at least one of a molten metal or a metalloid.

A third embodiment can include the system of the second embodiment, wherein the liquid phase comprises a molten metal, and wherein hydrogen is soluble in the molten metal.

A fourth embodiment can include the system of any one of the first to third embodiments, wherein the one or more gas phase reactants comprise an alkane.

A fifth embodiment can include the system of any one of the first to fourth embodiments, wherein the one or more products comprise at least one of hydrogen or carbon.

A sixth embodiment can include the system of any one of the first to fourth embodiments, wherein the one or more products comprise at least one of hydrogen or a hydrocarbon.

A seventh embodiment can include the system of any one of the first to third embodiments, wherein the one or more gas phase reactants comprise an alkane and carbon dioxide.

An eighth embodiment can include the system of the seventh embodiment, wherein the one or more products comprise hydrogen and carbon monoxide.

A ninth embodiment can include the system of any one of the first to third embodiments, wherein the one or more gas phase reactants comprise a hydrogen halide and oxygen.

A tenth embodiment can include the system of the ninth embodiment, wherein the hydrogen halide comprises hydrogen chloride.

An eleventh embodiment can include the system of the ninth or tenth embodiment, wherein the one or more products comprise the halide and water.

A twelfth embodiment can include the system of any one of the ninth to eleventh embodiments, wherein the liquid phase comprises a molten metal, and wherein at least the halide is soluble in the liquid phase.

A thirteenth embodiment can include the system of any one of the first to twelfth embodiments, wherein the liquid phase is selected from at least one molten metal comprising Ni, Co, Fe, Pd, Cu, Pt, Al, Sn, Pb, Au, Ag, In, Ga, Te, Bi, Sb, or any mixture thereof.

A fourteenth embodiment can include the system of any one of the first to thirteenth embodiments, wherein the multiphase reaction system further comprises a reactor and one or more internal structures configured to allow circulation of the liquid phase into which products are dissolved and removal of the dissolved species in the lower pressure/ temperature environment of the upper region of the reactor A fifteenth embodiment can include the system of any one of the first to fourteenth embodiments, wherein the multiphase reaction system further comprises a tube configured to be passed through the liquid phase and introduce the one or more gas phase reactants into the liquid phase.

A sixteenth embodiment can include the system of any one of the first to fourteenth embodiments, further comprising a molten salt disposed above the liquid phase.

A seventeenth embodiment can include the system of any one of the first to sixteenth embodiments, wherein the liquid phase comprises a plurality of liquids that are immiscible in each other.

An eighteenth embodiment can include the system of the seventeenth embodiment, wherein the plurality of liquid phases comprises two or more molten metal phases.

A nineteenth embodiment can include the system of the seventeenth or eighteenth embodiment, wherein the plurality of liquid phases comprises a molten salt.

A twentieth embodiment can include the system of any one of the first to nineteenth embodiments, wherein the liquid phase further comprises a solid phase mixed with the liquid phase.

A twenty first embodiment can include the system of the twentieth embodiment, wherein the solid comprises a solid phase catalyst.

A twenty second embodiment can include the system of the twentieth or twenty first embodiment, wherein the solid comprises a salt.

A twenty third embodiment can include the system of the twenty first or twenty second embodiment, wherein the solid is formed in a packed bed of solid particles with the liquid phase between the solid particles, and wherein the solid particles have catalytic activity to the one or more gas phase reactants.

In a twenty fourth embodiment, a multiphase reaction process comprises: contacting one or more gas phase reactants with a liquid phase; producing one or more products in response to contacting the one or more gas phase reactants with the liquid phase: solvating at least a portion of the one or more products in the liquid phase, wherein the one or more gas phase reactants are less soluble in the liquid phase than the portion of the one or more products; and separating at least the portion of the one or more products from the one or more gas phase reactants in response to the solvating.

A twenty fifth embodiment can include the method of the twenty fourth embodiment, wherein the liquid phase comprises at least one of a molten metal or a metalloid.

A twenty sixth embodiment can include the method of the twenty fifth embodiment, wherein the liquid phase comprises a molten metal, and wherein hydrogen is soluble in the molten metal.

A twenty seventh embodiment can include the method of any one of the twenty fourth to twenty sixth embodiments, wherein the one or more gas phase reactants comprise an alkane.

A twenty eighth embodiment can include the method of any one of the twenty fourth to twenty seventh embodiments, wherein the one or more products comprise at least one of hydrogen or carbon.

A twenty ninth embodiment can include the method of any one of the twenty fourth to twenty seventh embodiments, wherein the one or more products comprise at least one of hydrogen or a hydrocarbon.

A thirtieth embodiment can include the method of any one of the twenty fourth to twenty seventh embodiments, wherein the one or more gas phase reactants comprise an alkane and carbon dioxide.

A thirty first embodiment can include the method of the thirtieth embodiment, wherein the one or more products comprise hydrogen and carbon monoxide.

A thirty second embodiment can include the method of any one of the twenty fourth to twenty sixth embodiments, wherein the one or more gas phase reactants comprise a hydrogen halide and oxygen.

A thirty third embodiment can include the method of thirty second embodiment, wherein the hydrogen halide comprises hydrogen chloride.

A thirty fourth embodiment can include the method of any one of the thirty second or thirty third embodiment, wherein the one or more products comprise the halide and water.

A thirty fifth embodiment can include the method of any one of the thirty second to thirty fourth embodiments, wherein the liquid phase comprises a molten metal, and wherein at least the halide is soluble in the liquid phase.

A thirty sixth embodiment can include the method of any one of the twenty fourth to thirty fifth embodiments, wherein the liquid phase is selected from at least one molten metal comprising Ni, Co, Fe, Pd, Cu, Pt, Al, Sn, Pb, Au, Ag, In, Ga, Te, Bi, Sb, or any mixture thereof.

A thirty seventh embodiment can include the method of any one of the twenty fourth to thirty sixth embodiments, wherein contacting the one or more gas phase reactants with a liquid phase comprises bubbling the one or more gas phase reactants through the liquid phase from the bottom.

A thirty eighth embodiment can include the method of the thirty seventh embodiment, wherein the liquid phase circulates within a reactor in response to the bubbling.

A thirty ninth embodiment can include the method of any one of the twenty fourth to thirty eighth embodiments, wherein a molten salt is disposed on top of the liquid phase, and wherein the method further comprises: passing at least a portion of the one or more gas phase reactants through the liquid phase into the molten salt, and producing one or more additional products in response to contacting the portion of the one or more gas phase reactants with the molten salt.

A fortieth embodiment can include the method of any one of the twenty fourth to thirty ninth embodiments, wherein producing the one or more products generates heat.

A forty first embodiment can include the method of any one of the twenty fourth to fortieth embodiments, further comprising: contacting the one or more products with a second material after the separating; and cooling the one or more products in response to the contacting.

A forty second embodiment can include the method of any one of the twenty fourth to forty first embodiments, wherein the liquid phase comprises a molten metal alloy comprising one or more of Ni, Fe, and Mn, and wherein the one or more products comprise graphitic type carbon.

A forty third embodiment can include the method of any one of the twenty fourth to forty first embodiments, wherein the liquid phase comprises a molten metal alloy comprising one or more of Cu, Sn, and Ag, and wherein the one or more products comprise disordered type carbon.

A forty fourth embodiment can include the method of any one of the twenty fourth to forty first embodiments, wherein the liquid phase comprises a molten metal alloy configured to have a limited solubility to carbon, and wherein the one or more products comprise a nanostructured and disordered carbon product.

A forty fifth embodiment can include the method of any one of the twenty fourth to forty fourth embodiments, wherein the liquid phase comprises a plurality of liquids that are immiscible in each other.

A forty sixth embodiment can include the method of the forty fifth embodiment, wherein the plurality of liquid phases comprises two or more molten metal phases.

A forty seventh embodiment can include the method of the forty fifth or forty sixth embodiment, wherein the plurality of liquid phases comprises a molten salt.

A forty eighth embodiment can include the method of any one of the twenty fourth to forty seventh embodiments, wherein the liquid phase further comprises a solid phase mixed with the liquid phase.

A forty ninth embodiment can include the method of the forty eighth embodiment, wherein the solid comprises a solid phase catalyst.

A fiftieth embodiment can include the method of the forty eighth or forty ninth embodiment, wherein the solid comprises a salt.

A fifty first embodiment can include the method of the forty ninth or fiftieth embodiment, wherein the solid is formed in a packed bed of solid particles with the liquid phase between the solid particles, and wherein the solid particles have catalytic activity to the one or more gas phase reactants.

A fifty second embodiment can include the method of the twenty fourth embodiment, wherein a salt is disposed on the liquid phase, wherein at least a second portion of the one or more products is immiscible in the liquid phase or the salt and is more buoyant than the liquid phase or the salt, wherein the method further comprises: removing the second portion of the one or more products from a top of the salt.

A fifty third embodiment can include the method of the fifty second embodiment, wherein the second portion of the one or more products comprises carbon, and wherein removing the second portion of the one or more products from a top of the salt comprises physically removing the carbon from the top of the salt.

A fifty fourth embodiment can include the method of the fifty second embodiment, wherein the second portion of the one or more products comprises carbon, and wherein removing the second portion of the one or more products from a top of the salt comprises passing a gas across the carbon, and entraining the carbon in the gas to remove the carbon from the top of the salt.

In a fifty fifth embodiment, a process for the conversion of one or more gas phase chemical reactants into one or more chemical products comprises contacting the gas phase reactants with one or more liquids and/or solid-liquid and/or liquid-liquid suspensions or a solid which is periodically contacted with a liquid that facilitate the reaction as a catalyst, whereby the liquid is such that one or more of the gas phase reactants and one or more of the products are relatively insoluble, and whereby one or more of the products of the reaction are relatively soluble in the liquid and/or solid thereby facilitating product separation and high conversion of equilibrium limited reactions.

A fifty sixth embodiment can include the process of the fifty fifth embodiment where the conversion of hydrocarbon gases, including natural gas, into hydrogen gas and solid carbon by contacting the reactants with one or more high temperature liquids and/or solid-liquid and/or liquid-liquid suspensions or a solid which is periodically contacted with a liquid which facilitate the reaction as a catalyst, and whereby the liquid is such that the hydrocarbon reactants and the solid carbon products are relatively insoluble, and whereby the hydrogen gas product of the reaction is relatively soluble in the liquid and/or solid thereby facilitating separation of solid carbon from the liquid and gas phase hydrogen and allowing high methane conversion.

A fifty seventh embodiment can include the process of the fifty fifth or fifty sixth embodiment, wherein the conversion of hydrocarbon gases including natural gas into hydrogen gas and solid carbon by contacting the reactants by bubbling the gas through a molten metal or metalloid catalyst at a temperature above 600 C, and whereby the molten metal or metalloid is such that the hydrocarbon reactants and the solid carbon products are relatively insoluble, and whereby the hydrogen gas product of the reaction is relatively soluble in the molten metal or metalloid thereby facilitating separation of solid carbon from the liquid and gas phase hydrogen and because of the solubility of the hydrogen in the molten metal separating it from the carbon preventing the reverse reaction and allowing high methane conversion beyond equilibrium conversion in a single phase system.

A fifty eighth embodiment can include the process of the fifty fifth or fifty sixth embodiment, wherein the conversion of hydrocarbon gases including natural gas into hydrogen gas and solid carbon by contacting the reactants by bubbling the gas through a two-phase mixture of a molten metal or metalloid catalyst and a molten salt at a temperature above 600 C, and whereby the liquid is such that the hydrocarbon reactants and the solid carbon products are relatively insoluble, and whereby the hydrogen gas product of the reaction is relatively soluble in the liquid and/or solid thereby facilitating separation of solid carbon from the liquid and gas phase hydrogen and allowing high methane conversion.

A fifty ninth embodiment can include the process of the fifty fifth or fifty sixth embodiment, wherein the conversion of hydrocarbon gases including natural gas into hydrogen gas and solid carbon by contacting the hydrocarbon gases on a solid metal catalyst surface (including but not limited to Ni, Fe, Cu, Co and alloys) at a temperature above 600 C to produce solid carbon on the solid metal surface and hydrogen gas. The hydrogen gas is removed as a product stream and the solid metal catalyst is periodically contacted with a molten metal to remove the solid carbon and carry it out of the reactor.

In a sixtieth embodiment, a reactor comprises a molten metal and/or metalloid at high temperature into which an alkane (methane, ethane, propane, butane, . . . ) gas or mixture of alkane gases are introduced and caused to react to form a hydrocarbon product and hydrogen. The molten metal is selected for high hydrogen solubility allowing the hydrogen to move into solution away from the site of reaction preventing recombination of the hydrogen and the hydrocarbon product.

In a sixty first embodiment, a reactor comprises a molten metal at high temperature into which a mixture of an alkane gas and carbon dioxide is introduced and caused to react to form hydrogen and carbon monoxide. The molten metal is selected for high hydrogen solubility allowing the hydrogen to move into solution away from the site of reaction preventing recombination or further reaction of the hydrogen with the carbon monoxide.

In a sixty second embodiment, a reactor comprises a molten salt at high temperature into which a mixture of hydrogen chloride and oxygen gases are introduced and caused to react to form chlorine and water. The molten salt is selected for high solubility to chlorine and/or water allowing the chlorine and/or water to move into the molten phase away from the site of reaction preventing recombination.

In a sixty third embodiment, a reactor comprises a molten metal and/or metalloid at high temperature into which gas phase hydrogen containing reactants are introduced and contacted with the molten material producing hydrogen as a product and the molten metal and/or metalloid consists of a metal including but not limited to Ni, Co, Fe, Pd, Cu, Pt, Al, Sn, Pb, Au, Ag, In, Ga, Te, Bi, Sb and their mixtures.

In a sixty fourth embodiment, a reactor system for the processes of any one of the fifty fifth to sixty third embodiments can include the gas phase reactants being introduced into the bottom of the reactors and bubble to the surface guided by an internal structure allowing circulation of the molten materials into which products are dissolved and removal of the dissolved species in the lower pressure/temperature environment of the upper region of the reactor.

In a sixty fifth embodiment can include a reactor system for the processes of any one of the fifty fifth to sixty third embodiments whereby the gas phase reactants are contacted with the liquid metal at the bottom of the reactor and guided through a tube to allow bubble lift pumping of the liquid containing dissolved products to the top of the reactor column together with the gas in bubbles where the products dissolved within the liquid are allowed to move into the gas phase for removal from the reactor. The circulation of the molten material is provided by the lifting of the bubbles.

In a sixty sixth embodiment can include a reactor system for the processes of any one of the fifty fifth to sixty third embodiments whereby the bubble column is filled with both a molten metal and an immiscible molten salt such that the molten salt fills the top section of the column and the molten metal fills the bottom section of the column. The gas phase reactants are contacted with the liquid metal at the bottom of the reactor and undergo one type of reaction (eg. Dehydrogenation) then the products remaining in the bubble pass into the molten salt region on top and undergo a different type of reaction facilitated by the molten salt.

In a sixty seventh embodiment can include a reactor system for the processes of any one of the fifty fifth to sixty third embodiments whereby an exothermic reaction (i.e. combustion) of the soluble species is accomplished in a separate bubble stream from the primary reaction system where a reactant (e.g. oxygen) is introduced.

In a sixty eighth embodiment can include a reactor system for the processes of any one of the fifty fifth to sixty third embodiments whereby an endothermic reaction process (i.e. steam generation) with or without the soluble species is accomplished in a separate stream from the primary reaction system where a reactant (e.g. liquid water) is introduced.

In a sixty ninth embodiment, a composition of molten materials for performing alkane pyrolysis comprising a metal highly soluble to carbon including but not limited to alloys of Ni, Fe, Mn, which produce a carbon product which is mostly graphitic type carbon.

In a seventieth embodiment, a composition of molten materials for performing alkane pyrolysis consisting of a metal which has limited solubility to carbon including but not limited to alloys of Cu, Sn, Ag, which produce a carbon product which is mostly disordered type carbon.

In a seventy first embodiment, a composition of molten materials for performing alkane pyrolysis consisting of a molten salt which has limited solubility to carbon and produces a carbon product which is nanostructured and disordered.

In some embodiments, a two or more phase reaction system is described herein whereby gas phase reactants are in contact with a condensed phase (liquid or liquid/solid) in which one or more of the gas phase reactants are relatively insoluble and one or more of the products of the reaction are relatively soluble, thereby allowing separation of one or more of the products into the condensed phase.

In some embodiments a pyrolysis reactor and process are disclosed whereby a reactor consisting of a molten metal and/or metalloid at high temperature into which an alkane (methane, ethane, propane, butane, . . . ) gas, or mixture of alkane gases, is introduced and caused to react to form hydrogen and carbon. The molten metal can be selected for high hydrogen solubility to allow the hydrogen to move into solution and away from the site of reaction, thereby reducing or preventing recombination of the hydrogen and carbon to reform methane.

In some embodiments a dehydrogenation and or non-oxidative coupling reactor and process are disclosed. The reactor can include a molten metal and/or metalloid at high temperature into which an alkane (methane, ethane, propane, butane, . . . ) gas, or mixture of alkane gases, can be introduced and caused to react to form a hydrocarbon product and hydrogen. The molten metal can be selected for high hydrogen solubility to allow the hydrogen to move into solution away from the site of reaction, thereby reducing or preventing recombination of the hydrogen and the hydrocarbon product.

In some embodiments a dry reforming reactor and process are disclosed. The reactor can include a molten metal at high temperature into which a mixture of an alkane gas and carbon dioxide is introduced and caused to react to form hydrogen and carbon monoxide. The molten metal can be selected for high hydrogen solubility allowing the hydrogen to move into solution away from the site of reaction, thereby reducing or preventing recombination or further reaction of the hydrogen with the carbon monoxide.

In some embodiments an HCl oxidation reactor and process are disclosed. The reactor can include of a molten salt at high temperature into which a mixture of hydrogen chloride and oxygen gases are introduced and caused to react to form chlorine and water. The molten salt can be selected for high solubility to chlorine and/or water allowing the chlorine and/or water to move into the molten phase away from the site of reaction preventing recombination.

In some embodiments a reactor and process specific novel metals and metalloids are disclosed. The reactor can include a molten metal and/or metalloid at high temperature into which gas phase hydrogen containing reactants are introduced and contacted with the molten material to produce hydrogen as a product. The molten metal and/or metalloid can include a metal including but not limited to Ni, Co, Fe, Pd, Cu, Pt, Al, Sn, Pb, Au, Ag, In, Ga, Te, Bi, Sb, and any mixture thereof.

In some embodiments, a bubble column reactor and a bubble column reaction process are disclosed that can be used to carry out any of the reactions described herein. The reactor system for the process can use gas phase reactants that are introduced into the bottom of the reactors and bubble to the surface of a liquid phase (e.g., a molten metal, salt, etc.) guided by an internal structure allowing circulation of the molten materials into which products are dissolved and removal of the dissolved species in the lower pressure/temperature environment of the upper region of the reactor occurs.

In some embodiments, a bubble column with lift for pyrolysis and reaction process are disclosed. The reactor system for these processes (e.g., any of the reactions described herein) can use gas phase reactants that are contacted with the liquid or molten metal at the bottom of the reactor and guided through a tube to allow bubble lift pumping of the liquid containing dissolved products to the top of the reactor column together with the gas in bubbles, where the products dissolved within the liquid are allowed to move into the gas phase for removal from the reactor. The circulation of the molten material is provided by the lifting of the bubbles.

In some embodiments, a mixed metal and salt column is disclosed. The reactor system for these processes (e.g., any of the reactions described herein) can use a bubble column filled with both a molten metal and an immiscible molten salt such that the molten salt fills the top section of the column and the molten metal fills the bottom section of the column. The gas phase reactants can be contacted with the liquid metal at the bottom of the reactor and undergo one type of reaction (e.g., Dehydrogenation). Then the products remaining in the bubble pass into the molten salt region on top and undergo a different type of reaction facilitated by the molten salt.

In some embodiments, heat addition can be performed with the reactor and/or reaction processes. The reactor system for these processes (e.g., any of the reactions described herein) can use an exothermic reaction (e.g., combustion, etc.) of the soluble species, which can be accomplished in a separate bubble stream from the primary reaction system where a reactant (e.g., oxygen) is introduced.

In some embodiments, heat removal can be performed with the reactor and/or reaction processes. The reactor system for these processes (e.g., any of the reactions described herein) can use an endothermic reaction process (e.g., steam generation, etc.) with or without the soluble species, which can be accomplished in a separate stream from the primary reaction system where a reactant (e.g., liquid water) is introduced.

In some embodiments, specific compositions of liquids used in the systems and processes described herein can provide for different types of carbon products. A composition of molten materials for performing alkane pyrolysis can include a metal having a high soluble for carbon including but not limited to alloys of Ni, Fe, Mn, which produce a carbon product which is mostly graphitic type carbon.

In some embodiments, specific compositions of liquids used in the systems and processes described herein can provide for different types of carbon products. A composition of molten materials for performing alkane pyrolysis can include a metal which has limited solubility to carbon including but not limited to alloys of Cu, Sn, Ag, which produce a carbon product which is mostly disordered type carbon.

In some embodiments, specific compositions of liquids used in the systems and processes described herein can provide for different types of carbon products. A composition of molten materials for performing alkane pyrolysis can include a molten salt which has limited solubility to carbon and produces a carbon product which is nanostructured and disordered.

While several embodiments have been provided in the present disclosure, it should be understood that the disclosed systems and methods may be embodied in many other specific forms without departing from the spirit or scope of the present disclosure. The embodiments and present examples are to be considered as illustrative and not restrictive, and the intention is not to be limited to the details given herein. Many variations and modifications of the systems and methods disclosed herein are possible and are within the scope of the disclosure. For example, the various elements or components may be combined or integrated in another system or certain features may be omitted or not implemented. Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present systems and methods. Thus, the claims are a further description and are an addition to the detailed description of the present invention. The disclosures of all patents, patent applications, and publications cited herein are hereby incorporated by reference.

We claim:

1. A multiphase reaction system comprising:
   a reactor vessel, the reactor vessel comprising:
   a feed stream comprising one or more hydrocarbon gas phase reactants;
   liquid phases comprising a first liquid and a second liquid, the first liquid comprising a molten metal or a metalloid, and the second liquid comprising a molten salt, wherein the molten salt is disposed as a separate phase on top of the molten metal or the metalloid;
   a solid phase disposed within the liquid phases; and
   one or more products, wherein the one or more products comprise solid carbon and hydrogen, wherein the solid phase and the solid carbon are different, and wherein the solid carbon is accumulated on top of the molten salt.

2. The multiphase reaction system of claim 1, wherein the solid phase comprises a solid phase catalyst.

3. The multiphase reaction system of claim 1, wherein the solid phase is assembled as a packed bed of solid particles or pellets with the liquid phases between the solid particles or the pellets, and wherein the solid particles or the pellets have catalytic activity to the one or more gas phase reactants.

4. The multiphase reaction system of claim 1, wherein the solid phase comprises a metal, wherein the metal comprises nickel, iron, cobalt, copper, platinum, ruthenium, rhodium, or any combination thereof.

5. The multiphase reaction system of claim 1, wherein the solid phase comprises a mixed metal oxide, wherein the mixed metal oxide comprises titanium oxide, zirconia, tungsten oxide, or any combination thereof.

6. The multiphase reaction system of claim 5, wherein the solid phase is supported on alumina, silica, zirconia, or any combination thereof.

7. The multiphase reaction system of claim 1, wherein the molten salt comprises NaCl, NaBr, KCl, KBr, LiCl, LiBr, $CaCl_2$, $MgCl_2$, $CaBr_2$, $MgBr_2$, or any combination thereof.

8. The multiphase reaction system of claim 1, further comprising:

a gas inlet configured to introduce a gas stream into the reactor vessel above the liquid phases; entrain at least a portion of the solid carbon in the gas stream; and remove the portion of the solid carbon from the reactor vessel in the gas stream.

9. The multiphase reaction system of claim 1, wherein the molten metal comprises Ni, Co, Fe, Pd, Cu, Pt, Al, Sn, Pb, Au, Ag, In, Ga, Te, Bi, Sb, or any mixture thereof.

10. The system of claim 1, wherein the molten metal or the metalloid has catalytic properties towards a reaction of the one or more hydrocarbon gas phase reactants.

11. The system of claim 1, wherein the molten salt has a lower density than that of the molten metal or the metalloid.

12. A multiphase reaction method, the method comprising:
contacting one or more gas phase reactants with a solid phase disposed within liquid phases in a reactor, wherein the liquid phases comprises a first liquid and a second liquid, wherein the first liquid comprises a molten metal or a metalloid, wherein the second liquid comprises a molten salt, wherein the molten salt is disposed as a separate phase on top of the molten metal or the metalloid, wherein the one or more gas phase reactants comprise a hydrocarbon, and wherein the solid phase comprises a solid phase catalyst; and
producing one or more reaction products in response to contacting the one or more gas phase reactants with the solid phase, wherein the one or more reaction products comprise solid carbon and hydrogen, and wherein the solid carbon is accumulated on top of the molten salt.

13. The method of claim 12, further comprising:
solvating or removing at least a portion of the one or more reaction products on the solid phase with the liquid phases, wherein the one or more reaction products solvated or removed with the liquid phases comprise at least a portion of the solid carbon; and
separating at least the portion of the one or more reaction products from the one or more gas phase reactants in response to the solvating or the removing.

14. The method of claim 12, wherein the solid phase is assembled as a packed bed of solid particles or pellets with the liquid phase between the solid particles or the pellets, and wherein the solid particles or the pellets have catalytic activity to the one or more gas phase reactants.

15. The method of claim 12, wherein the solid phase comprises a metal, wherein the metal comprises nickel, iron, cobalt, copper, platinum, ruthenium, rhodium, or any combination thereof.

16. The method of claim 15, wherein the solid phase is supported on alumina, silica, zirconia, or any combination thereof.

17. The method of claim 12, wherein the solid phase comprises a mixed metal oxide, wherein the mixed metal oxide comprises titanium oxide, zirconia, tungsten oxide, or any combination thereof.

18. The method of claim 12, wherein the molten salt comprises NaCl, NaBr, KCl, KBr, LiCl, LiBr, $CaCl_2$, $MgCl_2$, $CaBr_2$, $MgBr_2$, or any combination thereof.

19. The multiphase reaction method of claim 12, wherein the molten metal comprises Ni, Co, Fe, Pd, Cu, Pt, Al, Sn, Pb, Au, Ag, In, Ga, Te, Bi, Sb, or any mixture thereof.

20. The multiphase method of claim 12, wherein the molten metal or the metalloid has catalytic properties towards a reaction of the one or more hydrocarbon gas phase reactants.

21. The method of claim 12, wherein the molten salt has a lower density than that of the molten metal or the metalloid.

* * * * *